(12) United States Patent
Gromley et al.

(10) Patent No.: US 9,256,864 B2
(45) Date of Patent: *Feb. 9, 2016

(54) UNLOADING CHECKS FROM AN AUTOMATED BANKING MACHINE

(71) Applicant: Diebold, Incorporated, North Canton, OH (US)

(72) Inventors: Neil Gromley, Kensington, OH (US); Dustin Cairns, Deerfield, OH (US); Mike Lawver, Dover, OH (US); Rodney J. Reese, New Philadelphia, OH (US); B. Scott Harroff, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,927

(22) Filed: Aug. 12, 2014

(65) Prior Publication Data

US 2015/0006379 A1    Jan. 1, 2015

Related U.S. Application Data

(63) Continuation of application No. 13/689,050, filed on Nov. 29, 2012, now Pat. No. 8,800,866, which is a continuation-in-part of application No. 13/136,767, filed on Aug. 10, 2011, now Pat. No. 8,403,213, and a continuation-in-part of application No. 12/460,642, (Continued)

(51) Int. Cl.
| | |
|---|---|
| *G06Q 20/04* | (2012.01) |
| *G07F 19/00* | (2006.01) |
| *G07G 3/00* | (2006.01) |
| *G06Q 40/02* | (2012.01) |
| *G06Q 20/10* | (2012.01) |

(52) U.S. Cl.
CPC .......... *G06Q 20/042* (2013.01); *G06Q 20/1085* (2013.01); *G06Q 40/02* (2013.01); *G07F 19/202* (2013.01); *G07F 19/209* (2013.01); *G07G 3/00* (2013.01)

(58) Field of Classification Search
CPC . G06K 17/00; G06Q 20/042; G06Q 20/1085; G06Q 40/02; G07F 19/20; G07F 19/202; G07F 19/209
USPC .......................................... 235/375, 379, 380
See application file for complete search history.

(56) References Cited

U.S. PATENT DOCUMENTS 7,216,801 B1 *   5/2007   Crews et al. ................... 235/379
7,792,753 B1 *   9/2010   Slater et al. ..................... 705/45

(Continued)

*Primary Examiner* — Paultep Savusdiphol
(74) *Attorney, Agent, or Firm* — Black McCuskey Souers & Arbaugh, LPA

(57) ABSTRACT

A banking system controlled by data bearing records utilizes metrics in acquiring and processing event data related to financial transaction activity at a plurality of automated banking machines. The system uses machine sensors to detect event data during a transaction. For each machine, the system can obtain, analyze, and store event data. The event data can include transaction data related to transaction type, time analysis data related to transaction duration, and operational data related to machine components used during the transaction. Statistical machine averages can be determined and compared by the system in real time. The system can produce statistics related to component performance, such as check reader performance in reading check data from generated check images. The system can also be used to detect and then alleviate potential problems, such as by causing a machine to perform an early sending of check images.

20 Claims, 53 Drawing Sheets

Related U.S. Application Data filed on Jul. 21, 2009, now Pat. No. 8,714,444, which is a continuation-in-part of application No. 11/825,770, filed on Jul. 9, 2007, now Pat. No. 7,848,830.

(60) Provisional application No. 61/629,913, filed on Nov. 30, 2011, provisional application No. 61/716,015, filed on Oct. 19, 2012, provisional application No. 61/401,311, filed on Aug. 11, 2010, provisional application No. 60/819,692, filed on Jul. 10, 2006, provisional application No. 60/926,137, filed on Apr. 25, 2007, provisional application No. 60/926,210, filed on Apr. 25, 2007.

(56) References Cited

U.S. PATENT DOCUMENTS

| | | | |
|---|---|---|---|
| 7,922,076 B2* | 4/2011 | Ryan et al. | 235/379 |
| 8,083,131 B2* | 12/2011 | Blackford et al. | 235/379 |
| 2003/0217005 A1* | 11/2003 | Drummond et al. | 705/43 |
| 2009/0164372 A1* | 6/2009 | Dell et al. | 705/43 |
| 2009/0212104 A1* | 8/2009 | Smith et al. | 235/379 |
| 2009/0218394 A1* | 9/2009 | Drummond et al. | 235/379 |
| 2009/0222381 A1* | 9/2009 | Purches et al. | 705/42 |
| 2013/0159183 A1* | 6/2013 | Lopez | 705/43 |

* cited by examiner

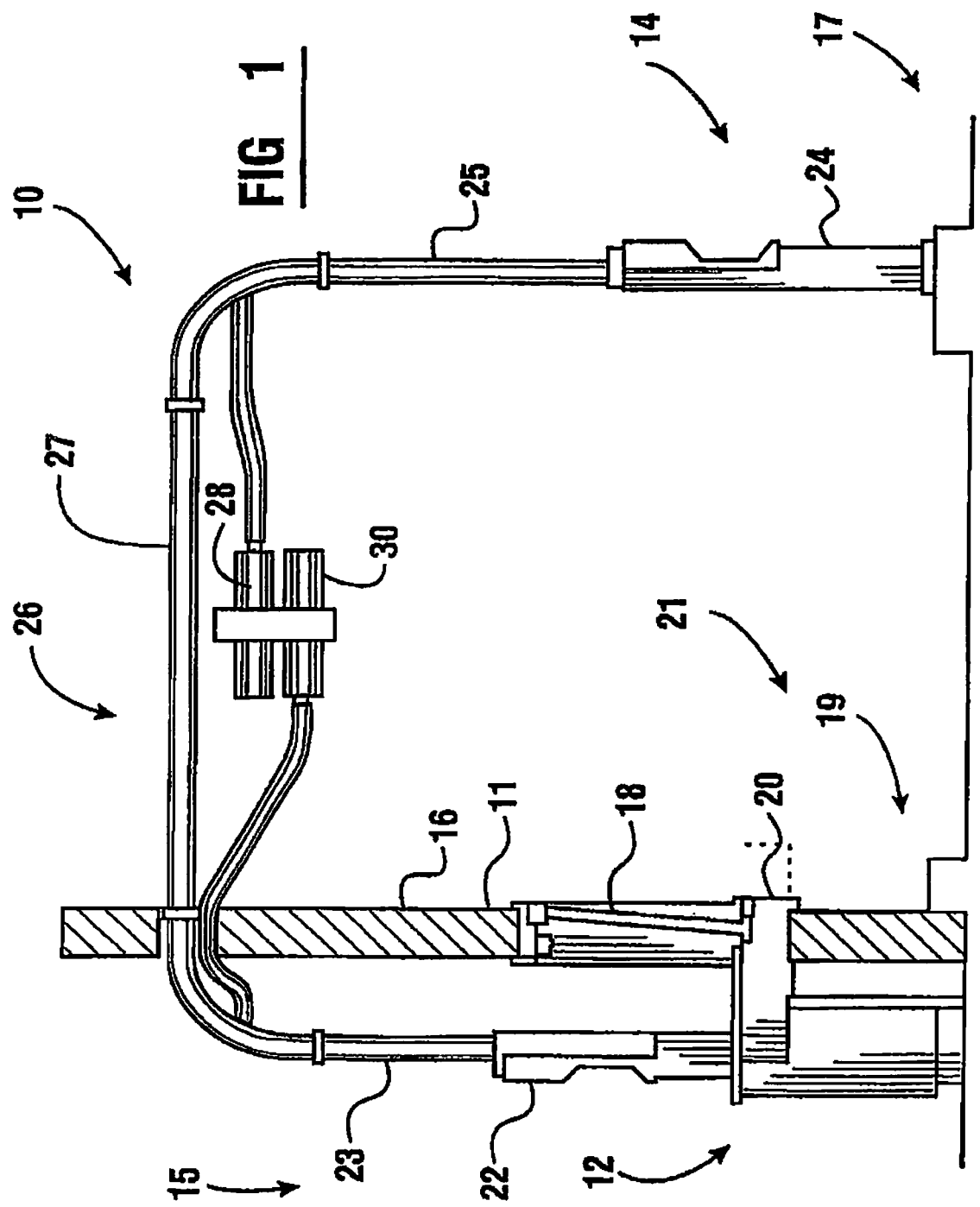

Fig. 38

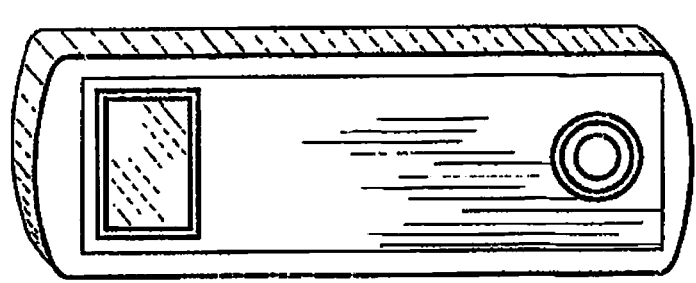
Fig. 48 Bluetooth
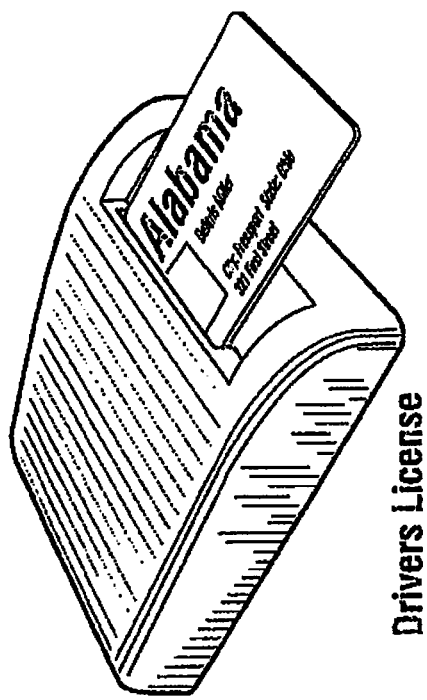
Fig. 47 Drivers License Scan
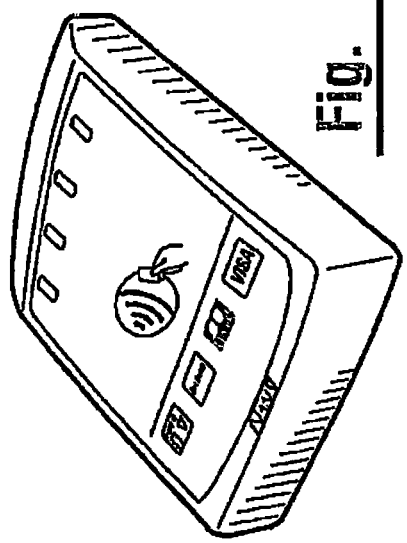
Fig. 46 NFC Reader

UNLOADING CHECKS FROM AN AUTOMATED BANKING MACHINE

CROSS REFERENCE TO RELATED APPLICATIONS

This application is a continuation of U.S. patent application Ser. No. 13/689,050 filed on Nov. 29, 2012, now U.S. Pat. No. 8,800,866 that claims benefit pursuant to 35 U.S.C. §119 (e) of Provisional Application 61/629,913 filed Nov. 30, 2011 and Provisional Application 61/716,015 filed Oct. 19, 2012. This application is also a continuation-in-part of U.S. application Ser. No. 13/136,767 filed Aug. 10, 2011, which claims benefit pursuant to 35 U.S.C. §119(e) of Provisional Application 61/401,311 filed Aug. 11, 2010. application Ser. No. 13/136,767 is also a continuation-in-part of U.S. application Ser. No. 12/460,642 filed Jul. 21, 2009, which is a continuation-in-part of U.S. application Ser. No. 11/825,770 filed Jul. 9, 2007, now U.S. Pat. No. 7,848,830, which claims benefit pursuant to 35 U.S.C. §119(e) of Provisional Application 60/819,692 filed Jul. 10, 2006 and Provisional Applications 60/926,137 and 60/926,210 flied Apr. 25, 2007. The disclosures of the aforementioned Applications are hereby incorporated by reference in their entirety herein.

TECHNICAL FIELD

This disclosure relates to automated banking machines.

BACKGROUND

Automated banking machines may include a card reader that operates to read data from a bearer record such as a user card. The automated banking machine may operate to cause the data read from the card to be compared with other computer stored data related to the bearer or their financial accounts. The machine operates in response to the comparison determining that the bearer is an authorized system user to carry out at least one transaction which is operative to transfer value to or from at least one account. A record of the transaction is also commonly printed through operation of the automated banking machine and provided to the user. Automated banking machines may be used to carry out transactions such as the dispensing of cash, the making of deposits, the transfer of funds between accounts, and account balance inquiries. The types of banking transactions a customer can carry out are determined by the capabilities of the particular banking machine and the programming of the institution operating the machine. A common type of automated banking machine used by consumers is an automated teller machine which enables customers to carry out banking transactions.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine, automated teller machine (ATM), or automated transaction machine shall be deemed to include any machine that may be used to automatically carry out transactions involving transfers of value.

Example systems can be used to conduct banking transactions between a service provider and remotely located customers. The systems can be used in drive-through banking applications as well as in other transaction environments, as shown in U.S. Pat. Nos. 5,299,891 and 6,146,057, which are owned by the assignee of the present invention, and the disclosures are herein incorporated by reference in their entirety. Other applications are shown in U.S. Pat. No. 7,140,810 as well as in U.S. Provisional Application 60/719,932 filed Sep. 16, 2005, the disclosures of which are also herein incorporated by reference in their entirety.

Transaction drawers, which are also referred to herein as deal drawers, may be used to carry out transactions. Deal drawers may be used by a service provider such as a bank teller within a facility to transfer items between the teller and a customer outside the facility. This may be, for example, a person IN a vehicle located in a drive-through lane adjacent to the teller. Bank tellers and other service providers may exchange items with customers through the use of deal drawers to carry out transactions. Example deal drawers are shown in U.S. Pat. Nos. 6,789,860; 7,182,027; and 7,721,660; the disclosures of which are incorporated by reference herein in their entirety.

OVERVIEW OF EXAMPLE EMBODIMENTS

In an example embodiment, described herein, check images are unloaded from an automated banking machine at predetermined scheduled times. Check images may be obtained from the automated banking machine prior to the next scheduled times based on predetermined criteria, such as the length of time that check image data is in sole possession of the automated banking machine, current number of check images waiting to be unloaded, or a combination of the aforementioned criteria.

BRIEF DESCRIPTION OF DRAWINGS

FIG. 1 is a schematic view of an example apparatus including a pneumatic transfer apparatus and a deal drawer used for carrying out transactions.

FIG. 38 shows displayed metrics data corresponding to drive-up events.

FIG. 46 shows a near-field communication device.

FIG. 47 shows a drivers license scanner device.

FIG. 48 shows a Bluetooth device.

DESCRIPTION OF EXAMPLE EMBODIMENTS

Figure 3:
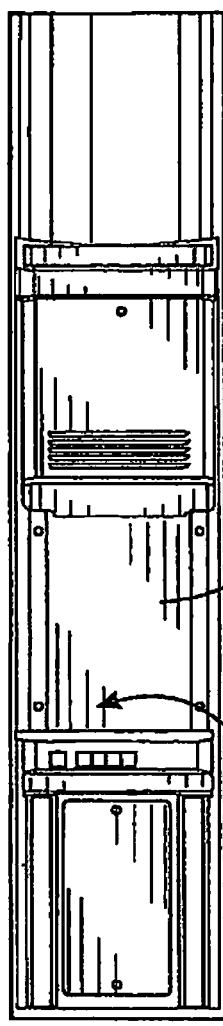
FIG. 3 is a front plan view of the portion of the service provider station shown in FIG. 2.

Referring now to the drawings and particularly to FIG. 1, there is shown therein an example embodiment of an apparatus included in a transaction system, generally indicated 10. The transaction system 10 includes a service provider station, generally indicated 12, and a customer station, generally indicated 14. In an example embodiment, the service provider station is positioned within a facility 11 in which goods or services are sold. In one example embodiment, the service provider station is positioned in an interior area 15 of the facility adjacent to a pharmacy operation which enables pharmacy items, such as medications, to be delivered to customers adjacent to the customer station 14. In the example embodiment, customer station 14 is positioned adjacent to a drive-through lane 17 in which customers may carry out transactions while positioned in a vehicle.

In the example embodiment, the service provider station is also positioned adjacent to a drive-through window 18. A movable drawer mechanism 20 such as a deal drawer, may be used by the service provider at the service provider station to exchange items with customers at a customer station 21 which is in a drive-through lane 19 adjacent to the drawer mechanism 20.

The example service provider station includes a service provider terminal 22. The example customer station includes a customer terminal 24 which is also referred to herein as a transaction device. Terminals 22 and 24 are connected by a pneumatic tube transfer conduit 26. The pneumatic tube transfer conduit includes a first generally vertically extending leg portion 23 which is adjacent to and in communication with the service provider terminal 22. The second generally vertically extending leg portion 25 is adjacent to and in communication with the customer terminal 24. A transversely extending portion 27 extends generally horizontally between the first and second leg portions. The transverse portion 27 is connected to the vertically extending leg portions through radiused bends in the conduit which are radiused to enable the passage of a pneumatic carrier therethrough between the service provider terminal and the customer terminal.

A first blower 28 is connected to transfer conduit 26 generally in the area above the customer terminal 24. Blower 28 may be selectively operated to draw negative pressure in the transfer conduit in the area generally above the customer terminal. Blower 28 further includes suitable valving so that when the blower 28 is not operated, air is generally prevented from entering the transfer conduit 26 through the blower 28.

A blower 30 similar to blower 28 is connected to the transfer conduit in the area generally above service provider terminal 22. Blower 30 may be operated to selectively produce negative pressure in the transfer conduit above the service provider terminal Like blower 28, when blower 30 is not operating, air is generally prevented from entering the transfer conduit through the blower.

Figure 5:
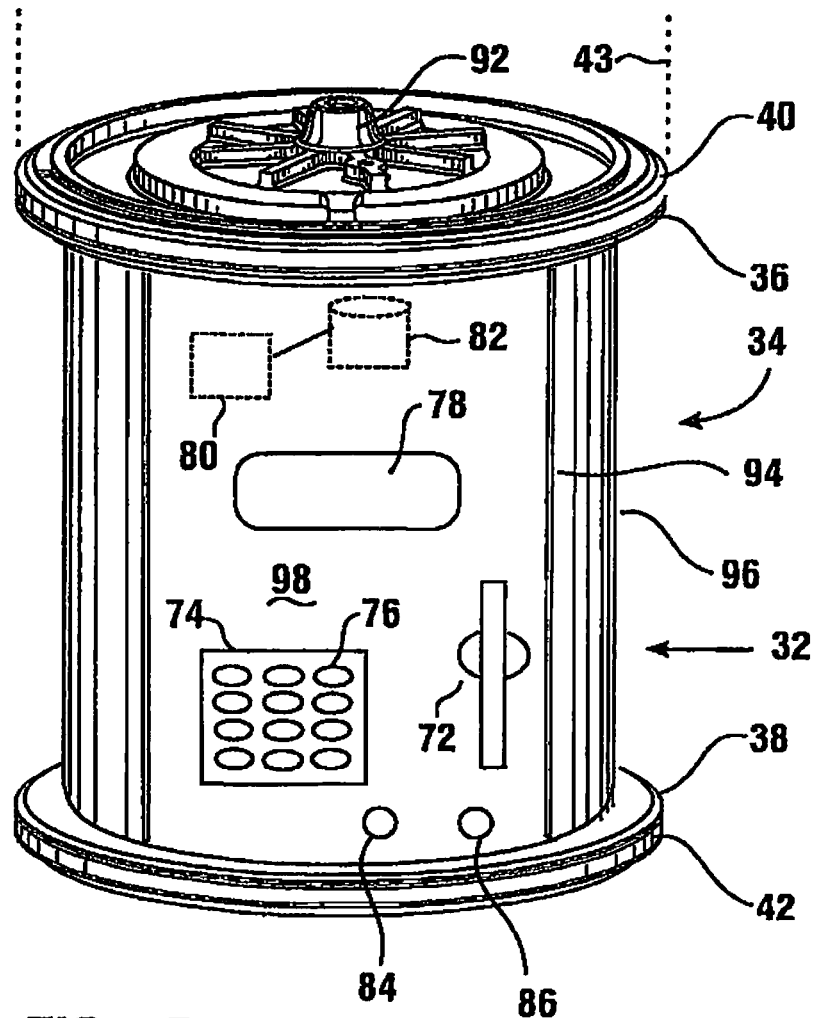
FIG. 5 is an isometric view of an example carrier which may be used in connection with the system shown in FIG. 1.

In an example embodiment, a carrier 32 of the type shown in FIG. 5, is enabled to be selectively moved between the service provider terminal and the customer terminal by the application of differential pressure produced in the tube by blowers 28 and 30. As shown in FIG. 5, the example carrier 32 includes a housing 34. The housing includes a first end member 36 and a second end member 38. The first end member 36 includes an annular resilient seal ring 30 supported thereon. Likewise, second end member 38 has an annular resilient seal ring 42 supported thereon. The seal rings provide slidable and generally fluid tight engagement between the carrier housing and an interior wall of the pneumatic tube as schematically indicated 43 in FIG. 5. The angular seal rings enable the carrier to be moved in the tube through the application of a pressure differential on opposite sides of the carrier.

Figure 2:
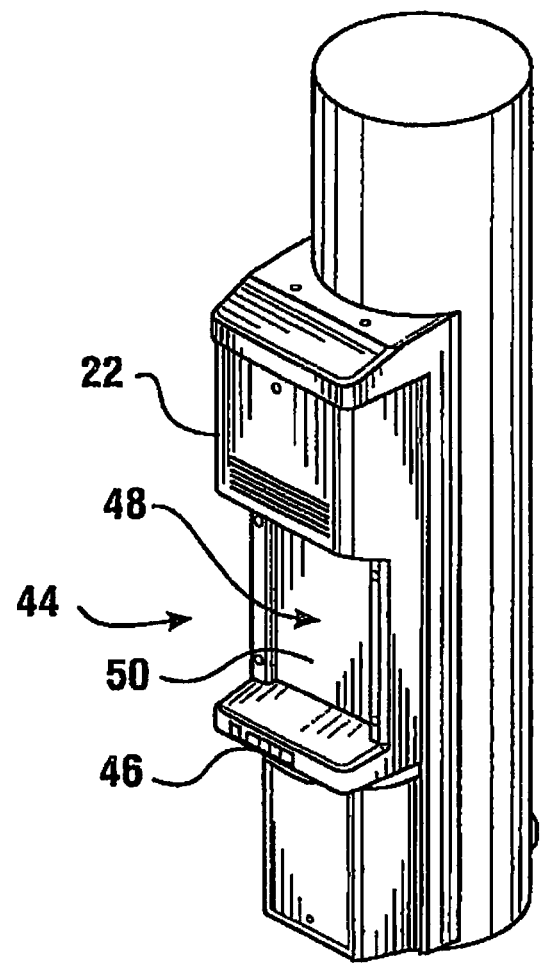
FIG. 2 is an isometric view of a portion of the service provider station as shown in FIG. 1.

FIGS. 2 and 3 show the example service provider terminal 22 in greater detail. The exterior of the service provider terminal includes an interface generally indicated 44 which includes a control panel 46. Control panel 46 includes buttons and indicators which are used by a service provider to cause the carrier to move between the service provider station and the customer station, as well as to input other commands. In an example embodiment, the control panel 46 includes a button which may be actuated to apply differential pressure to transfer the carrier from the service provider station to the customer station. Another button included on the control panel may be actuated to apply differential pressure to move the carrier from the customer station to the service provider station.

In an example embodiment, the customer and service provider stations include an audio interface which includes a microphone and speaker at each of the service provider and customer stations. This enables a service provider to audibly communicate with the customers. Buttons or similar devices on the control panel 46 may be selectively actuated by the service provider to enable the service provider to speak to and/or listen to a customer at the customer station.

The example control panel 46 of the service provider station may further include indicator lights or other devices for providing the service provider with information concerning the status of components in the system. Alternative embodiments of the system may include additional devices for communicating with customers. These may include, for example, video communication devices or other devices for facilitating communication between the customer and the service provider.

The example service provider terminal 22 further includes a transfer opening 48. The transfer opening extends through the transfer conduit and enables access to the carrier 32. In the example embodiment, the service provider is enabled to place items to be transferred to a customer into an interior area of the carrier when the carrier is positioned at the service provider station. In example embodiments, the items to be transferred may include pharmacy items, such as medical items, instruction booklets, currency, credit card vouchers, receipts, prescriptions and other documents and things that are exchanged in performing a transaction.

In the example embodiment, the transfer opening 48 includes a door 50. Door 50 is preferably a sliding type door that is movable up and down so as to selectively cover or enable access to the carrier through transfer opening 48. The door 50 is selectively moved between its respective positions by a door moving mechanism (not shown). The door moving mechanism controls the opening and closing of the door 50 at appropriate times and responsive to the control circuitry of the system. The example service provider station as well as the customer station may further include features of the incorporated disclosure of U.S. Pat. No. 6,146,057 or other incorporated disclosures. Similarly, the customer station 14 includes appropriate mechanisms to enable a customer in a position at the customer station adjacent to the customer terminal 24, which serves as a pneumatic carrier delivery and receiving device, to access the carrier 32 when the carrier is positioned thereto.

Figure 4:
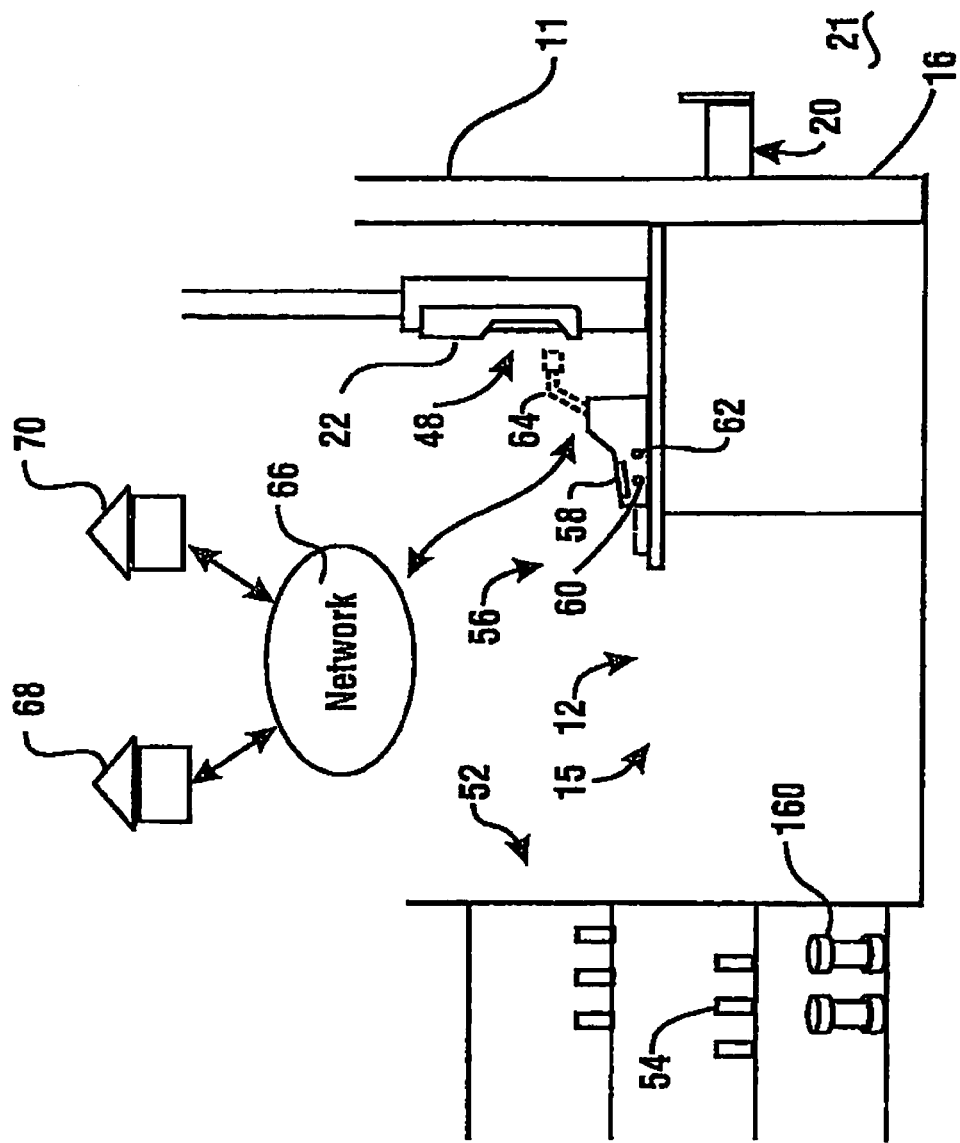
FIG. 4 is a schematic view of the service provider station and the transaction networks connected thereto for purposes of assessing charges against customers' accounts.

FIG. 4 shows an example service provider station which is positioned within a facility adjacent to a pharmacy which is schematically indicated 52. Pharmacy 52 includes items schematically indicated 54 which are purchased by customers and delivered to customers at the customer stations through the pneumatic tube or the movable drawer mechanism.

An example service provider station further includes a computerized transaction device which is alternatively referred to herein as a charge device 56. In example embodiments the charge device may include a cash register, POS terminal or other device that can be used to cause a charge to be assessed to a customer's account. In the example embodiment, the charge device 56 includes an amount input device 58. The amount input device 58 includes input devices, for example numerical keys or other types of input devices, that can be used to receive inputs and/or instructions related to amounts to be charged to a user's account.

The example charge device 56 further includes in operative connection therewith, a reading device 60. The reading device 60 may be used in a manner later described to receive signals output from an output device on the carrier or other body. The example charge device further includes a further output device 62. Output device 62 in the example embodiment, may be used to provide an output in the manner later discussed so as to indicate the status of certain transaction steps which may cause actions to be taken, for example to erase information stored in memory on the carrier or other body. As indicated in phantom in FIG. 4, an example embodiment of the charge device may include a selectively positionable input/output device 64. The input/output device 64 may include the functions of the reading device 60 and 62. In example embodiments where the carrier 32 is held captive within the pneumatic transfer tube conduit, the input/output device 64 may be selectively positioned adjacent to the transfer opening 48 so as to achieve communication with the processor and memory supported on the carrier.

As shown in FIG. 4 the charge device 56 may also be in operative connection with remote computers that can assess charges to customers' accounts. Such communication may be achieved through a network schematically indicated 66. Network 66 may be comprised of a single network or multiple connected networks. Network 66 enables communication with entities that can assess a charge to a debit account such as an account of a customer at a bank schematically indicated 68. Alternatively or in addition, network 66 may enable communication with a credit charge processing entity 70, such as an entity associated with VISA or MasterCard Of course this arrangement for assessing charges against customers accounts is example and in other embodiments other approaches and system configurations may be used.

The computerized transaction device may also include other features for recording data items associated with transactions. This may include, for example, suitable reading devices and/or network interfaces that are operative to record the type and number of pharmacy items or other items that are provided to each customer. Alternatively or in addition, example computerized transaction devices may be in operative connection with devices which capture documents, images or other information. This may include, for example, a scanning device that can be used to scan prescription data received from respective customers. In still other embodiments, the computerized transaction device may be in operative connection with systems of the type described in U.S. Pat. Nos. 6,711,460 and/or 7,630,788, the disclosures of which are herein incorporated by reference in their entirety. Such systems of the incorporated disclosure may provide data concerning medical items and the compounding and fulfillment of prescriptions related to such items.

In still other embodiments, systems of the type described in U.S. patent application Ser. No. 09/414,290 filed Oct. 7, 1999, the disclosure of which is incorporated herein in its entirety, may be used. Such systems may be used to capture images of users, items, documents, merchandise, currency, checks or other things associated with transactions. Alternatively or in addition, such systems may be used to capture video and/or audio communications which occur between service providers, customers, pharmacists and other persons associated with transactions. Of course these data items are merely example of the types of data that may be recorded in connection with such transactions.

It should be understood that, while a pharmacy system has been described in connection with some example embodiments, the principles discussed herein may be used in connection with other types of transaction systems. For example, banking transaction systems may include one or more computerized transaction devices which are operative to facilitate the carrying out of banking transactions for users. This may include, for example, systems which credit or debit user accounts, cause and record the dispensing of cash, image checks, provide updated balances, provide roiled coin, and carry out other transactions which are associated with the banking activity. Such systems may also include provision for recording audio and video data associated with each transaction.

Other types of systems may include other types of computerized transaction devices that record data items associated with transactions as are appropriate for the particular types of transactions being carried out through a particular system.

As shown in FIG. 5, the example carrier 32 includes a body 96. Body 96 bounds an interior area of the carrier which is adapted for holding items that are transferred between customers and the service provider. In the example embodiment, body 96 has an opening 94. Opening 94 provides access to the interior area of the carrier. A movable cover 98 is selectively positionable so as to block access to the interior area through the opening or to enable access thereto. Movable cover 98 is movable through rotation of an end cap 92 in the manner described in the incorporated disclosure.

In the example embodiment carrier 32 serves as a data transfer unit for transferring account and/or user identifying information between a customer and a service provider. In the example embodiment the carrier enables card, PIN and/or other data to be provided by the customer at the customer station, and then to have such data delivered to the charge device at the service provider station.

The example carrier 32 includes a card reader 72 in supporting connection with the movable cover. In the example embodiment the card reader 72 is adapted to receive a magnetic stripe card therein. The card reader receives a card of a customer into a slot and is operative to read magnetic stripe data from the card as the card is either inserted and/or withdrawn from the card reader slot.

Carrier 32 further includes in supporting connection with the movable cover 98, a recessed keypad 74. Keypad 74 includes a plurality of keys 76. In the example embodiment keys 76 are alphanumeric keys which facilitate the input of a PIN or other data or instructions by the customer.

In the example embodiment the movable cover 98 further includes an output device 78 which comprises a display. Display 78 in the example embodiment includes an LCD type display which is enabled to output alphanumeric data to a user. It should be understood however that the input and output devices shown on the carrier 32 are merely examples and in other embodiments other or additional types of input and/or output devices may be used.

Carrier 32 further has in supporting connection therewith a processor schematically indicated 80. Processor 80 includes the capability to process instructions so as to carry out the functions later described. Processor 80 is in operative connection with a memory schematically indicated 82. Memory 82 is operative to hold instructions to be executed by the processor as well as other data as hereafter described.

Carrier 32 of the example embodiment further includes an output device 84. In the example embodiment output device 84 provides outputs in the form of signals. In the example embodiment the signals are infrared signals. It should be understood however that in other embodiments other types of output devices may be used, including other types of radiation emitting devices including devices such as LEDs or RF output devices. Other output devices used in embodiments may include (but are not limited to) electrical connectors, displays, RF backscatter devices, sonic output devices or other types of devices which are operative to output or otherwise provide signals.

In the example embodiment, carrier 32 further includes a reading device 86. Reading device 86 is operative to receive signals from the output device 62 of the charge device in the manner earlier explained. The output device 84 and the reading device 86 are also in operative connection with the processor 80 and the memory 82.

It should be understood that although in the embodiment shown in FIG. 5 the carrier body is integrally formed with the transaction data transfer terminal, in other embodiments other types of data transfer devices may be used. For example a body may be provided which is separable from the carrier so as to enable the body to be removed from the pneumatic transfer apparatus. In further alternative embodiments a carrier may be removable from the pneumatic transfer conduit such that the carrier may be used for data transfer, and a different carrier placed in the conduit and used to transport items between the service provider and the customer. Of course numerous alternative approaches may be used. Still other embodiments may not include a carrier or other device which provides such data transfer.

Figure 8:
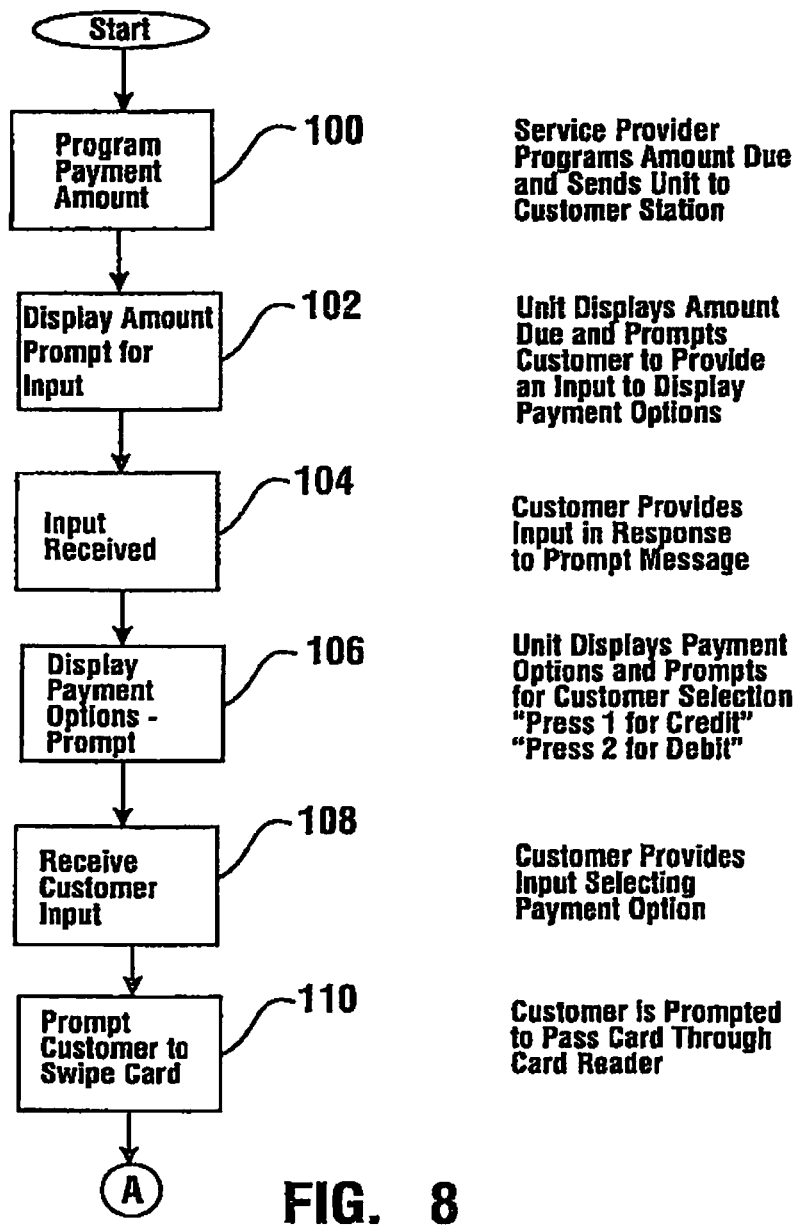
FIGS. 8 through 10 are schematic views of transaction steps which are conducted through operation of the transaction transfer unit of an example embodiment.
Figure 9:
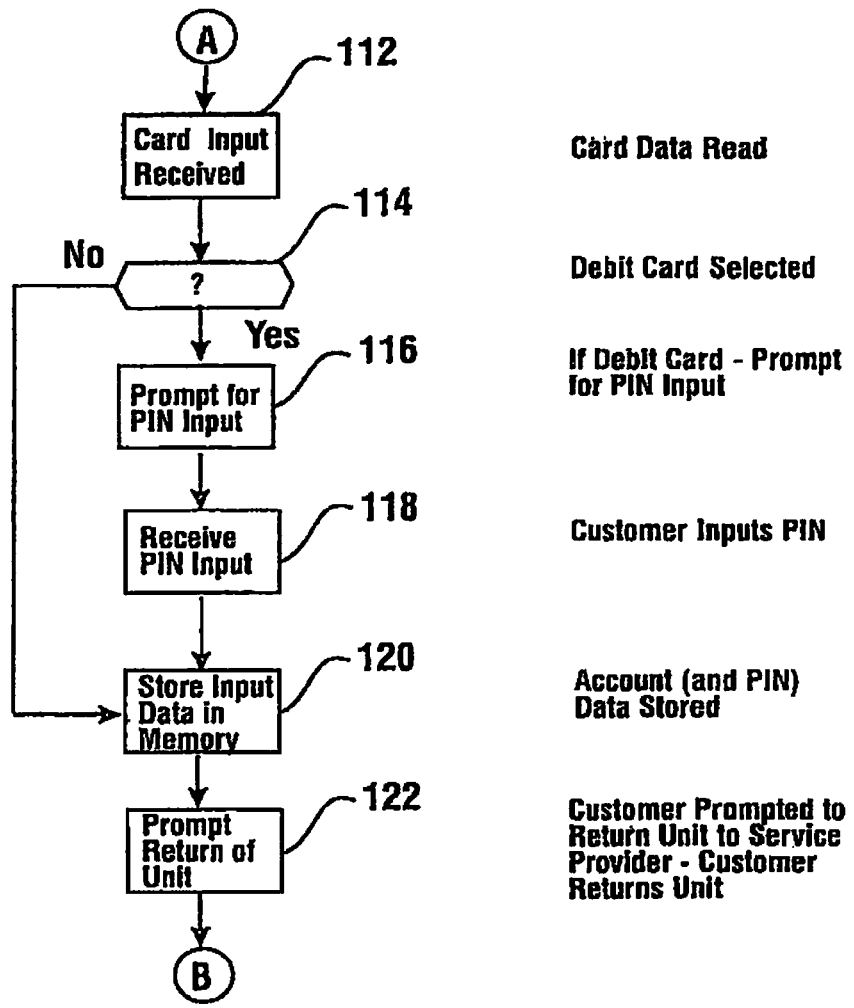

Operation of an example system for purposes of carrying out a transaction between a service provider and a customer will now be explained with reference to FIGS. 8 through 10. In this example embodiment the service provider receives requests from the customer at the customer station, such as a request to purchase items. In the example embodiment these would be pharmacy items 54 which have an associated charge. The customer may provide documents, prescriptions or other information to the service provider. This may be done by transporting these items in the interior area of the carrier, by providing information through the communication system provided between the customer station and service provider station, or combinations thereof. The items requested by the customer will have an associated charge. This charge can be calculated either by the service provider or through use of the amount input device on the charge device or other input mechanisms.

In this example embodiment if the customer indicates to the service provider that they wish to charge their debit or credit card account for the items to be delivered, the service provider operates the charge device 56 through appropriate inputs, to program the amount the customer is to pay into the carrier 32. This is reflected by a step 100 shown in FIG. 8. In the example embodiment the programming of the amount information into the memory 82 of the carrier is accomplished by the transmission of signals from the output device 62 (or with the combined input and output device 64) which are received by the reading device 86. Once the amount to be paid is programmed into the memory of the carrier, the service provider provides appropriate inputs at the service provider's station to cause the carrier to be transmitted to the customer station.

At the customer station the processor 80 operates to cause the amount due from the customer to be output through the display 78. The processor also operates in response to programmed instructions in memory to output a prompt through the display for the customer to provide an input so as to display and eventually select their payment options. This is indicated by a step 102. The customer then provides the requested input in response to the prompt indicated by step 104. The input may be for example, the customer touching one or more keys 76 of the keypad.

In response to input received from the customer in step 104 the processor is operative to cause the display 78 to output payment options for the user. This is represented by a step 106. The output payment options may include for example, prompting the customer to press 1 for a credit transaction and to press 2 for a debit transaction. The customer then provides a selected input as represented by step 108.

In response to the customer providing the payment option selection, the processor is operative to cause the display 78 to output a prompt requesting that the user swipe their card through the card reader 72. This is represented by step 110. The input by the user from their card through the card reader causes data to be read from the magnetic stripe of the card as represented by step 112 in FIG. 9. The processor then operates in accordance with its programmed instructions to determine if it was a debit or credit card transaction that the customer selected. This is represented in step 114. If the customer has requested a debit card transaction, the processor operates to provide an output prompting the customer to input their PIN as indicated in step 116. When the PIN data is received as reflected in step 118, the processor then operates to cause the card and PIN data to be stored in the memory on the carrier as reflected in step 120. Of course as schematically indicated in FIG. 9, if the customer has requested a credit card transaction which does not require PIN data, only the card data is stored.

Upon receiving the data from the customer necessary to assess a charge against the customer's selected account, the processor operates in accordance with its instructions to provide an output through a display 78 prompting the user to return the carrier to the service provider station. This is represented in FIG. 9 by a step 122. In response to a prompt, the customer in a vehicle at the transaction device in some embodiments may cause the carrier to be transferred to the service provider station through one or more inputs to input devices at the customer terminal. Alternatively in some embodiments the customer may notify the service provider that the customer is ready to send the carrier, and the service provider may provide the inputs necessary to transfer the carrier from the transaction device to the service provider terminal. It should be further understood that in some embodiments the processor may operate in accordance with its programming to provide additional steps and functions such as to request that the customer retry the card reading steps and/or PIN entry steps in cases where the data has not been properly received or stored, or in cases where the customer indicates that they have made an error.

Figure 10:
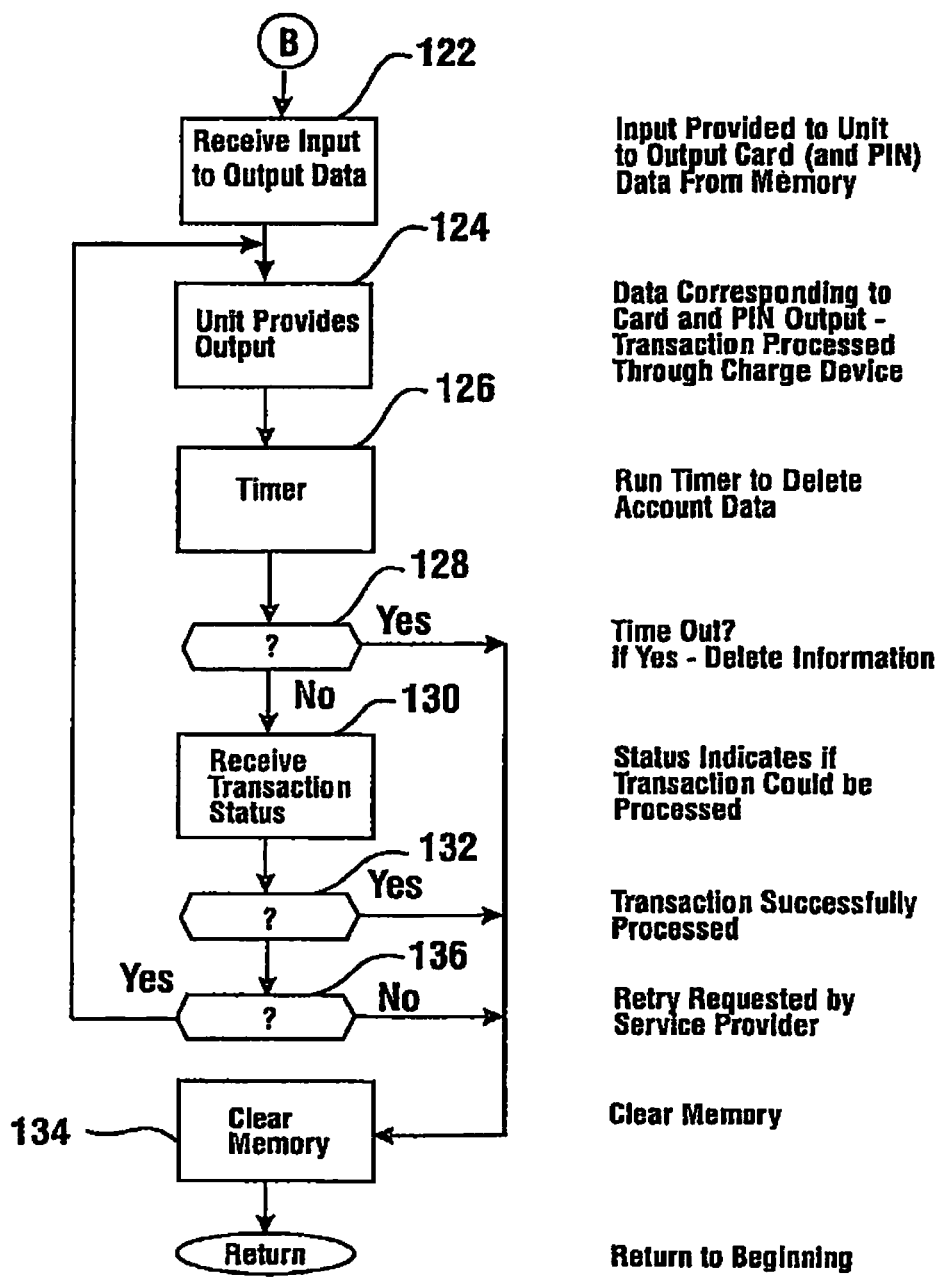

As represented in FIG. 10 with the carrier returned to the service provider station, the service provider through operation of the charge device 56 provides at least one input to the reading device 86 on the carrier. This is done by the transmission of signals to the output device 62 and/or through the combined input/output device 64. This input is operative to notify the processor on the carrier that the data stored in memory necessary to process the transaction, is to be output. This is represented by a step 124.

As indicated in step 126, the carrier then outputs through the output device 84, signals corresponding to the data stored in memory. This data includes card data and, if appropriate, personal identification number (PIN) data. The data output through the output device 84 is received by the reading device 60 of the charge device and/or by the combined input/output device 64.

In response to receiving the data stored in memory of the carrier, the charge device is operative to cause a charge to be assessed against the user's account. In the example embodiment the charge device is operative to send appropriate messages through the network 66 to the entity that can assess the charge against the user's selected account. The appropriate charge assessing entity through operation of its computer systems generally responds to the charge device with appropriate messages indicating that the charge is acceptable against the requested account. Of course if the charge is not authorized, then one or more messages indicative of this situation is sent through the network to the service provider. In the example embodiment the service provider is notified whether or not the charge is acceptable through outputs provided through one or more output devices on the charge device 56. These may be outputs provided, for example, through a display on a point of sale terminal, electronic cash register, card authorization terminal or other apparatus integral with or connected to the devices used to communicate the messages to assess the charge against the user's account.

In the example embodiment when the carrier outputs the data corresponding to the customer's account information, a timer is run and reflected in a step 126. This is done in the example embodiment so that the data input by the customer is eventually automatically erased from the memory of the carrier unit. This reduces the risk that unauthorized access to this information will be obtained. If the preset time elapses without further action as indicated in a step 128, such data in the memory 82 on the carrier is erased.

In the example embodiment an output is provided through the output device 62 of the charge device or through the combined input/output device 64, to indicate to the processor on the carrier whether the transaction could be successfully processed. This is indicated in a step 130. As indicated in step 132, if the transaction was successfully processed, the processor operates to clear the memory of the customer data as indicated in step 134. Alternatively if the transaction could not be successfully processed, but the service provider chooses to resubmit the transaction, the service provider may through the charge device cause the carrier to output the transaction data again as reflected at a step 136. As FIG. 10 indicates however, the carrier will output the transaction data a second time only if the timing function has not caused the data in memory to be automatically erased. If the service provider chooses not to retry the requested transaction in step 136, the customer transaction data stored in memory on the carrier is erased. This readies the carrier to receive new charge account data from either the same or another customer.

If the charge is successfully assessed to the customer's account, the service provider in the example embodiment will provide inputs to the service provider terminal so as to open the movable cover 98 on the carrier. The service provider will then place the items that have been purchased by the customer in the interior area of the carrier and provide inputs to close the movable cover. Further inputs provided by the service provider to the service provider terminal will operate the blower so as to cause the carrier to be transported to the customer station. Once at the customer station the cover will be opened such that the customer may access the items as well as receipts, instructions, promotional material or any other things which the service provider has placed in the interior area of the carrier for delivery to the customer. After the items have been taken by the customer, the customer will generally leave the customer station and the service provider is ready to service another customer.

Figure 6:
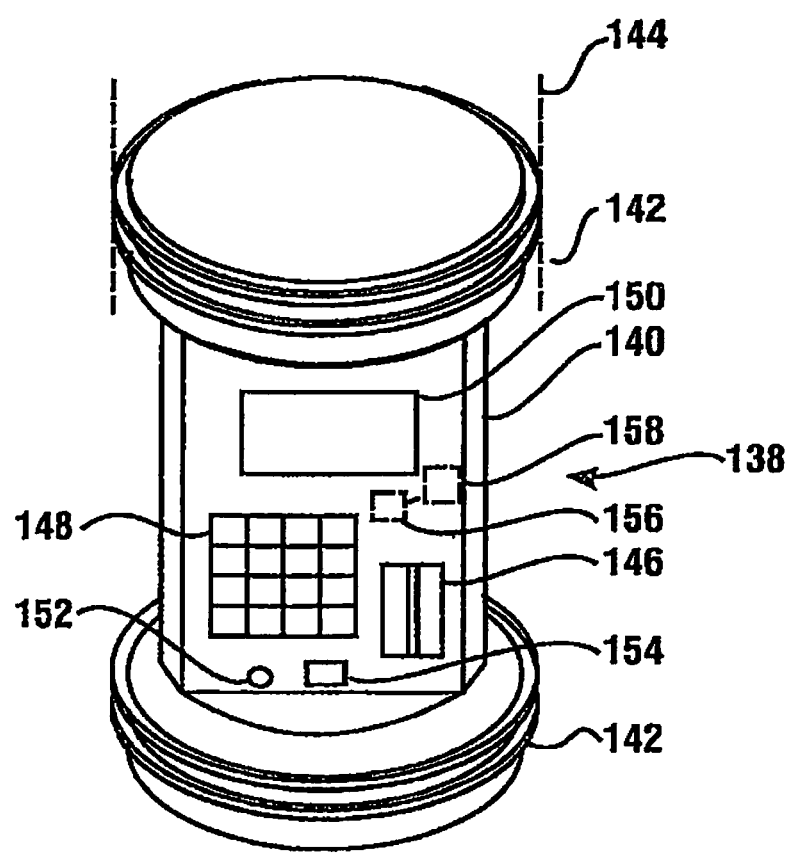
FIG. 6 is an isometric view of an alternative type carrier with an integral transaction data storage unit, which may be used in some embodiments.

Other alternative example embodiments may include types of pneumatic transfer systems in which the carrier, which is transported between the service provider station and the customer station, may be removed from the transfer conduit. FIG. 6 shows an example data transfer unit schematically indicated 138 which may be used in such an embodiment. Unit 138 includes a body 140. Body 140 includes annular seal rings 142 adjacent each end which enable slidable generally fluid tight engagement with the interior wall of a transfer tube which is schematically represented 144. Body 144 has in supporting connection therewith a card reader 146 and a keypad 148 including a plurality of keys. Body 140 also includes a display 150, an output device 152 and a reading device 154. Body 140 also has supported thereon a processor schematically indicated 156. The processor 156 is in operative connection with a memory schematically indicated 158.

The operation of the example system which includes the unit 138 is generally similar to that previously described. The unit may be programmed with the amount due by the service provider at the service provider station through operation of the charge device. This can be accomplished for example, through the output device 62 delivering signals to the reading device 154 which indicates the charge amount. These may be for example, infrared signals or other types of radiation signals. Of course as previously discussed, other types of electrical or electronic signals including physical electrical connections may be used.

Once programmed with the amount data, the unit 138 may be placed in the transfer tube and transferred to the customer station. Because the customer is enabled to remove the unit from the transfer tube, the customer does not have to extend themselves through a window of their vehicle to swipe their card and/or provide a PIN input, or input other data to the unit. Rather, the customer may provide the necessary inputs within the confines of their vehicle in the drive-through lane adjacent to the customer station.

Once programmed with the information, the unit 138 may then be placed in the customer terminal by the customer and transported to the service provider terminal. At the service provider station, the service provider may remove the unit from the tube and receive the account information from the output device 152 so as to assess the charge to the customer account in a manner like that previously discussed. The successful assessment of the charge may also cause the charge device to output signals which are received by the carrier so as to erase the customer information from the memory.

In this alternative embodiment, because the carrier is removable from the tube, the service provider may deliver items to the customer through use of an alternative carrier. Such an alternative carrier is schematically indicated 160 in FIG. 4. The carrier 160 may be similar in configuration to the unit 138 but may include an interior area in which items may be stored and transferred between the customer and the service provider. As a result, the example systems including the unit 138 may employ carriers only intended for transferring items in transactions where it is not necessary to receive account data from the customer. In those transactions where it is necessary to receive debit or credit card data, the other carrier may be removed from the system by the service provider and the unit 138 used to transfer the necessary account data. Of course it should be understood that unit 138 and its method of use are merely examples and in other embodiments other approaches may be used.

Figure 7:
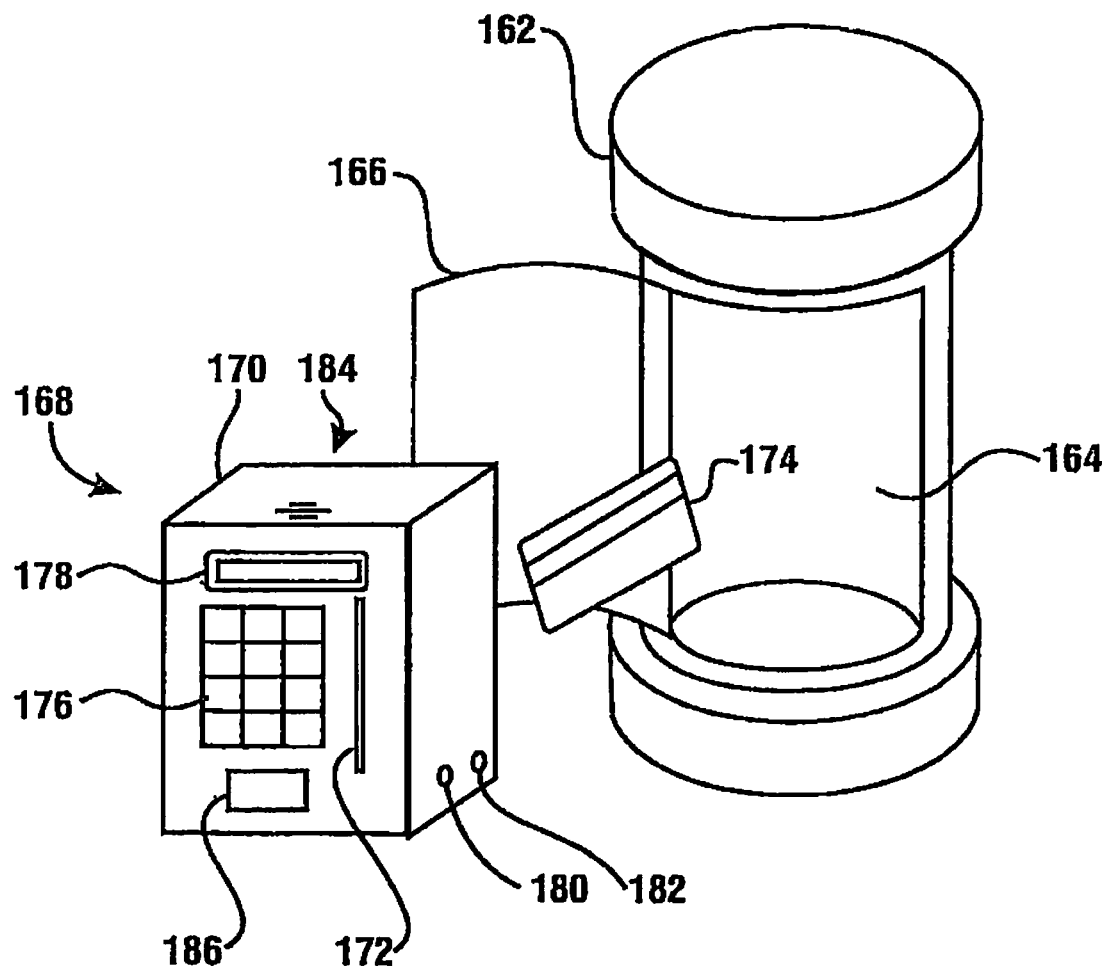
FIG. 7 is an isometric view of an alternative embodiment of a carrier and transaction data transfer unit that may be removably positioned in an interior area of a carrier or in an alternative device for transferring the unit between a customer and a service provider, such as a movable drawer.

FIG. 7 shows yet a further alternative embodiment of a data transfer unit which may be used to deliver account information from the customer to the service provider. FIG. 7 shows a carrier 162 of a type that is removable from the transfer conduit. Carrier 162 includes an interior area 164. Access to interior area 164 is controlled by removable cover 166.

A data transfer unit 168 is removably positionable in the interior area 164. In this embodiment the data transfer unit may be moved between the service provider and the customer in a manner similar to other items that are exchanged between the service provider and the customer. Unit 168 includes a body 170 sized to be removably positioned in the interior area 164. Body 170 includes in supporting connection therewith a card reader schematically indicated 172 for reading cards such as card 174 as shown. It should be understood that although card 174 shown is a magnetic stripe card, other embodiments may be capable of reading smart cards or other types of cards which include account information or data representative of monetary value. Unit 168 further includes a keypad 176 including the plurality of keys and a display 178. Body 170 also has supported thereon an output device 180 and a reading device 182. It should be understood that body 170 further includes a processor and a memory and may be operated in a manner similar to that described in connection with other described embodiments.

Alternative embodiments may also include other types of input and output devices in addition to or different from those previously described. For example unit 168 may include audio output devices such as a speaker schematically indicated 184. Such an output device may be useful in providing instructions for operation of the device by persons who are visually impaired. In addition or in the alternative, unit 168 may include a device and appropriate programmed instructions to receive and interpret verbal inputs from users. Alternatively or in addition, unit 168 may include a device for reading biometric indicia such as fingerprint reader 186. In some embodiments biometric indicia may be received for purposes of identifying a particular user and/or their account. Such information may be received and stored by the unit and transferred to the charge device or other device at the service provider station. Such information may be used to verify that the transaction is authorized or that the user is a person who is authorized to charge amounts against a particular account. Alternatively or in addition, biometric inputs may be compared to data stored on a card or in other local or remote memory for purposes of determining the identity of the particular user and their authority to conduct the transaction. This may be appropriate for example when a user is receiving medical items which are narcotics through the system. In such cases the biometric inputs may be used to further verify that the individual is authorized to receive the narcotics and/or may assist in tracking unauthorized transactions. Further in some embodiments inputs such as biometric inputs or other inputs may be compared to data stored on the user's card for purposes of verifying that the user's card is being used by the authorized user. This data may be stored for example on a memory chip on a card and the verification may be accomplished through the processor in the portable unit. Of course these approaches are merely example.

In alternative embodiments the portable unit may include other types of input devices suitable for accepting inputs from the user. For example, the unit may include a reader for reading other types of identifying items indicating how amounts are to be charged. This may include for example, readers for bar codes, radio frequency identification (RFID) or other types of items or signals bearing identifying indicia. As a result the portable unit may be used for reading items such as benefit plan cards or hospital ID bands. Such items may be used to communicate information on how to assess charges, including charges to be assessed to third parties. The information may be transmitted to the charge device and utilized for purposes of assessing appropriate charges, tracking medication use, or other purposes.

The operation of the unit 168 shown in FIG. 7 in connection with the transaction system may be generally similar to that previously described. A further advantage of the unit 168 shown in FIG. 7 is that the unit may also be provided to customers other than by delivery through the pneumatic tube conduit. For example unit 168 may be passed to a customer through the opening in the wall 16 by extending and retracting the movable deal drawer 20. In this way a customer located at customer station 21 may use the unit 168 to provide card and/or PIN data for purposes of carrying out transactions with the service provider.

In alternative embodiments the carrier or other unit may also serve to perform other functions. For example, memory in the portable unit may be used to hold .wav files or other data that can be used to provide audio outputs. Such audio outputs may be used to provide the user with instructions for use of the items delivered. For example, audio instructions may be associated in a database in the establishment with an item being provided to the user. As a result when the item is indicated as being sold through the charge device, or in response to other inputs such as scanning a bar code on the item, a computer in the establishment operates to cause the data to produce the audio instructions to be loaded into the memory of the portable unit. Thereafter when the user is to receive the items, such as in a carrier, or at another time, the audio instructions may be output through a speaker on the carrier or other connected speaker. Alternatively such instructions may be provided by a pharmacist for the particular user or for the particular items. The pharmacist's instructions may be stored as data and transferred to the memory in the carrier or other unit from which they are output to the user. In some embodiments the processor may be programmed to enable a user after receipt of the instructions to repeat them by providing one or more inputs. Of course these approaches are merely examples and in other embodiments other approaches may be used.

In some alternative embodiments the portable unit may also be utilized to perform other functions. For example, persons may carry medical history data on a card or other device. The portable unit may include a suitable card reader or other input device for receiving such data. Such information may be transmitted to the provider of the item who can input such data into a computer system that looks for allergies or possible instructions with the items currently being provided to the user. In this way the provider of the item can reduce the risks of such problems with the items being provided. Additionally, the portable unit may include the capability for delivering data to supplement medical data on a card or other item bearing medical information about the user. For example the portable unit may be programmed to update the data stored on a user's medical history card. The user may update the data through a writer device on the portable unit by engaging the user's medical history card therewith. Of course these approaches are merely examples, and in other embodiments other approaches may be used.

Figure 11:
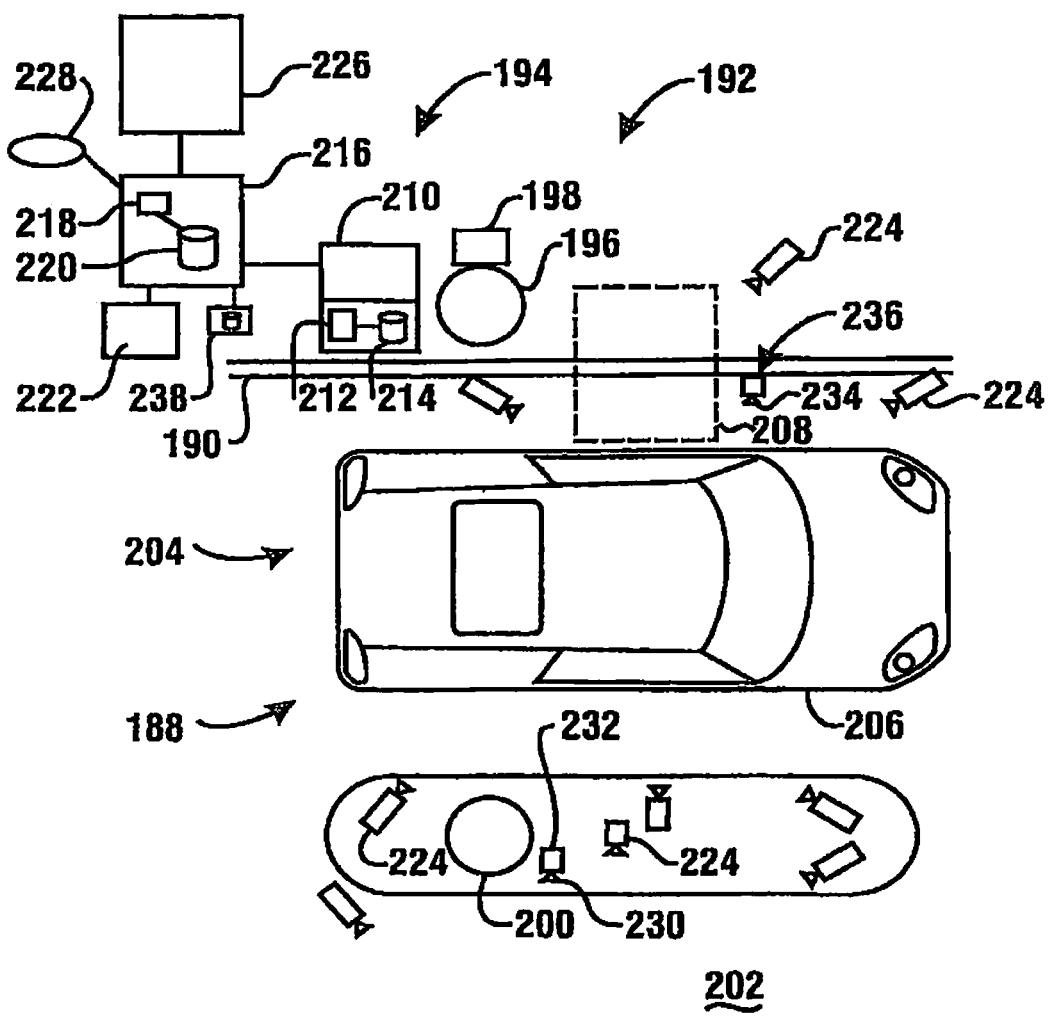
FIG. 11 is a top schematic view of an alternative form of an example apparatus.

FIG. 11 shows a further alternative system generally referred to as 188. System 188 may include features like those previously discussed. In this example system there is included a facility 190. For purposes of this example description, the facility 190 will include a pharmacy of the type previously discussed. However, it should be understood that in other embodiments other facilities such as banking facilities, or facilities which provide goods or services to users, may be used.

Facility 190 includes an interior area 192. Interior area 192 includes a service provider station 194. The service provider station includes a service provider terminal 196. Service provider terminal 196 of this example embodiment comprises a pneumatic carrier delivery and receiving device of the type previously described. The service provider terminal is in operative connection with a control panel 198 which is operative to receive inputs from a service provider for purposes of communicating with customers and causing a pneumatic carrier to move between the service provider terminal and a customer terminal 200. In this example embodiment, customer terminal 200 is a transaction device which enables delivery and receiving of a pneumatic carrier of the types that have been described. Of course it should be understood that this type of transaction device is example, and in other devices other types of transaction devices may be used. In this example embodiment, the customer terminal 200 is positioned adjacent to a drive-through lane 202. Customers are enabled to move through the drive-through lane in their vehicles. When stopped at a position adjacent to the customer terminal 200, a customer in a vehicle is enabled to carry out transactions by communicating with and exchanging items with a service provider at the service provider station. Although it is not specifically shown, system 188 may include devices for audio communication between the service provider and the customer of the types previously described. This may include microphones and speakers adjacent to each station.

The example system 188 further includes another drive-through lane 204. Vehicles are enabled to pass through drive-through lane 204, and an example vehicle 206 is shown. A deal drawer 208 serves as a transaction device which can be used to exchange items with customers at a position adjacent the transaction device in the customer vehicle. Of course it should be understood that while in this example embodiment a drive-through type transaction environment is shown, in other embodiments other types of transaction systems, such as walk up systems or other types of systems, may employ the principles described.

The example embodiment further includes within the facility at least one computerized transaction device 210. Computerized transaction device 210 includes, as schematically indicated, a processor 212 which is in operative connection with at least one data store 214. The example computerized transaction device may be a charge device providing some or all of the functions previously described, or may provide other or additional functions. The computerized transaction device of the example embodiment is operative to record at least one data item that is associated with each transaction. This may include, for example in the example pharmacy transaction environment, information about the prescription which is filled, the medications or other items provided to the user, information about the cost of the items, information about the manner in which payment is made, information about the account from which payment is made, and other or different information as may be pertinent to the transaction.

In the example embodiment, the facility further includes therein at least one computer 216. Computer 216 includes at least one processor 218 which is in operative connection with at least one data store, schematically indicated 220. It should be understood that for purposes of this disclosure references to a computer shall be deemed to include references to a single computer as well as multiple computers. Likewise, a reference to a processor includes one or more processors. Likewise, a reference to a data store shall be deemed to include a single data store or multiple data stores.

The example embodiment of the facility further includes a digital video recording device, schematically indicated 222. Device 222 may be a device that operates using the principles described in the incorporated disclosure of U.S. application Ser. No. 09/414,290. Of course in other embodiments other types of digital recording devices may be used. In the example embodiment, device 222 is operative to enable the recording of both image data as well as audio data that is associated with transactions. Device 222 is in operative connection with a plurality of cameras 224. Cameras 224 of the example embodiment are operative to provide image data from a variety of points of view. This includes, for example, within the interior of the facility as well as externally of the facility and adjacent to the drive-through lane. Further in the example embodiment, device 222 may be in operative connection with the control panel 198 including the microphones and speaker devices included therein so as to enable the recording thereof. Alternatively or in addition, the device 222 may be in operative connection with microphones positioned within and outside the facility for purposes of recording audio communications between the service provider and customers positioned adjacent to the transaction devices.

In still other embodiments, the device 222 may be in operative connection with cameras and audio receiving devices that are included on carriers or other items that are passed between customers and the service provider. This may include, for example, cameras and microphones that communicate wirelessly between the carrier and the device 222. Such a system may be used, for example, to record the playing of the audio outputs that are stored in the carrier to assure that a customer has received them. Alternatively or in addition, such cameras and microphones on the carrier may be used to further document the user verbal responses to questions from a service provider or a pharmacist. Alternatively or in addition, the recording of camera signals from the carrier may help to record the image of the user for purposes of documenting the transaction. Alternatively or in addition, if a fingerprint reader or other biometric input device is included on a carrier, inputs to such a device may also be converted to data which is captured through operation of the device 222. Of course these approaches are merely examples.

In still other embodiments, the device 222 may be in operative connection with systems of the type described in the incorporated disclosures of U.S. Pat. Nos. 6,711,460 and/or 7,630,788. The device 222 may be operative to record visual and audio signals associated with the preparation of pharmacy items by robotic devices or persons at the pharmacy. Alternatively or in addition, the device 222 may be operative to record video and audio communications between customers and pharmacists. This may include communications with pharmacists located at the facility or pharmacists or other professionals such as a physician communicating with the facility through remote communications. The delivery of the items, receipt of cash, and other transaction steps may also be included in captured image data and audio data, and stored through operation of the device 222. Of course it should be understood that these approaches are merely examples.

It should also be pointed out that, although the example system is described in connection with activities that are conducted in a pharmacy, other embodiments may be used in connection with banking and/or other types of transaction environments.

In the example system 188, the at least one computer 216 is in operative connection with output devices schematically indicated 226. Output devices 226 of the example embodiment includes devices which can provide reports of desired information. Such desired information may be output through visual displays, printers or other types of output devices from which information may be perceived. Further, in some embodiments the at least one computer 216 may be in operative connection with one or more networks 228. The one or more networks may comprise local area networks or wide area networks of a public or private type to enable the data stored through operation of the system to be sent to and/or analyzed by authorized computers at other facilities.

The example system 188 further includes a vehicle sensor 230. Vehicle sensor 230 is operative to sense a vehicle in a position adjacent to the transaction device 200 in the drive-through lane 202. The vehicle sensor 230 of the example embodiment may be of a suitable type, such as an ultrasonic sensor, a photoelectric sensor, an inductance sensor, a reflectance sensor, a weight sensor or other sensor that can detect a vehicle in the position. Vehicle sensor 230 of the example embodiment includes a communication device 232. Communication device 232 may comprise a suitable device for communicating signals from the vehicle sensor to remotely indicate the presence of a vehicle in the position adjacent the transaction device. Suitable communication devices may include, for example, a local area network interface card or an X10 interface which communicates through electrical wiring. In other embodiments the communication device may comprise a wireless communication device. Such wireless communication devices may include transmitters and/or transceivers that communicate via radio frequency (RF), infrared (IR) or other suitable wireless signals. Of course these approaches are merely examples.

The system 188 further includes a further vehicle sensor 234 and a further communication device 236 operative to sense a vehicle in the position in the drive-through lane 204. Vehicle sensor 234 and communication device 236 may be the same as or different from vehicle sensor 230 and communication device 232. Of course these approaches are merely examples.

Signals from the vehicle sensors and the communication devices are received by at least one receiving device 238. Receiving device 238 is operative to receive one or more signals from each of the communication devices, and to communicate with the at least one processor 218 in the computer 216. The computer 216 executes instructions stored in the at least one data store 220 to carry out certain desirable functions which may be useful in documenting activities that are carried out through operation of the system.

Figure 12:
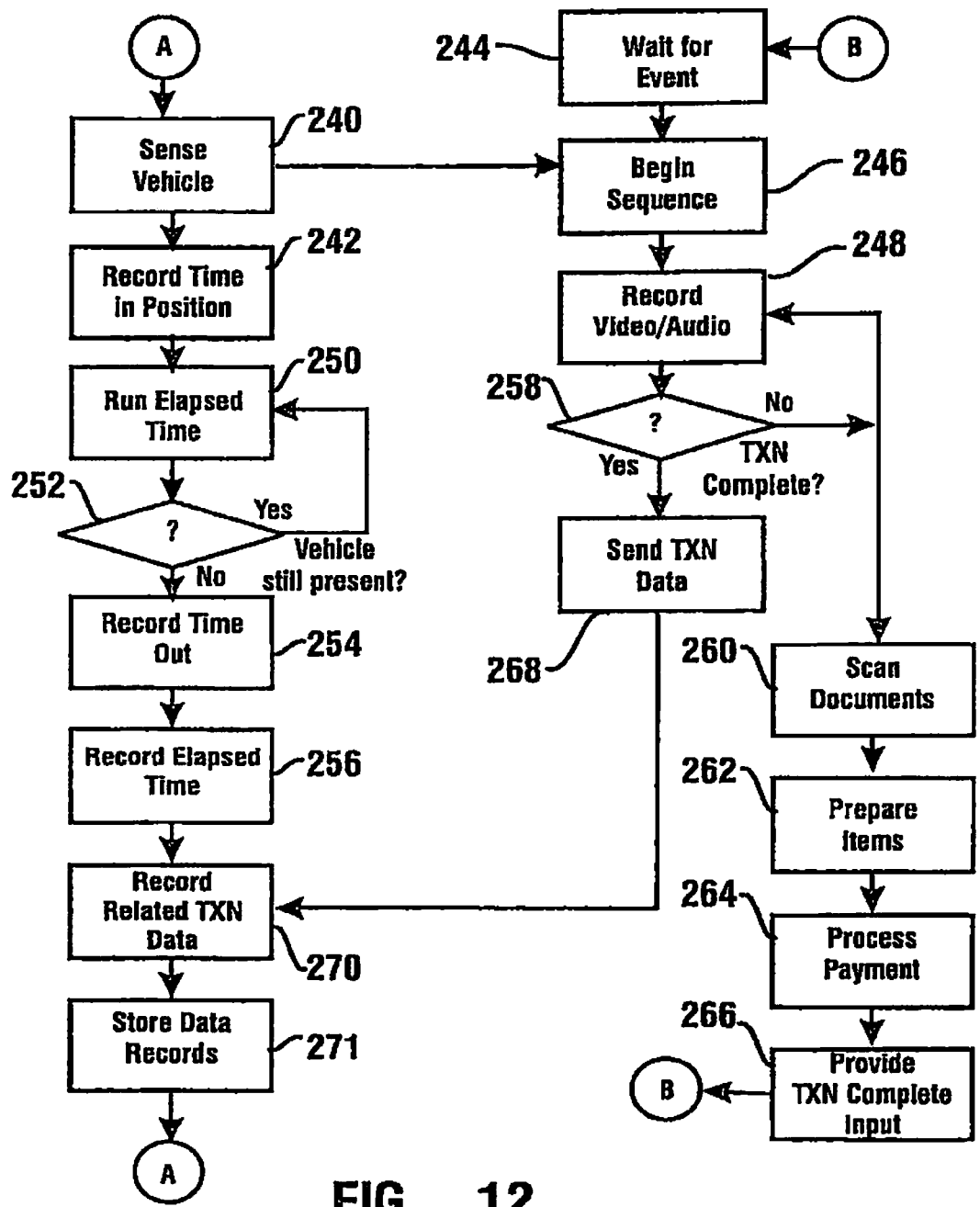
FIG. 12 is a schematic view of example transaction steps carried out with the apparatus of FIG. 11.

FIG. 12 shows schematically an example logic flow that is carried out through operation of the at least one computer 216 and the connected devices 220 and 210 of an example embodiment. In the example system, a receiving device 238 is operative to receive at least one signal indicating that a vehicle is in the position adjacent the transaction device in one of the drive-through lanes. This is represented by a step 240. In example embodiments, step 240 may include the execution of one or more routines by the at least one computer to verify that the signals received in fact indicate a vehicle is present in one of the drive-through lanes, rather than an anomalous signal. Alternatively or in addition, the at least one computer 216 may execute instructions that are operative to verify that the signals correspond to a vehicle that is stopped in the position adjacent to a transaction device, rather than a vehicle or other item passing through the drive-through lane. The at least one computer may also operate, based on the signals, to resolve which of the drive-through lanes a particular vehicle is located in. Of course these approaches are merely examples.

Responsive to determining that a vehicle is in a position adjacent to a transaction device, the computer 216 is operative to record the time at which the vehicle enters the position. This is represented by a step 242.

In the example embodiment, the at least one computer 216 is also operative to communicate with the digital video recorder device 222 and to indicate that a vehicle is in position. The digital video recorder device, which also includes at least one processor and at least one data store, changes from a state 244 in which it is waiting for a triggering event to a state 246 in which a triggering event has been indicated. This triggering event causes the device 222 to operate in a manner like that described in the incorporated disclosure to begin capturing data corresponding to images from selected cameras, such as cameras located at the service provider station as well as cameras with a field of view that includes the drive-through lane where the particular vehicle has been sensed. The triggering event may also cause the device to begin capturing data corresponding to audio signals as well. This is represented in a step 248.

The at least one computer 216, after recording the time in which the vehicle entered the position adjacent the transaction device, then operates an elapsed timer in a step 250. As represented in a step 252, the at least one computer continues to operate the elapsed timer until the vehicle is no longer sensed by the respective vehicle sensor as present at the position adjacent the transaction device.

When the vehicle is no longer sensed as present, the at least one processor in the computer 216 is operative to record the time at which the vehicle is no longer adjacent the transaction device. This is represented by a step 254. The at least one computer is also operative, responsive to the vehicle no longer being sensed, to record and resolve the elapsed time that the vehicle was in the position adjacent the transaction device. This is represented by step 256.

Before the vehicle leaves the position adjacent the respective vehicle sensor, the at least one device 222 continues to operate as represented in a step 258 to determine if the service provider has indicated that the transaction being carried out is complete. If there is no indication that the transaction is complete, the device 222 continues to operate in accordance with its programming to capture data corresponding to images and audio information. This is represented by step 248. In addition in the example embodiment, the device 222 is operative to capture data associated with aspects of the transaction. This includes, for example, capturing images corresponding to scanned prescriptions that are provided to the service provider. This may be done, for example, by the service provider receiving a prescription from the user and the service provider scanning the written prescription through operation of at least one scanner in operative connection with the device 222 or other connected device. Alternatively or in addition, the prescription data may be accessed online and captured. This may be done through operation of online image capture tools and/or by a screen scraper. Alternatively or in addition, operation of a pharmacy in connection with systems of the type described in U.S. Pat. No. 6,711,460 may result in certain online documents being available. The capture of data corresponding to these documents is represented by a step 260.

In the example embodiment the service provider, either directly or in conjunction with a local or remote pharmacist or a robotic device, may prepare and provide the pharmacy items or other items requested by the customer. The preparation of these items results in recording of data items associated therewith. Such data items may include image data associated with the compounding of medications, the counting of pills from storage areas, the preparation of packaging, the application of labels, the printing or recording of instructions, and/or other activities. The data items associated with such activities may be stored through operation of device 222 and/or the at least one computer 216. This is represented in FIG. 12 by a step 262.

In the example embodiment the at least one transaction includes the processing of payments for the particular items or services that are delivered. In the example embodiment this is done through operation of the computerized transaction device 210. The data recorded through operation of device 210, such as the item information, account number data and quantity data, may be transmitted to the device 222 and/or the at least one computer 216. Alternatively or in addition, data corresponding to images captured by the cameras, the carrier or other information related to the transaction and the processing of payment may be captured and stored. This is represented by a step 264.

After the processing of payment, the service provider is operative to provide at least one input through at least one input device to indicate that the transaction is complete. This is represented by a step 266. In the example embodiment, such an input may be provided through the at least one computerized transaction device. Of course this approach is example.

It should be understood that although the functions described in connection with steps 260, 262, and/or 264 are discussed as being carried out by certain of the devices including processors and data stores which are present within the facility, these approaches are merely example. In other embodiments a single computer or multiple computers in various locations may carry out selected functions of the types that have been described. Further, other systems of embodiments may carry out additional functions related to the fulfillment of transactions of the type that are being conducted at the facility.

In the example embodiment in step 258, the indication from the service provider that the transaction is complete causes the device 222 to send the captured transaction data to the at least one computer 216. This is represented in a step 268. The at least one computer then operates in accordance with its programmed instructions to record the transaction data and associate the transaction data, time values and other information associated with the transaction as is appropriate for storage of the data records corresponding to the transaction in the at least one data store. This is represented in a step 270. The at least one computer then operates to store the associated records in the at least one data store, as represented by a step 271.

It will be appreciated that the at least one computer 216 causes the at least one processor therein to operate so as to produce records that correlate the one or more time values associated with the sensing of vehicles with at least one data item that is provided through the at least one computerized transaction device. This data is useful for purposes of analysis, and can be used for documenting transactions as well as making improvements in the overall operation of the system.

For example, the at least one computer 216 may operate in accordance with its programmed instructions to provide reports and outputs through one or more output devices 226. Such reports may include information that can be recovered from the data store in operative connection with the at least one computer or other devices connected in the system. For example, such reports may be used to document the events that occurred in transactions and/or the person who was involved in a particular transaction. Such information may also be used to determine the length of time that a vehicle was present at a position adjacent to the transaction device, as well as the events which occurred during such time. Such information may be used to help to improve efficiencies by studying the transaction information. Further, as will be appreciated, embodiments may be used to minimize the risk of fraud and the improper use of medications. Of course these approaches are merely example.

Figure 13:
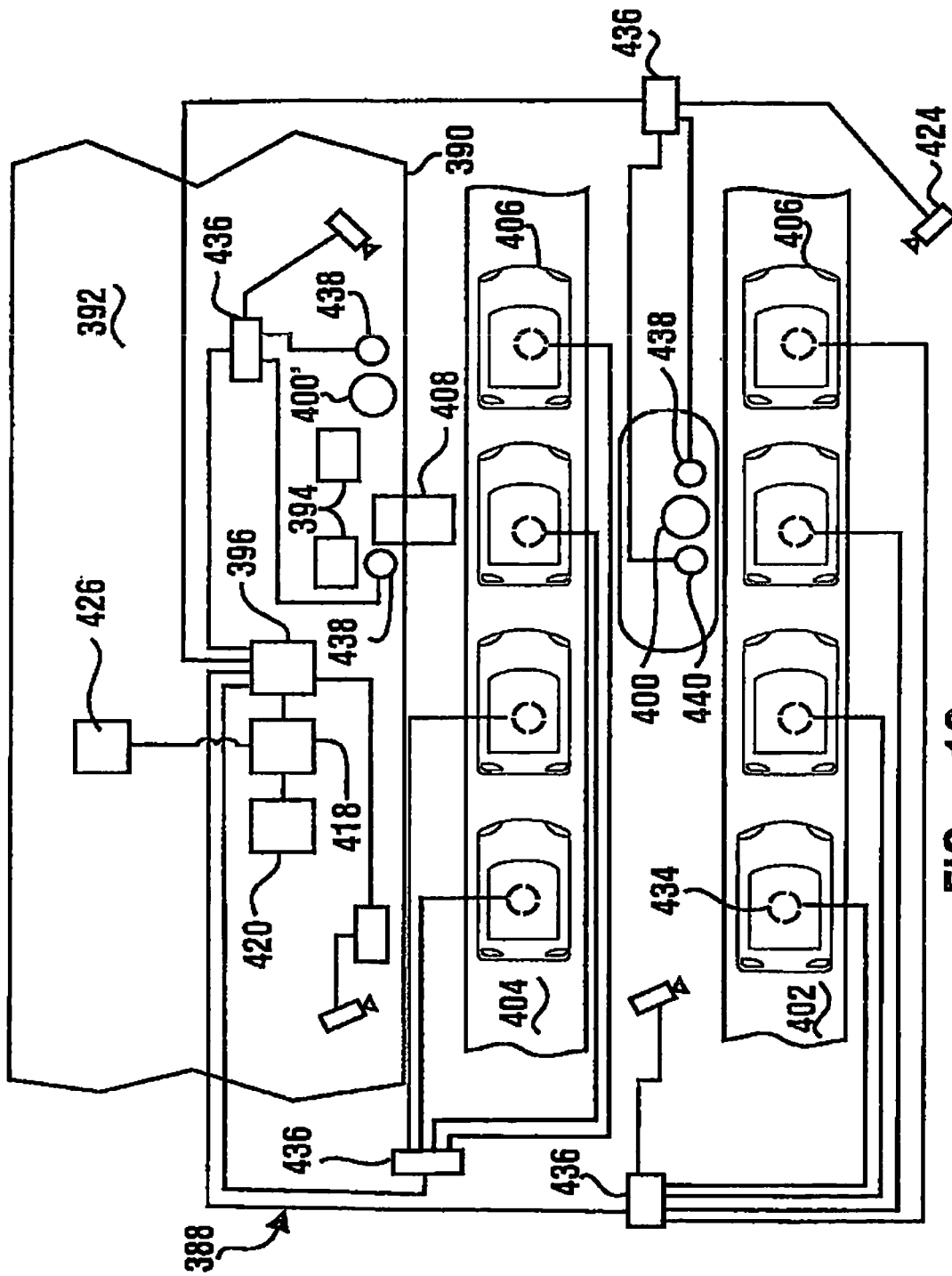
FIG. 13 is a schematic view of an alternative form of an example system.

Referring now to FIG. 13, an alternative example embodiment is shown of a system 388 comprising a facility 390 adapted to accomplish transactions. The facility 390 may, by way of example only, be a pharmacy or a bank or any of a wide variety of commercial venues which provide goods and/or services to persons by way of at least one drive-through or through lane 402, 404. Thus, vehicles 406, including automobiles and trucks, as well as persons on bicycles or motorcycles, or even on individuals on foot, may engage in transactions with service providers at a service provider station 394 within an interior 392 of the facility.

In the example embodiment shown in FIG. 13, the interior 392 of the facility 390 includes a telephone system 396. Example telephone systems 396 include, but are not limited to, a Private Branch eXchange (PBX), also known as a Private Business eXchange or Private Automatic Branch eXchange (PABX). Such systems are known in the art and have the capability of providing a variety of telephone features within the commercial business enterprise. Also included are at least one processor 418 in operative connection with at least one data store 420 and in operative connection with the telephone system 396. The processor 418 is in further operative connection to at least one output device 426. As will be appreciated, the processor 418 may be a computer or other apparatus capable of manipulating data according to a list of instructions, and the processor 418, the data store 420, and/or the output device 426 may comprise a portion of the telephone system 396. As it will also be appreciated in some embodiments, one or more processors may be embodied in each of the variety of sensors 434, 438, 440. Further, the output device 426 may include, by way of example only, a further processor, a computer screen, a digital storage device such as a hard drive, optical disk storage media such as a compact disk (CD) or digital versatile disk (DVD), or solid state drives such as flash drives. Such output devices 426 may be local to the facility 390 or remote. Of course these approaches are merely examples.

Further included in the example system 388 shown in FIG. 13 is at least one transaction device 400, 400.sub.C, 408 through which items are exchanged between a service provider (not shown) at a service provider station 394 within the interior 392 of the facility and a person (not shown) in a vehicle 406 at a position in the through lane 402, 404 adjacent the transaction device 400, 408. Various types of transaction devices 400, 400.sub.C, 408 may be utilized. For example, a deal drawer 408 may be utilized when engaging in a transaction with a person in a vehicle 406 in the at least one through lane 404 adjacent to the interior 392 of the facility 390. Alternatively, by way of example only, a person in a vehicle 406 in the through lane 402 may exchange items with a service provider within the interior 392 of the facility 390 via a pneumatic tube transaction device 400, 400.sub.C.

Still further included in the example system 388 shown in FIG. 13 may be at least one transaction initiator (not shown) which may include, by way of example only, a "CALL" button by which the service provider may be alerted to the need to provide service to a person in a vehicle 406.

Still further included in the example system 388 shown in FIG. 13 is at least one vehicle sensor 434. The vehicle sensor 434 is adapted to sense the presence of a vehicle 406 at a position in the through lane 402, 404. The vehicle sensor 434 may comprise, by way of example only, an inductive sensor, a load sensor, a laser, infrared, or other light beam sensor, or, by way of a video camera 424, visual recognition. Such vehicle sensors 434, when appropriately placed, are capable of sensing a variety of data regarding the position of a vehicle 406 in the through lanes 402, 404. In some example systems, it may be desirable to detect the arrival of a vehicle 406 at an entrance to a through lane 402, 404, the arrival of a vehicle 406 at a position adjacent to the transaction device 400, 408, the departure of a vehicle 406 from the position adjacent to the transaction device, the arrival of a vehicle 406 at a position at an exit from the through lane 402, 404, and the departure of a vehicle 406 from the position at the exit from the through lane 402, 404. Of course these sensing locations are merely examples.

Optionally included in the example system 388 shown in FIG. 13 is at least one transaction sensor 438 associated with the transaction device 400, 400.sub.C, 408. Such transaction sensor 438 is adapted to sense events occurring during the transaction. In some embodiments a transaction sensor may be operative to sense the presence or movement of one or more device components or one or more signals that correspond to item exchange between the service provider and the customer. For example, one or more sensors may sense when the service provider responds to a transaction initiation, when the deal drawer 408 is extended toward the person in the vehicle 406 or withdrawn toward the service provider within the interior 392 of the facility 390, or when a item is sent via the pneumatic transaction device 400, 400.sub.C or returned to the service provider. Of course these events that are sensed are merely example.

Further optionally included in the example system 388 shown in FIG. 13 is at least one transaction initiation sensor 440, 440.sub.C associated with a transaction initiator (not shown) such as a "CALL" button which would be activated by the person in the vehicle 406 or the opening of a circuit to enable voice communication which would be activated by the service provider. Such transaction initiation sensor 440, 440.sub.C is adapted to sense, for example, signals generated by a switch or other device that are generated responsive to the depressing of the "CALL" button alerting the service provider to the presence of a person desiring to engage in a transaction or the initiation or acknowledgement by the service provider.

Importantly, the example system 388 shown in FIG. 13 comprises at least one telephone switching interface device 436 in operative connection with at least one sensor 424, 434, 438, 440. The telephone switching interface device 436 is further in operative connection with the telephone system 396 and the processor 418. Thus, the at least one sensor 424, 434, 438, 440 is in operative connection with the processor 418. The operative connection between the telephone system 393 and the telephone switching interface device 436, may, as an example only, be effected via conventional telephone wires and conductor jacks such as type RJ-11. The telephone switching interface device 436 is operative, responsive to a signal from the at least one sensor 424, 434, 438, 440, to establish communication with the telephone system 393 using, for example dual-tone multi-frequency (DTMF) signals. In an example embodiment, the telephone switching interface device 436 is a PBX interface device. Thus, numerous events associated with transactions at the facility 390 may be sensed and communicated to the processor 418 via conventional telephone lines.

The processor 418 of the example embodiment is operative to determine at least one time value corresponding to events associated with transactions at the facility 390 and store such in the data store 420. Further, such data may be made available to one or more output devices 426. The processor 418 may be further operative to determine, by way of example only, system metrics such as total vehicles 406, the wait time from entering the through lane 402, 404 to reaching the transaction device 400, 408, the wait time from requesting service with the transaction initiator to response by the service provider, the total time a vehicle 406 is at the transaction device 400, 408, and delay caused by a blocking vehicle 406 stopped at the exit from the through lane 402, 404. Finally, the processor 418, or other processor, may be operative to model, using, for example, discrete event simulation, the system 388, thus enabling alteration and improvement of the operation of the system 388 or the facility 390.

Figure 14:
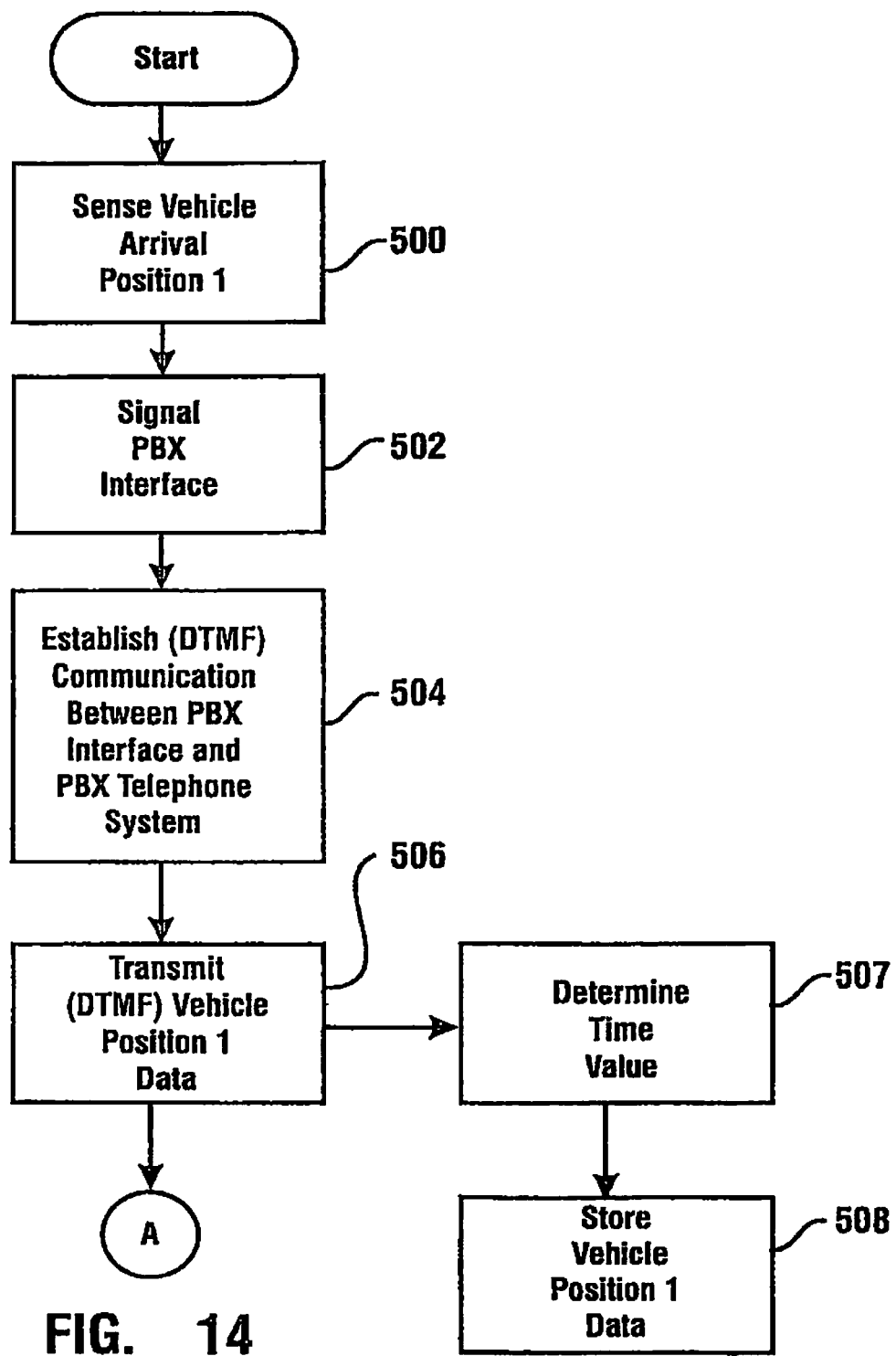
FIGS. 14 through 21 are schematic views of steps which are conducted through operation of an example system.

Example operation of the system 388 can best be understood by reference to FIGS. 14 through 23, in addition to FIG. 13. The arrival of a vehicle 406 at an entrance (nominally, Position 1, FIG. 14, Step 500) to the through lane 402, 404 is sensed by a vehicle sensor 434. (FIG. 14, Step 500.) The vehicle sensor 434 communicates a signal corresponding to the arrival of the vehicle 406 at the entrance to a through lane 402, 404 to the telephone switching interface device 436. (FIG. 14, Step 502.) The telephone switching interface device 436 establishes communication between the telephone switching interface device 436 and the telephone system 396. (FIG. 14, Step 504.) The telephone switching interface device 436 communicates to the processor 418 at least one signal corresponding to the arrival of the vehicle 406 at the entrance to the through lane 402, 404. (FIG. 14, Step 506.) For example, the signal may comprise a through lane 402, 404 identifier (e.g., 101) and a position identifier (e.g., 001). The processor 418 determines a time value (FIG. 14, Step 507) associated with the signal corresponding to the arrival of the vehicle 406 at the entrance to the through lane 402, 404 and stores the data corresponding to the time value in the data store 420 (e.g., 01001 mmddyyyhhmmss). (FIG. 14, Step 508.)

Figure 15:
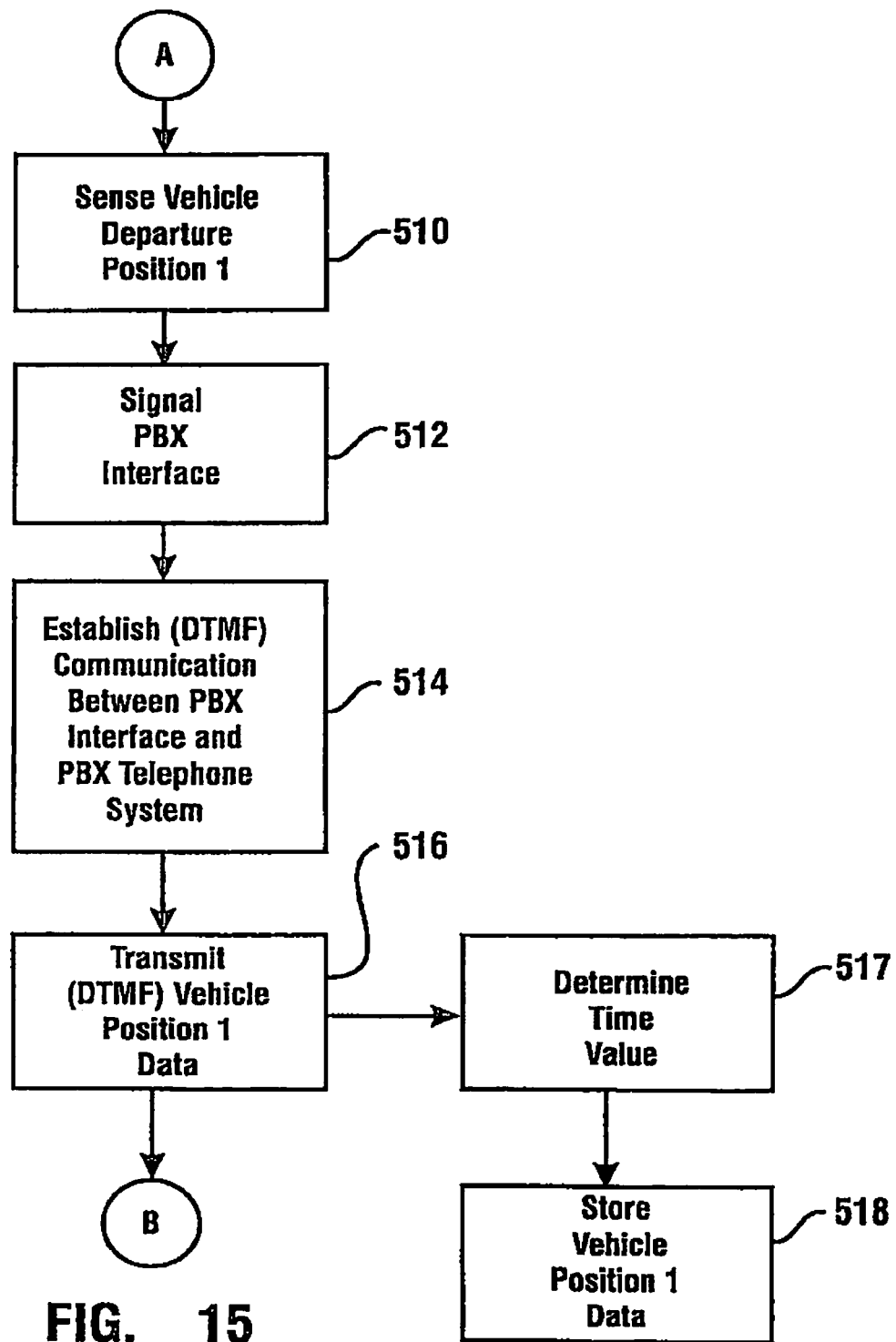

In an example embodiment departure of the vehicle 406 from the entrance to the through lane 402, 404 is likewise sensed by the vehicle sensor 434. (Position 1, FIG. 15, Step 510.) Similar to the steps outlined in FIG. 14, the vehicle sensor 434 communicates a signal corresponding to the departure of the vehicle 406 from the entrance to the through lane 402, 404 to the telephone switching interface device 436 (FIG. 15, Step 512). The telephone switching interface device 436 establishes communication between the telephone switching interface device 436 and the telephone system 396 (FIG. 15, Step 514). The telephone switching interface device 436 communicates to the processor 418 a signal corresponding to the departure of the vehicle 406 from the entrance to the through lane 402, 404 (FIG. 15, Step 516), and the processor 418 determines a time value (FIG. 15, Step 517) associated with the signal corresponding to the departure of the vehicle 406 from the entrance to the through lane 402, 404 and stores the data in the data store 420 (FIG. 15, Step 518). As will be appreciated by those skilled in the art, communication between the telephone switching interface device 436 and the telephone system 396 may not have to be reestablished if communication has not been terminated.

Figure 16:
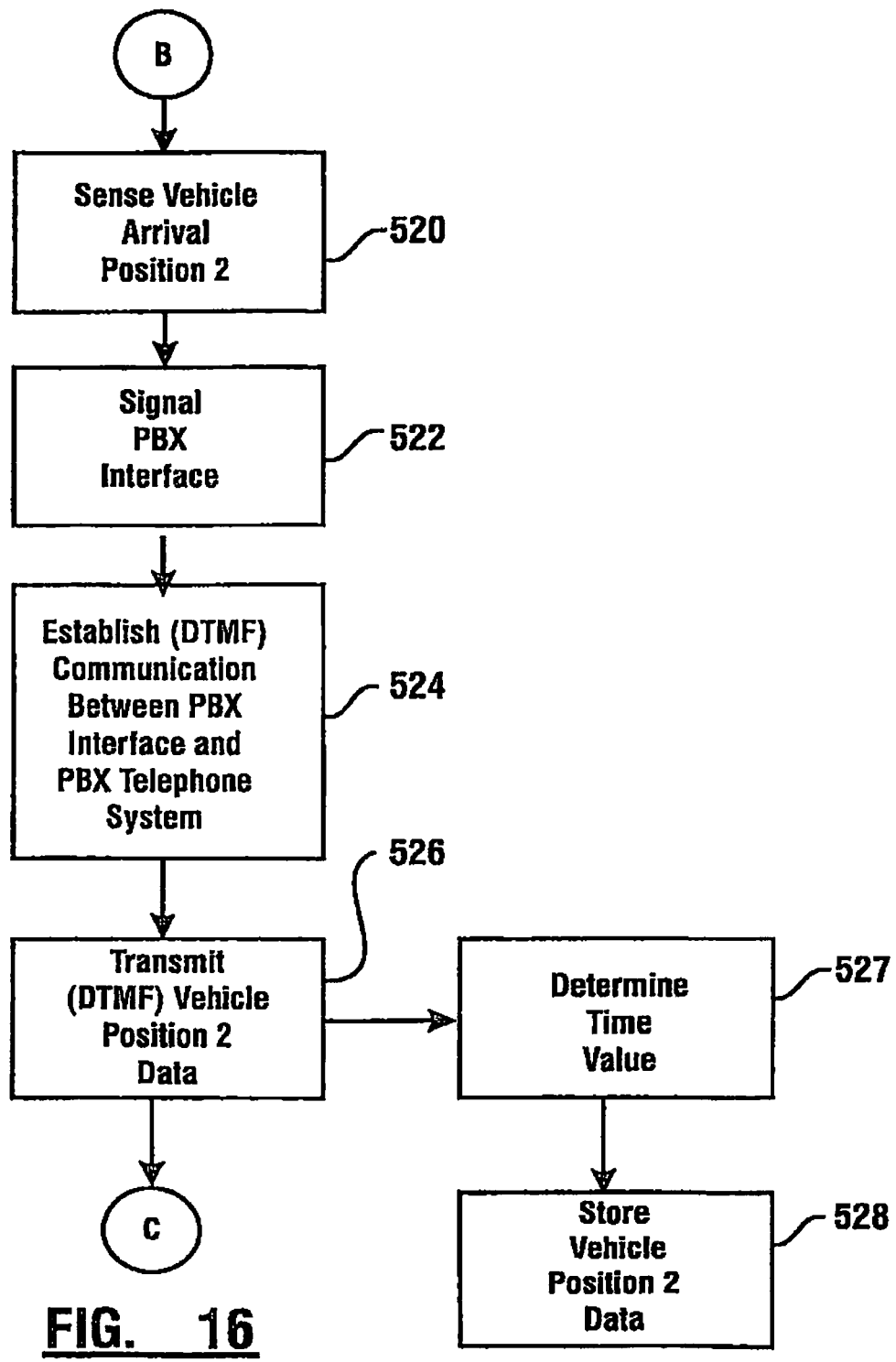

Similarly, in the example embodiment the arrival of a vehicle 406 at the position adjacent the transaction device 400, 408 (nominally, Position 2, FIG. 16, Step 520) in the through lane 402, 404 is sensed by the vehicle sensor 434. (FIG. 16, Step 520.) The vehicle sensor 434 communicates a signal corresponding to the arrival of the vehicle 406 at the position adjacent the transaction device 400, 408 to the telephone switching interface device 436. (FIG. 16, Step 522.) The telephone switching interface device 436 establishes communication between the telephone switching interface device 436 and the telephone system 396. (FIG. 16, Step 524.) The telephone switching interface device 436 communicates to the processor 418 at least one signal corresponding to the arrival of the vehicle 406 at the position adjacent to the transaction device 400, 408. (FIG. 16, Step 526.) The processor 418 determines a time value (FIG. 16, Step 527) associated with the signal corresponding to the arrival of the vehicle 406 at the position adjacent the transaction device 400, 408 and stores the data corresponding to the time value in the data store 420. (FIG. 16, Step 528.)

Figure 17:
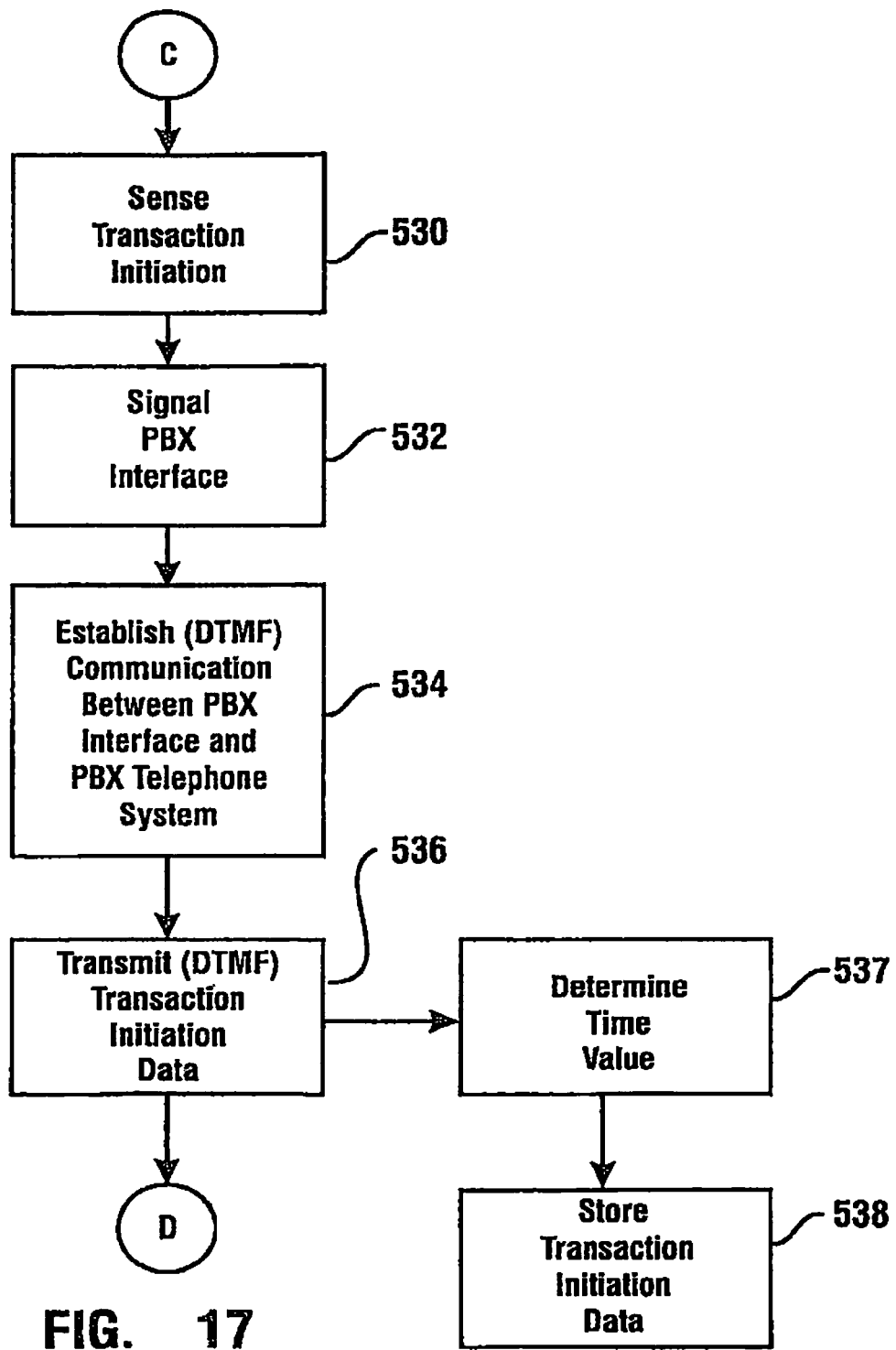

Upon arrival of the vehicle 406 at the position adjacent the transaction device 400, 408, the person in the vehicle 406 may press a "CALL" button to alert the service provider within the interior 392 of the facility 390. Such event is sensed by the transaction initiation sensor 440. (FIG. 17, Step 530.) The transaction initiation sensor 440 communicates a signal corresponding to the activation of the "CALL" button to the telephone switching interface device 436. (FIG. 17, Step 532.) The telephone switching interface device 436 establishes communication between the telephone switching interface device 436 and the telephone system 396. (FIG. 17, Step 534.) The telephone switching interface switching device 436 communicates to the processor 418 a signal corresponding to the activation of the "CALL" button. (FIG. 17, Step 536.) Alternatively, upon becoming aware of someone in need of service and before the person in the vehicle 406 presses the "CALL" button, the service provider may initiate the transaction by, for example, establishing voice communication. The processor 418 determines a time value (FIG. 17, Step 537) associated with the signal corresponding to the initiation of the transaction and stores the data corresponding to the time value in the data store 420. (FIG. 17, Step 538.)

Figure 18:
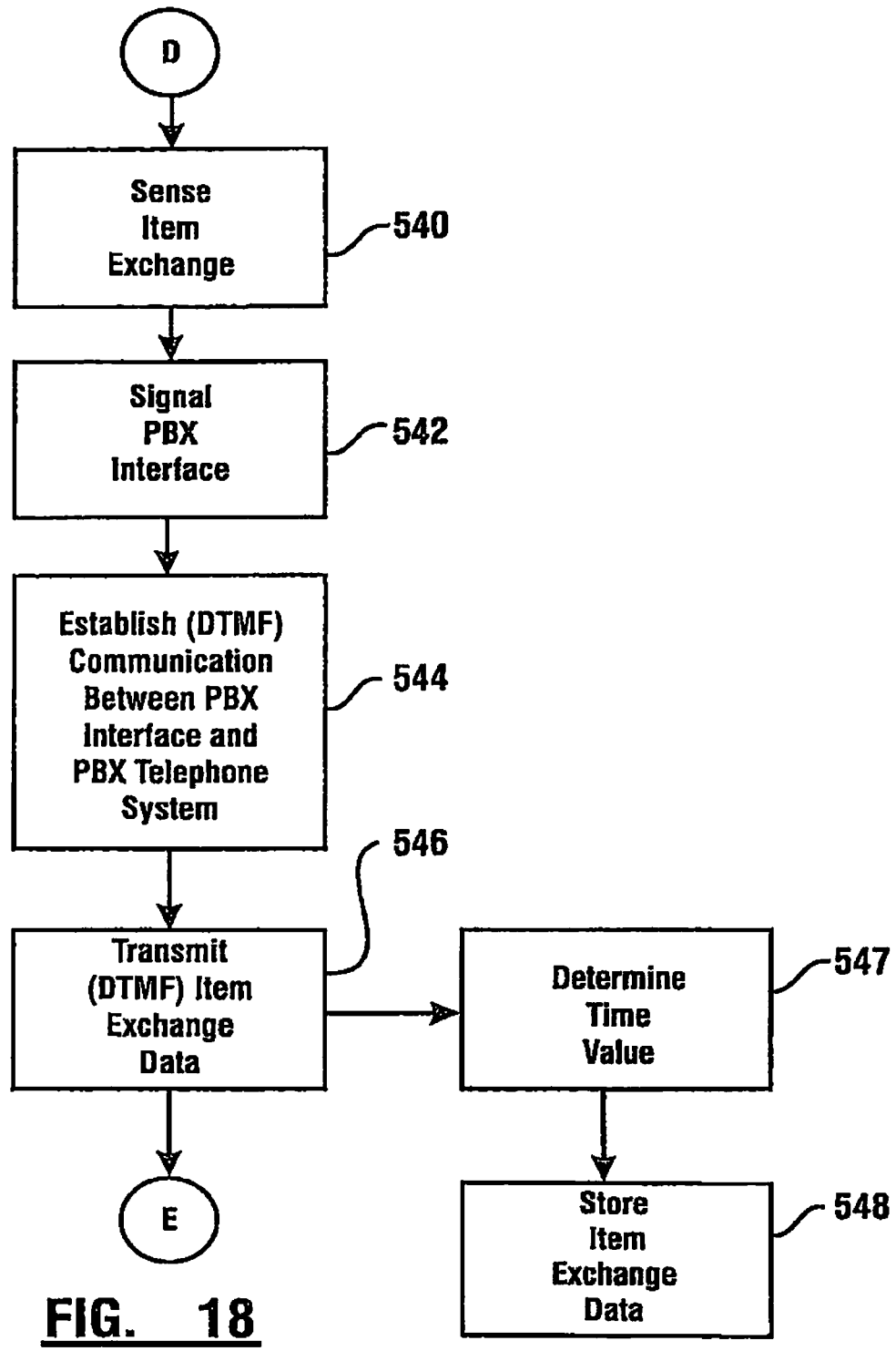

Turning now to FIG. 18, as the example transaction proceeds, an event corresponding to the exchange of at least one item is sensed by the at least one transaction sensor 438. (FIG. 18, Step 540.) Such event may comprise, by way of example only, the placing of an item in a position preparatory to an exchange, the departure from the interior 392 of an item, the arrival of an item in a position preparatory to withdrawal from the transaction device 400, 400.sub.C, 408, the removal of an item from the transaction device 400, 400.sub.c, 408, or combinations thereof. The transaction sensor 438 senses a device component or signal related to such item or activity and communicates a signal corresponding to an event corresponding to the exchange of at least one item to the telephone switching interface device 436. (FIG. 18, Step 542.) The telephone switching interface device 436 establishes communication between the telephone switching interface device 436 and the telephone system 396. (FIG. 18, Step 544.) The telephone switching interface device 436 communicates to the processor 418 a signal corresponding to an event corresponding to the exchange of the at least one item. (FIG. 18, Step 546.) The processor 418 determines a time value (FIG. 18, Step 547) associated with the signal corresponding to an event corresponding to the exchange of the at least one item and stores the data in the data store 420. (FIG. 18, Step 548.)

Figure 19:
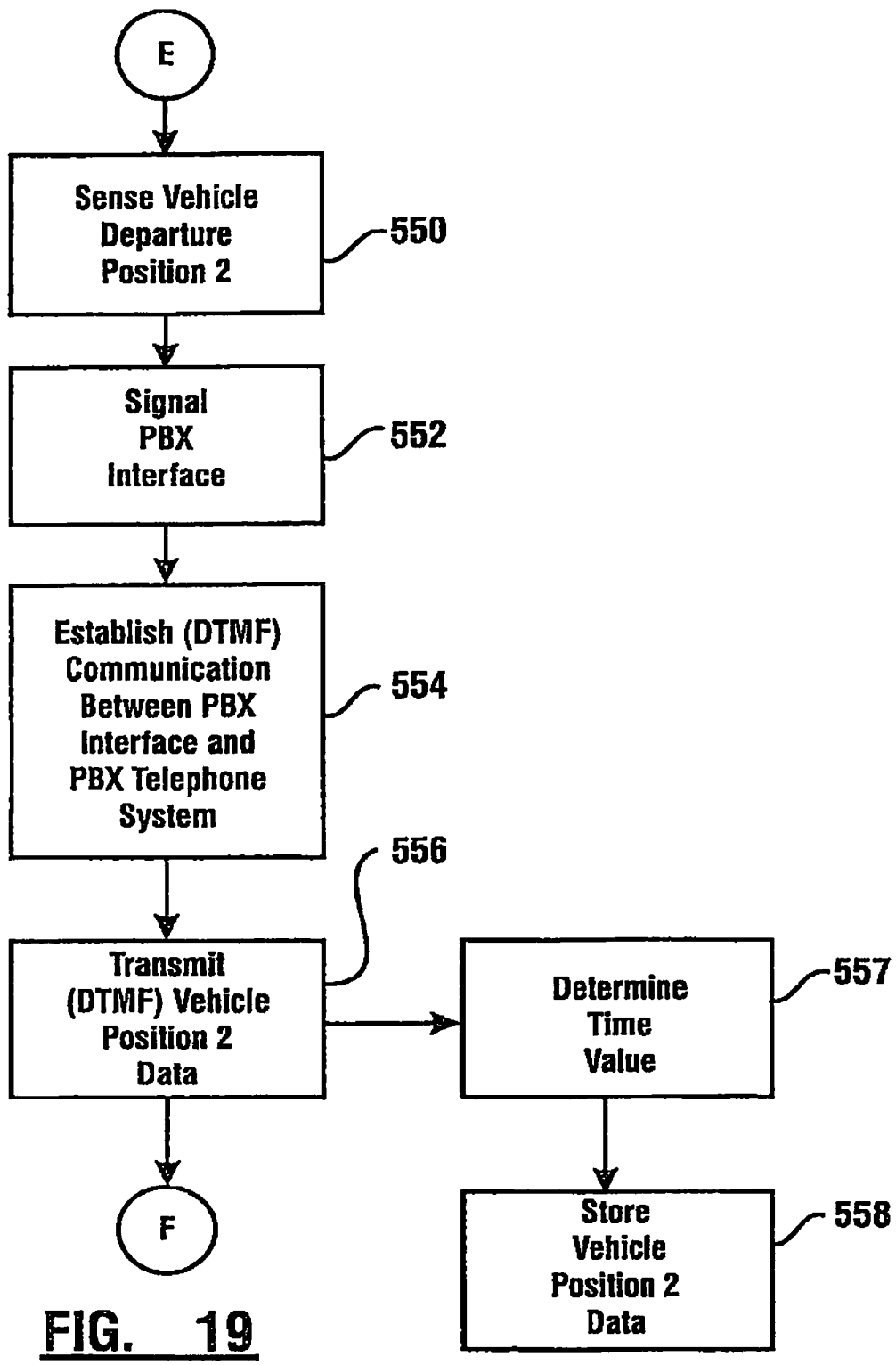

In the example embodiment, departure of a vehicle 406 from the position adjacent the transaction device 400, 408 (Position 2, FIG. 19, Step 550) in the through lane 402, 404 is sensed by a vehicle sensor 434. (FIG. 19, Step 550.) Similar to the steps outlined in FIG. 15, the vehicle sensor 434 communicates a signal corresponding to the departure of the vehicle 406 from the position adjacent the transaction device 440, 408 to the telephone switching interface device 436 (FIG. 19, Step 552), the telephone switching interface device 436 establishes communication between the telephone switching interface device 436 and the telephone system 396 (FIG. 19, Step 554), the telephone switching interface device 436 communicates to the processor 418 a signal corresponding to the departure of the vehicle 406 from the position adjacent the transaction device 440, 408 (FIG. 19, Step 556), and the processor 418 determines a time value (FIG. 19, Step 557) associated with the signal corresponding to the departure of the vehicle 406 from the position adjacent the transaction device 440, 408 and stores the data corresponding to the time value in the data store 420 (FIG. 19, Step 558).

Figure 20:
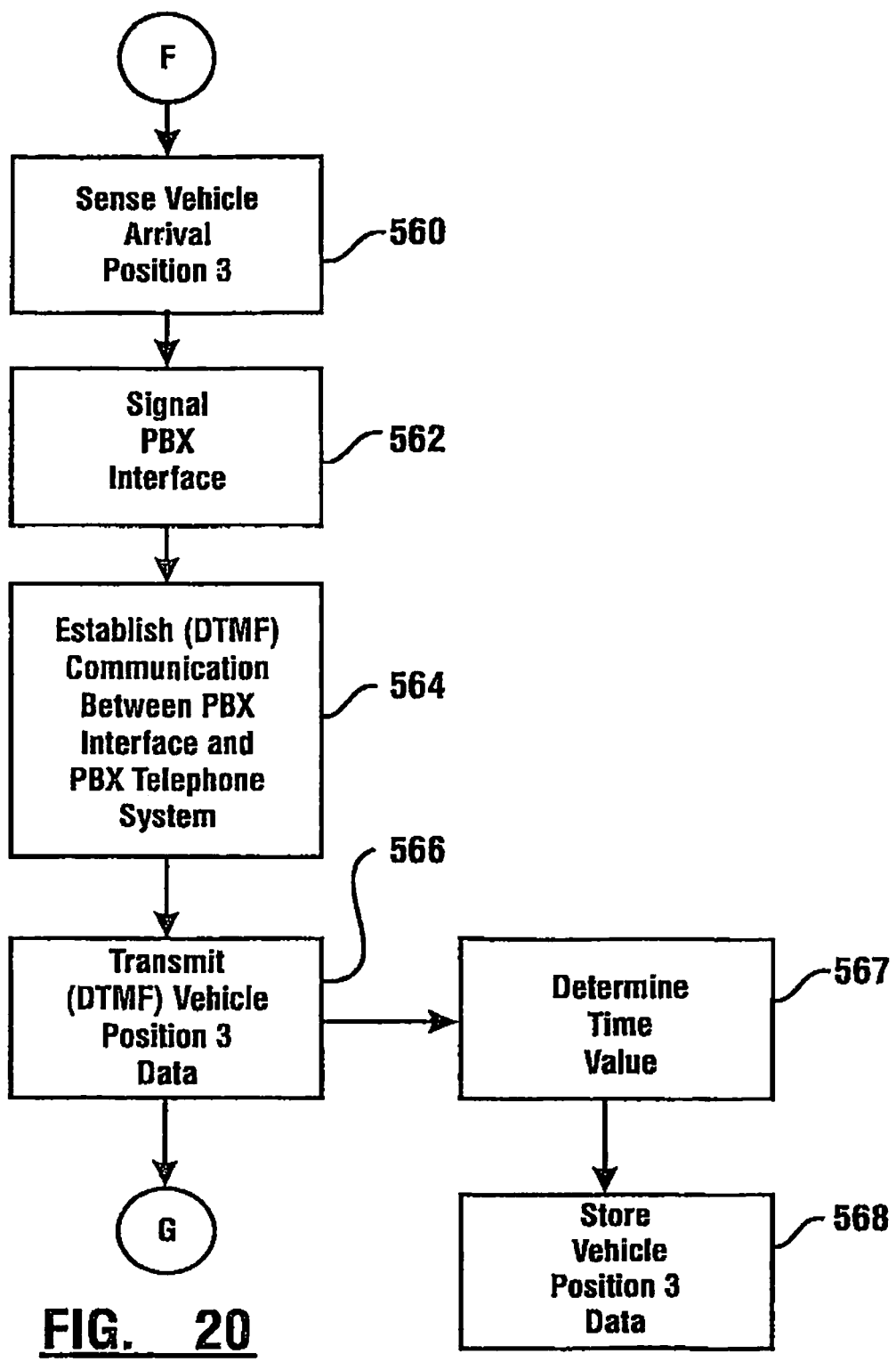

In the example embodiment, arrival of a vehicle 406 at a position at an exit (nominally, Position 3, FIG. 20, Step 560) from the through lane 402, 404 is sensed by a vehicle sensor 434. (FIG. 20, Step 560.) The vehicle sensor 434 communicates a signal corresponding to the arrival of the vehicle 406 at the exit from a through lane 402, 404 to the telephone switching interface device 436. (FIG. 20, Step 562.) The telephone switching interface device 436 establishes communication between the telephone switching interface device 436 and the telephone system 396. (FIG. 20, Step 564.) The telephone switching interface device 436 communicates to the processor 418 a signal corresponding to the arrival of the vehicle 406 at the exit from the through lane 402, 404. (FIG. 20, Step 566.) The processor 418 determines a time value (FIG. 20, Step 567) associated with the signal corresponding to the arrival of the vehicle 406 at the exit from the through lane 402, 404 and stores the data corresponding to the time value in the data store 420. (FIG. 20, Step 568.)

Figure 21:
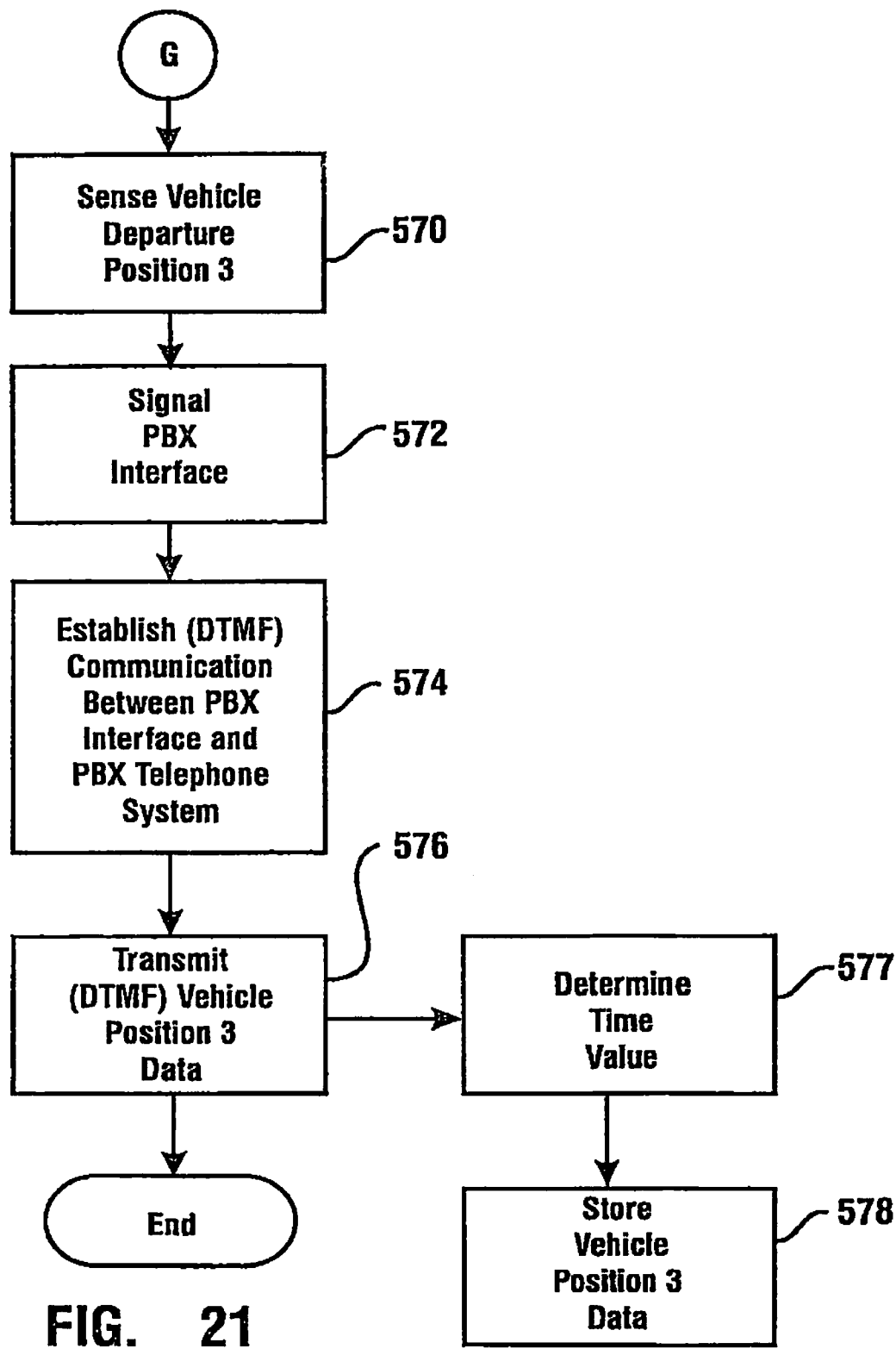

Similarly, in the example embodiment the departure of the vehicle 406 from the position at the exit from the through lane 402, 404 is likewise sensed by the vehicle sensor 434. (FIG. 21, Step 570.) Similar to the steps outlined in FIG. 20, the vehicle sensor 434 communicates a signal corresponding to the departure of the vehicle 406 from the entrance to the through lane 402, 404 to the telephone switching interface device 436 (FIG. 21, Step 572). The telephone switching interface device 436 establishes communication between the telephone switching interface device 436 and the telephone system 396 (FIG. 21, Step 574). The telephone switching interface device 436 communicates to the processor 418 at least one signal corresponding to the departure of the vehicle 406 from the position at the exit from the through lane 402, 404 (FIG. 21, Step 576), and the processor 418 determines a time value (FIG. 21, Step 577) associated with the signal corresponding to the departure of the vehicle 406 from the position at the exit from the through lane 402, 404 and stores the data corresponding to the time value in the data store 420 (FIG. 21, Step 578).

Figure 22:
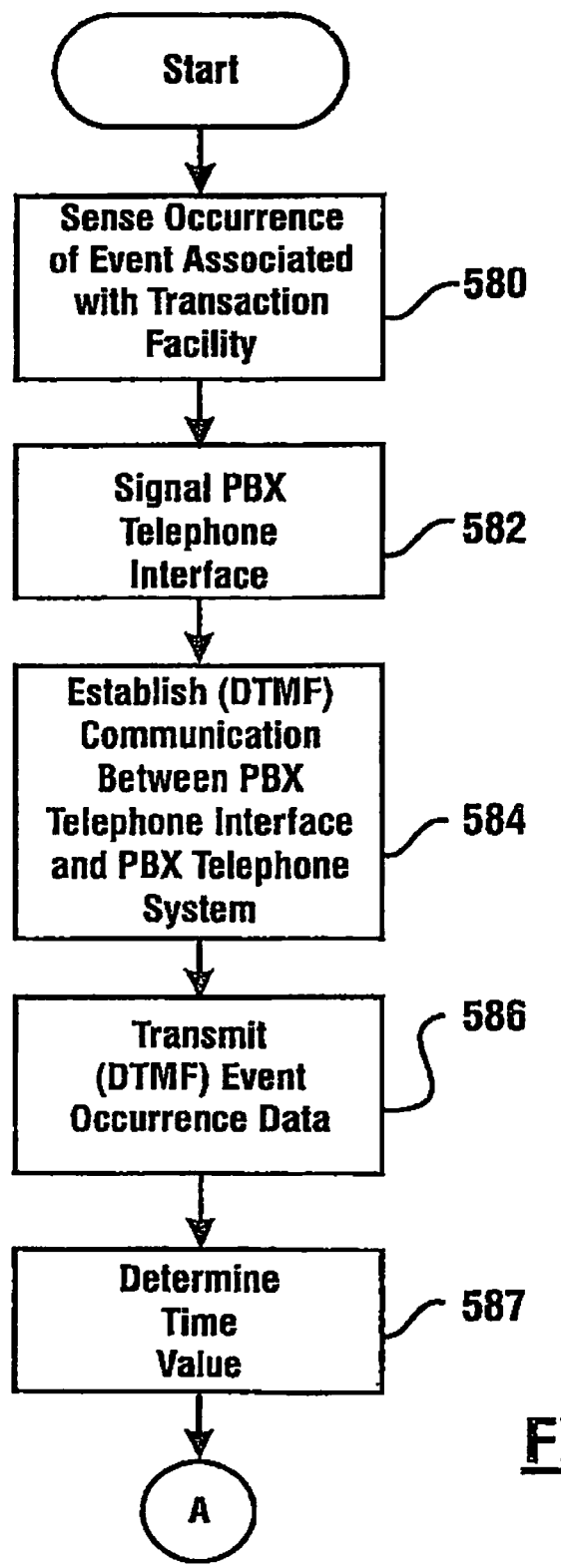
FIGS. 22 and 23 are schematic views of steps which are conducted through operation of an alternative form of an example system.
Figure 23:
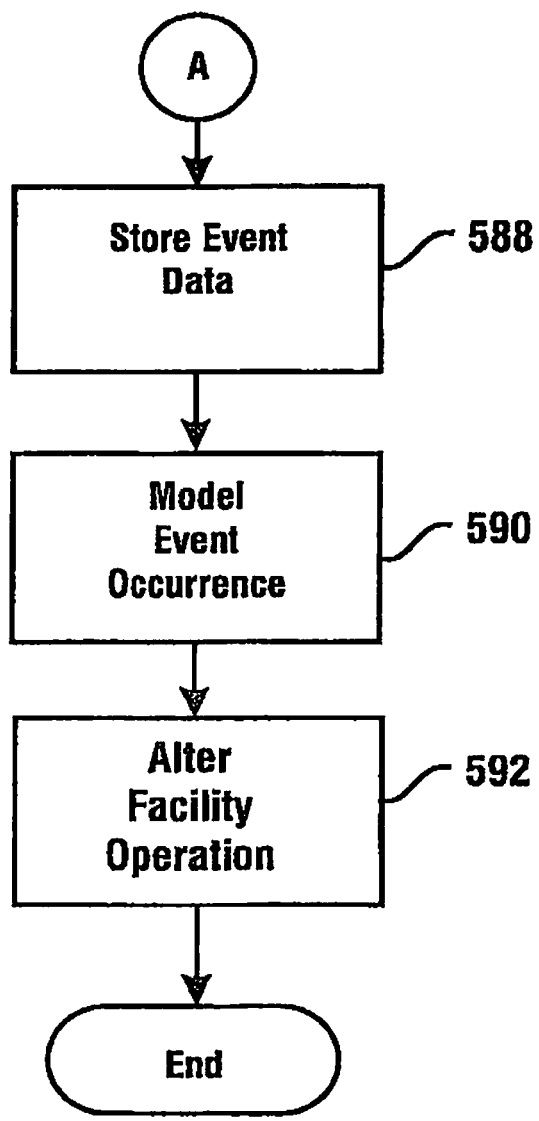

An alternative example operation of the system 388 can be understood by reference to FIGS. 22 and 23, in addition to FIG. 13. An event associated with the operation of the facility 390 is sensed by at least one of a vehicle sensor 434, transaction sensor 438, transaction initiation sensor 440, or combinations thereof. (FIG. 22, Step 580.) The at least one sensor 434, 438, 440 communicates a signal corresponding to the event to the telephone switching interface device 436. (FIG. 22, Step 582.) The telephone switching interface device 436 establishes communication between the telephone switching interface device 436 and the telephone system 396. (FIG. 22, Step 584.) The telephone switching interface device 436 communicates to the processor 418 a signal corresponding to the event. (FIG. 22, Step 586.) The processor 418 determines a time value (FIG. 22, Step 587) associated with the signal corresponding to the event and stores the data in the data store 420. (FIG. 23, Step 588.)

Upon the acquisition of sufficient data associated with the operation of the facility 390, the operation of the facility 390 and the system 388 may be modeled using, for example, event analysis software and/or discrete event simulation software operating in a computer to evaluate the time-based behavior of the system 388. For example, it may be dynamically determined through operation of the event analysis software that additional service providers would be desirable at a particular time and the computer of the system may provide outputs through an output device indicating a need to shift service providers from other positions to the drive-through lanes, for example. Relative to a longer time horizon, the system 388 could be modeled through operation and appropriate software to evaluate the desirability of, for example, additional, or reconfigured drive-through lanes 402, 404 or higher speed transaction devices 400, 400.sub.C, 408. Such event simulation software may include software which compares and correlates stored information regarding operation of the system and facility at different times, under different work flow conditions and during different types of transactions. Such software may also evaluate performance of service providers and/or the proficiency of service providers in different types of transactions. Such software may also facilitate making decisions related to operation of the facility, such as for example, times when additional staff are needed, when to open and close one or more drive-through lanes, when to purchase additional quantities of medications, amounts of cash to have on hand and other parameters. Of course these approaches are merely examples and in other embodiments other approaches may be used.

Figure 24:
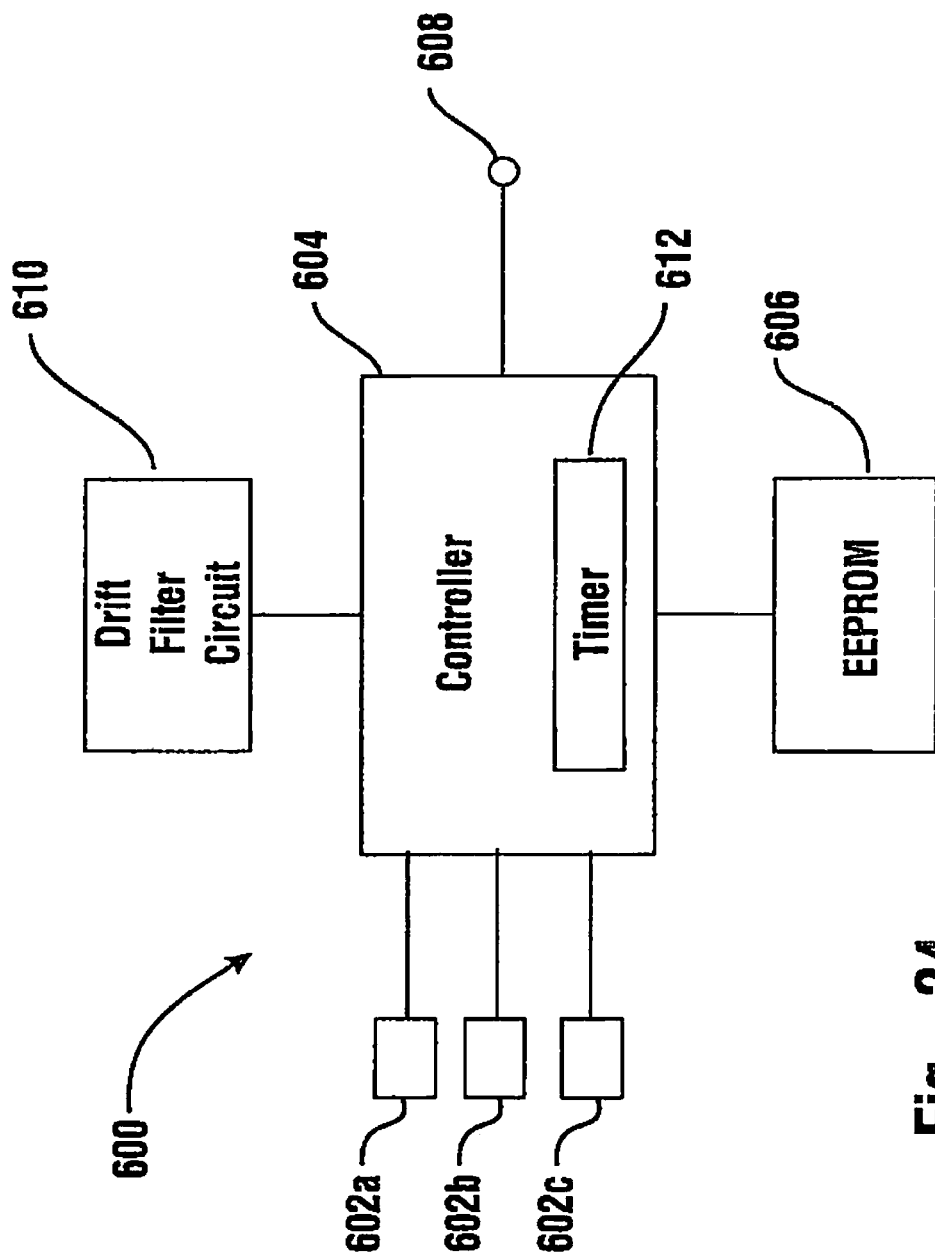
FIG. 24 is an electrical block diagram of an example system that determines that a vehicle has passed a sensing location.

FIG. 24 shows an example a system 600 that determines that a vehicle has passed a sensing location such as the transaction device 400, 408 of FIG. 13. This system 600 may be implemented in the example system 388 shown in FIG. 13 and discussed above. Alternatively, the system 600 may be implemented into other example systems.

Figure 25:
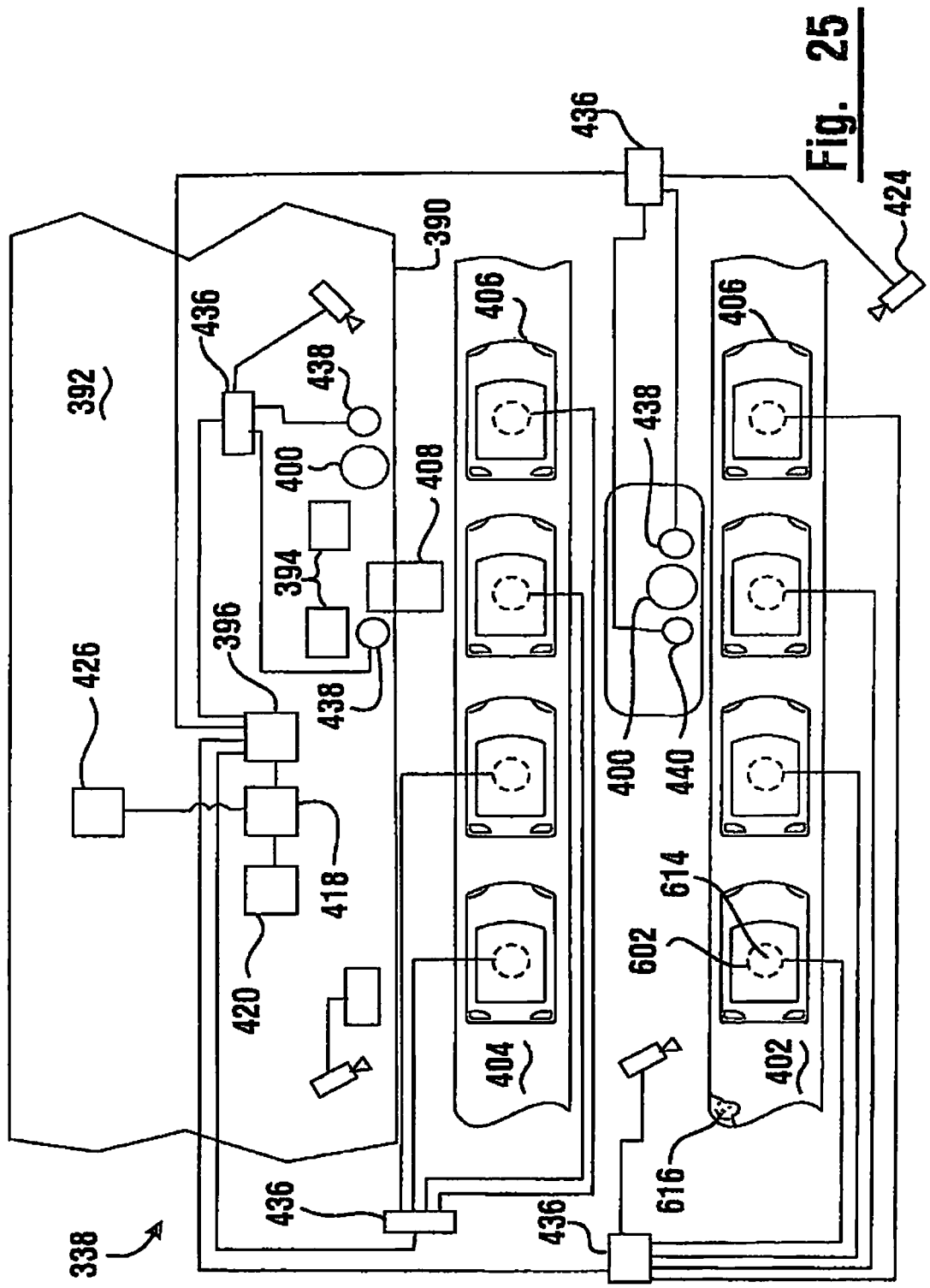
FIG. 25 is a schematic view of an example system that implements the system of FIG. 24.

The system 600 includes a vehicle sensor 602. As depicted in FIG. 25, the vehicle sensor 602 is adapted to sense the presence of a vehicle 406 at a position in the through lane 402, 404. The vehicle sensor 434 may comprise, by way of example only, a magnetic sensor, an inductive sensor, a load sensor, a laser, infrared, or other light beam sensor, or, by way of a video camera 424, visual recognition. Such vehicle sensors 602, when appropriately placed, are capable of sensing a variety of data regarding the position of a vehicle 406 in the through lanes 402, 404. In some example systems, it may be desirable to detect the arrival of a vehicle 406 at an entrance to a through lane 402, 404, the arrival of a vehicle 406 at a position adjacent to the transaction device 400, 408, the departure of a vehicle 406 from the position adjacent to the transaction device, the arrival of a vehicle 406 at a position at an exit from the through lane 402, 404, and the departure of a vehicle 406 from the position at the exit from the through lane 402, 404. Of course these sensing locations are merely examples. Alternatively, the sensor may be configured to sense objects other than a vehicle.

In the example system, the vehicle sensor comprises a magnetic sensor. One example magentic sensor is M-GAGE™ Q7M Flat-Pak sensor made by Banner Engineering Corporation. This magnetic sensor is an anistotropic magneto resistive wheatstone bridge sensor. As seen in FIG. 24, three of these magnetic sensors 602a, 602b, and 602c may be used to provide respective x, y, and z measurements of the magnetic field strength. These three signals are multiplexed through a single analog to digital converter and input to a controller 604. U.S. Pat. No. 6,546,344, which is incorporated herein by reference in its entirety, describes in more detail these magnetic sensors and related components.

Reference or baseline ambient magnetic field values of the sensors 602a, 602b, and 602c are stored in memory 606 such as the EEPROM disclosed in U.S. Pat. No. 6,546,344. The memory 606 is operatively connected to the controller 604. Alternatively, the controller 604 may have memory that stores the baseline ambient magnetic field values. The measured x, y and z values are compared with the baseline x, y and z values stored in the EEPROM 606, and if the magnetic field is significantly changed from the ambient field by a predetermined amount (e.g., 150 points), a vehicle present signal is indicated at output 608 of the controller 604.

If a vehicle is not present, the measured x, y, and z values are assumed to be the current ambient magnetic field level and these are used to update the baseline x, y, and z values stored in the EEPROM 606. These update measurements are low-pass filtered to provide an accurate indication of long term changes in the ambient magnetic field measured by the sensors 602a, 602b, and 602c. This updating of the baseline x, y, and z values is performed by a drift filter circuit 610.

In particular, the drift filter circuit 610 is operatively connected to the controller 604 and operates to adjust the base line values based on changes in the ambient magnetic field measured by the sensors 602a, 602b, 602c. This change may occur, for example, when the sensors 602a, 602b, 602c move or a magnetic and permanent object is introduced. Essentially, the drift filter circuit 610 causes the sensors 602a, 602b, 602c to gradually adapt to having that magnetic object present such that the current ambient magnetic field values become the new baseline x, y, and z values.

The drift filter circuit 610 is also operative to adjust the baseline to the new baseline values in a predetermined time that is set by the controller 604. For example, the baseline values may be adjusted by the drift filter circuit 610 in three or more hours or as little as a half an hour. The controller 604 may also set a maximum amount of change or drift in the ambient magnetic field from the baseline values for the drift filter circuit 610 to adjust the baseline values. Thus, the drift filter circuit 610 will not adjust the baseline values, if the amount of drift is beyond this maximum amount. The maximum amount may be set as high as 130 points.

The controller 604 may include a timer 612 that is operatively connected to the drift filter circuit 610. The timer 612 is operative to delay the adjustment of the baseline values for a predetermined time after the occurrence of the drift in the ambient magnetic field. If the drift did not last for more than the predetermined time, the drift filter circuit 610 would not adjust the base line values. If the drift does last for more than the predetermined time, the drift filter circuit 610 would adjust the baseline values, such that the current ambient magnetic field values become the new baseline x, y and z values This delay is particularly beneficial for sensors 602 that are covered by an adhesive material 614 and positioned securely into a cavity of an asphalt surface 616 such as that shown in FIG. 25. This is explained as follows. In this configuration, the maximum amount of drift is set at 130 points and the time for adjusting the baseline values is set at a half an hour. The relatively short time for the baseline values to adjust is preferred, since both the asphalt and adhesive material can easily move due to changes in ambient conditions such as temperature. This movement in turn moves the sensors often, which causes drift to occur more frequently. The short time allows the baseline values to adjust quickly to the frequent occurrences of drift.

However, the problem with the drift filter circuit 610 adjusting the baseline values in a short time is that the drift moves the baseline relatively quickly based on the sensors sensing parked vehicles. As a result, the baseline moves substantially away from the original baseline to the point where the sensors are no longer accurately sensing the presence or absence of vehicles. The delay in adjusting the baseline values for a predetermined time prevents the baseline from moving to that point, so that the sensors can accurately sense the presence or absence of vehicles. Of course, the delay can be provided for other sensor configurations placed in a variety of environments as well as sensors having different maximum amounts of drift and times to adjust the baseline values.

Figure 26:
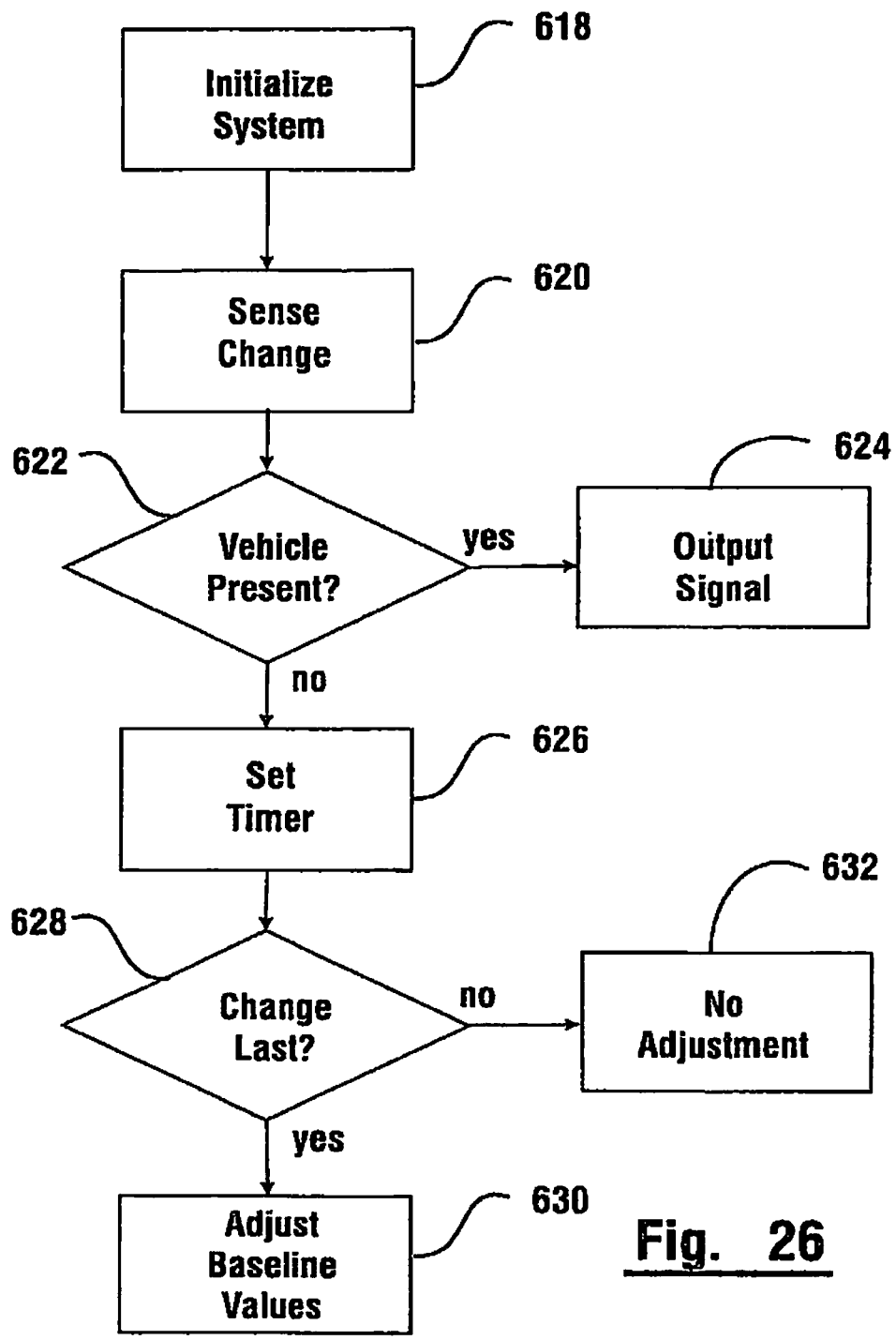
FIG. 26 is a schematic view of the steps related to the adjustment of the baseline values by the example system of FIG. 24.

The logic flow regarding the adjustment of the baseline values by this system 600 is illustrated by the flow chart of FIG. 26. The system 600 is initialized as represented by step 618. The initialization includes storing the current baseline values in the EEPROM 606, storing in the EEPROM 606 a set point that represents a magnetic field indicative of a vehicle being present, setting the maximum amount of drift, setting the time for adjusting the baseline values, and setting the delay for the timer. The sensors 602a, 602b, 602c sense a change in the magnetic field and output signals representative of this change to the controller 604, as indicated by step 620. The controller 604 processes these signals and determines whether this change is indicative of a vehicle being present as represented in step 622. If the change is indicative of a vehicle being present, the controller 604 outputs the vehicle present signal at step 624. If the change is not indicative of a vehicle being present, the timer 612 is set to delay the adjustment of the baseline values for a predetermined period as indicated in step 626. Then, in step 628, the controller 604 determines whether the drift lasts for more than the predetermined time. If the drift lasts for more than the predetermined time, the drift filter circuit 610 adjusts the baseline values such that the current ambient magnetic field values become the new baseline x, y and z values. This is indicated in step 630. If the drift did not last for more than the predetermined time, the drift filter circuit 610 would not adjust the base line, as indicated in step 632.

The example system 600 also accurately determines that the vehicle has completely passed through a sensing location such as the transaction device 408. As previously mentioned, if the magnetic field is significantly changed from the ambient field by a first predetermined amount, a vehicle present signal is indicated at the output 608 of the controller 604.

For a vehicle 634 (FIGS. 28-30) passing through the transaction device 408, the magnetic field is increased by a first predetermined amount from the ambient field when a front end 636 of the vehicle 634 is first sensed by the sensors 602a, 602b, 602c. The magnetic field is then decreased by the first predetermine amount after a rear end 638 of the vehicle 634 passes through the sensing location and is no longer sensed by the sensors.

Due to hysterisis, an undesirable delay in the decrease of the magnetic field occurs after the rear end 638 of the vehicle 634 has passed. To counteract the effects of hysterisis, the controller 604 is operative to deactivate the output signal that the vehicle is present, when the absolute value of the magnetic field drops to a second predetermined amount from the first predetermined amount. This second predetermined amount is less than the first predetermined amount. By having the controller 604 indicate that the vehicle 634 is no longer present when the magnetic field decreases less than the full first predetermined amount, the vehicle is more quickly detected as passing the sensing location. The second predetermined amount may in an example embodiment be 75 points.

As the vehicle 634 passes through the sensing location, the magnetic field at the center of the vehicle may be decreased by the second predetermined amount. This decrease could cause the controller 604 to incorrectly indicate that the vehicle 634 has passed. To prevent this situation from occurring, the controller 604 is operative to increase the second predetermined amount to a third predetermined amount after the front end 636 of the vehicle 634 is sensed. The third predetermined amount is sufficient to prevent the controller 604 from deactivating the output signal that the vehicle is present as the center of the vehicle 634 passes the sensors 602a, 602b, 602c. When the magnetic field is at an amount that indicates that the rear end 638 of the vehicle 634 is sensed by the sensors 602a, 602b, 602c, the controller decreases the third predetermined amount back to the second predetermined amount.

Figure 27:
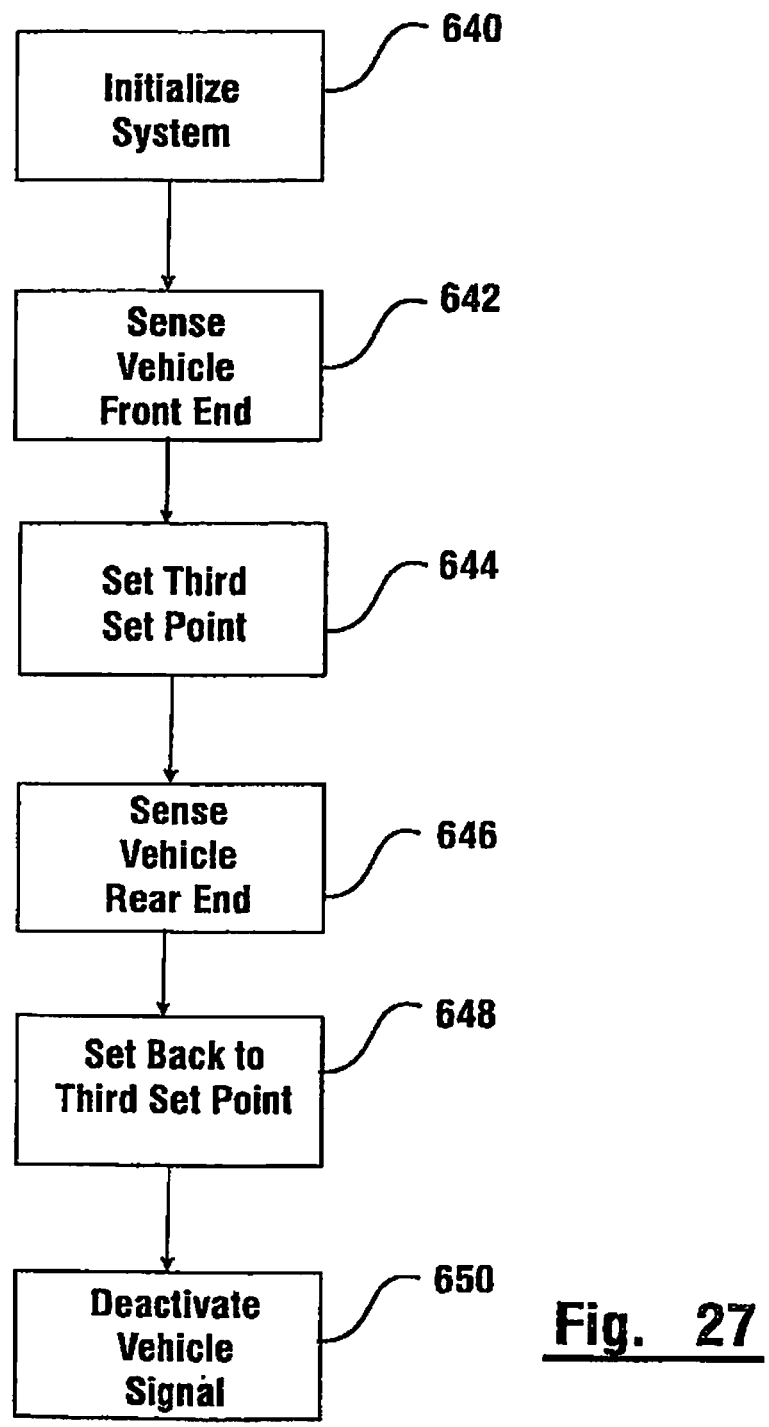
FIG. 27 is a schematic view of the steps related to a feature carried out by the system of FIG. 24.
Figure 28:
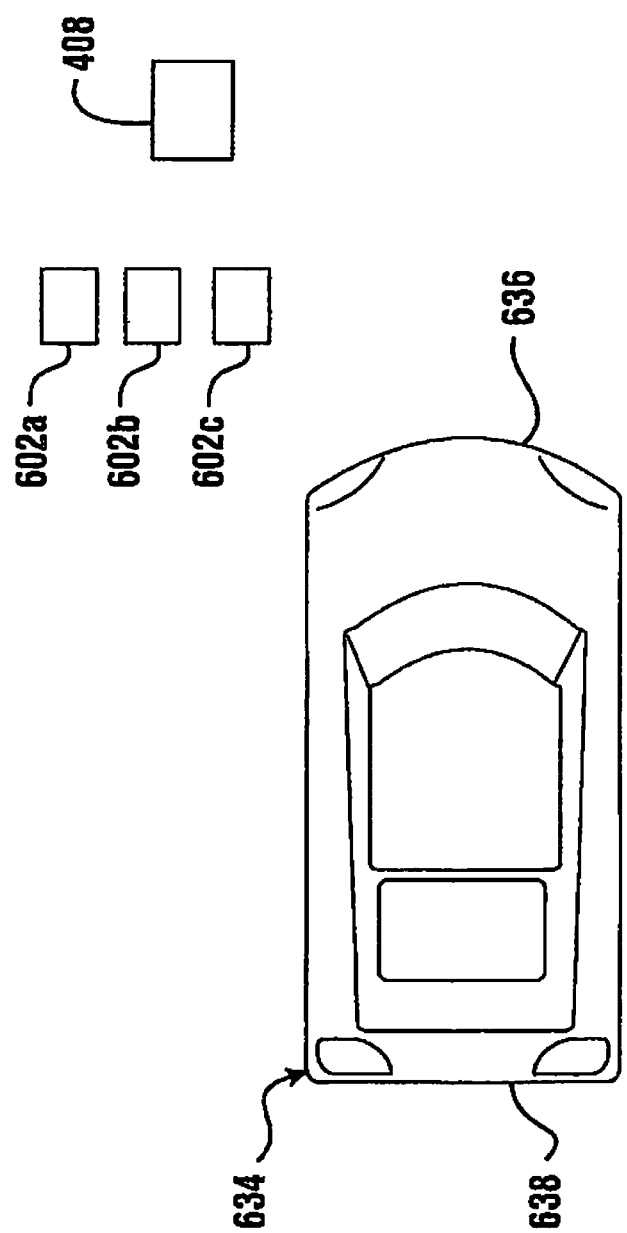
FIG. 28 is a schematic view showing a vehicle moving towards a transaction device but not yet in range of the sensors of the system of FIG. 24.

FIG. 27 shows schematically an example logic flow that is carried out through operation of this feature of the system 600. First, the system 600 is initialized as represented by step 640. This initialization includes storing in the EEPROM 606 a first set point that represents a change in the magnetic field from the baseline that is indicative of a vehicle being present. The initialization also includes storing in the EEPROM 606 a second set point that represents a magnetic field indicative of the vehicle being no longer present. FIG. 28 shows the vehicle 634 moving towards the transaction device 408 with the front end 636 not yet in range of the sensors 602a, 602b, 602c. When the vehicle 634 is at this position, the change in the magnetic field values from the baseline values is zero and the second set point remains the same.

Figure 29:
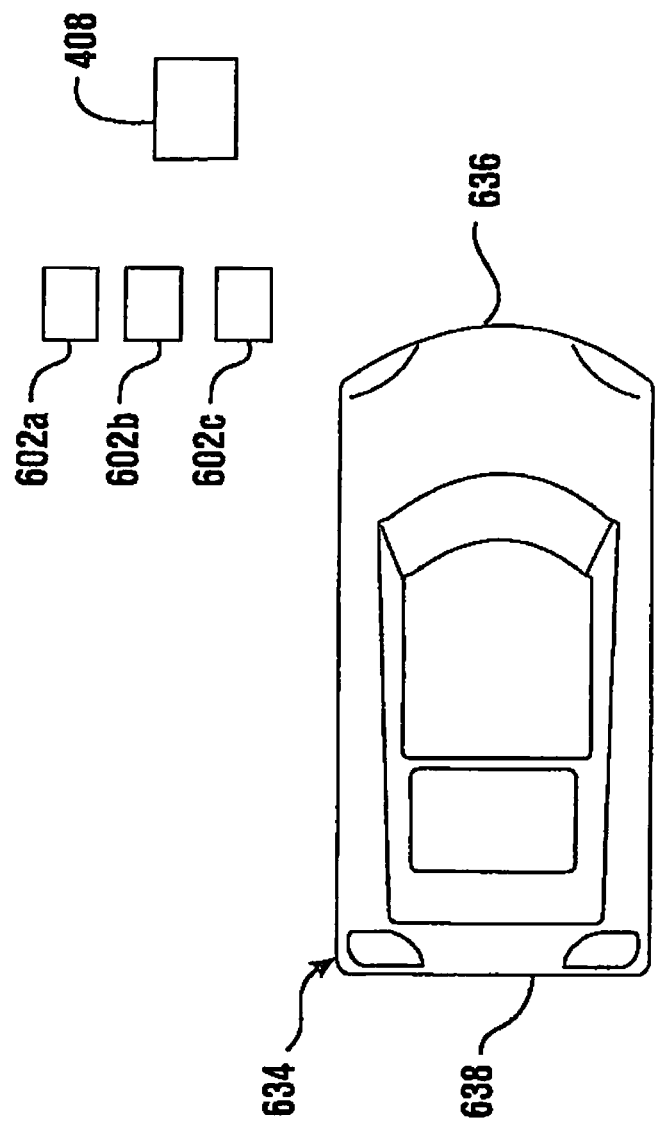
FIG. 29 is a schematic view similar to FIG. 28 but showing the front end of the vehicle being sensed by the sensors of the system of FIG. 24.
Figure 30:
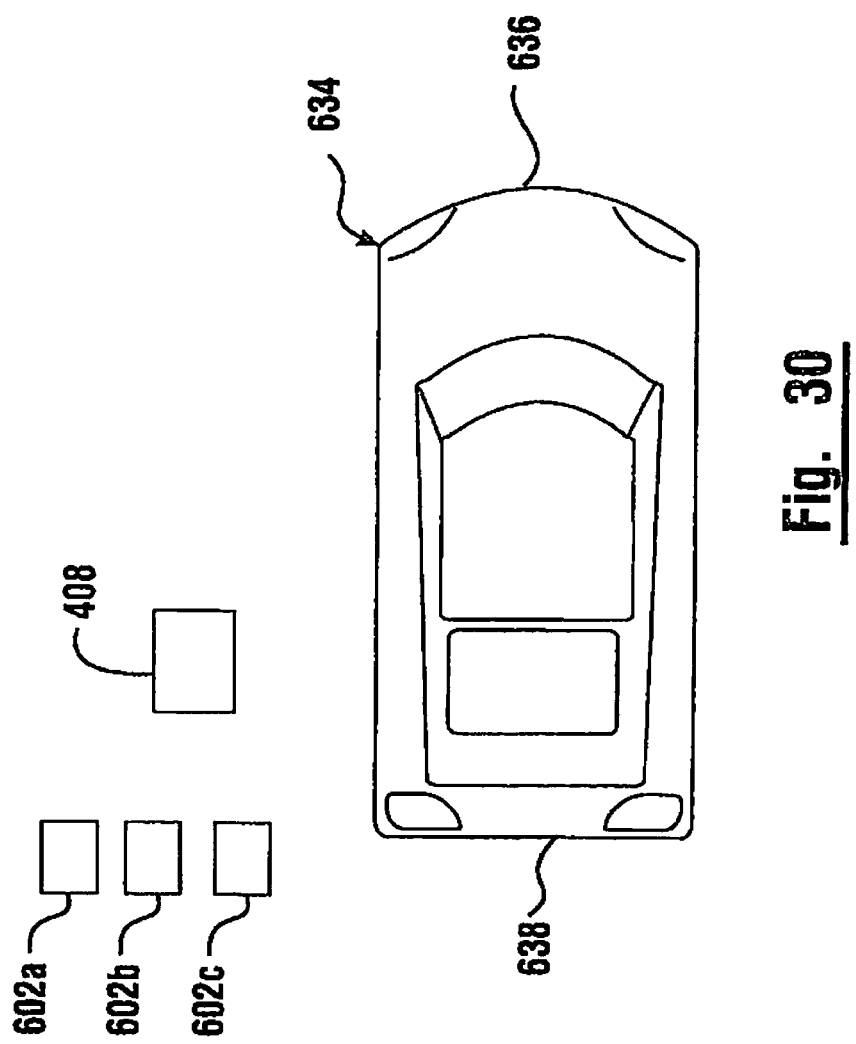
FIG. 30 is a schematic view similar to FIG. 28 but showing the rear end of the vehicle being sensed by the sensors of the system of FIG. 24.

FIG. 29 shows the vehicle 634 arriving at a position adjacent the transaction device 408 with the front end 636 of the vehicle 634 being sensed by the sensors 602a, 602b, 602c. When the vehicle is at this position, the sensors 602a, 602b, 602c output signals indicative of the change in magnetic field from the baseline to the controller 604. The controller 604 processes these signals and compares these output signals with the first set point as depicted in step 644. If the controller 604 determines that the absolute value of the signals is equal to the first set point, the controller 604 outputs a signal that the vehicle 634 is present. After the controller 604 outputs a signal that the vehicle 634 is present, the controller 604 then lowers the second set point to a third set point so that a greater decrease in the magnetic field is required to indicate that the vehicle 634 is no longer present. This is represented in step 644. FIG. 30 shows the rear end 638 of the vehicle 634 beginning to move away from the sensors 602a, 602b, 602c. The sensors 602a, 602b, 602c sense the rear end 638 of the vehicle 634 and output signals indicative of the change in magnetic field to the controller 604. This is indicated in step 646. When the vehicle 634 moves to this position, the controller 604 then raises the third set point back up to the second set point as depicted in step 648. When the magnetic field then decreases to the second set point, the controller 604 deactivates the output signal that the vehicle 634 is present as represented by step 650.

It should be noted that although three sensors are utilized for sensing the respective x, y and z measurements of the magnetic field strength, the system 600 could be configured to include just one or two magnetic sensors for sensing the magnetic field strength. Alternatively in other embodiments, additional sensors may be used. In still other embodiments other types of sensing devices that sense the presence of an adjacent mass may be used in lieu of or in addition to magnetic field sensors. These might include, for example, inductance sensors, strain gages, load cells or other sensors that are operating to sense adjacent mass generally without contact therewith.

In example embodiments herein, metrics relates to the art (or science) of measurement or data composition (collection), especially with regard to data statistics and/or analysis. The data measurements can assist in providing or evaluating results about a particular feature, device, system, network, process, etc.

As previously discussed herein, assisted transaction metrics can be associated with a facility that includes one or more drive-through lanes (e.g., FIGS. 11 and 13). The facility can comprise a banking facility, a pharmacy facility, or another type of facility (e.g., a store) which provides goods or services to customers. As already discussed, applicable facility metrics (statistics) can involve capture and database storage of different time values corresponding to events associated with service provider assisted transactions at drive-through (or drive-up) lanes of the facility. The stored system metrics data can later be remotely retrieved and reviewed.

An example embodiment includes a system that obtains transaction data, stores the transaction data, and provides access to the stored transaction data. The system can be part of a service offered to facilities or their managers. The system can operate on behalf of a client, such as a manager of several branches/stores, to collect facility data. The collected data is made accessible to the client in a manner that allows the client to see the data in an informative format. The system allows data corresponding to devices and events associated with transactions to be analyzed by the client. Data can be displayed in a manner that provides pertinent information which enables a manager to more efficiently operate a facility. The system can simultaneously collect data on several different facilities on behalf of several different clients.

Alternatively, the system can be set up for a single association of facilities, such as bank branches. For example, a single bank can own their own metrics system, and have the system connected to all of its bank branches. A manager who oversees several branches can access and review data pertinent to those branches.

In the example embodiment the individual devices used in a transaction are associated with system processors (computers). Sensors and/or switches (connected to the devices) are used to provide device status (operation) information to the data-collecting processors. Alternatively, an individual device can have its own (built in) processor which communicates data to a further system processor. That is, an individual device itself may receive data from a sensor and then relay this data to a local/remote processor, such as by wireless communication. Further, all reporting of facility data can be carried out via wireless communication, such as by a cellular link.

The data receiving processors include programming (e.g., software) which allows messages/signals to be automatically generated and provided to a remote (central) system server and associated system data store. The messages include device data and event data. Thus, data for each individual event and/or device and can be sent to the remote server. That is, the system can update the database of stored device/event files every time there is an event. This allows a remotely located person to access and view desired data in essentially real time.

Alternatively, local batching can be used to first provide the device data and event data into a local server/computer and database. This locally stored data can then be periodic sent to the remote system server. For example, the periodic sending of batch data to the central server can be programmed to happen every few minutes (e.g., 2, 5, 10, or 15 minutes). This data uploading time frame allows for the data to be generally current (e.g., near real time) and up to date.

Figure 31:
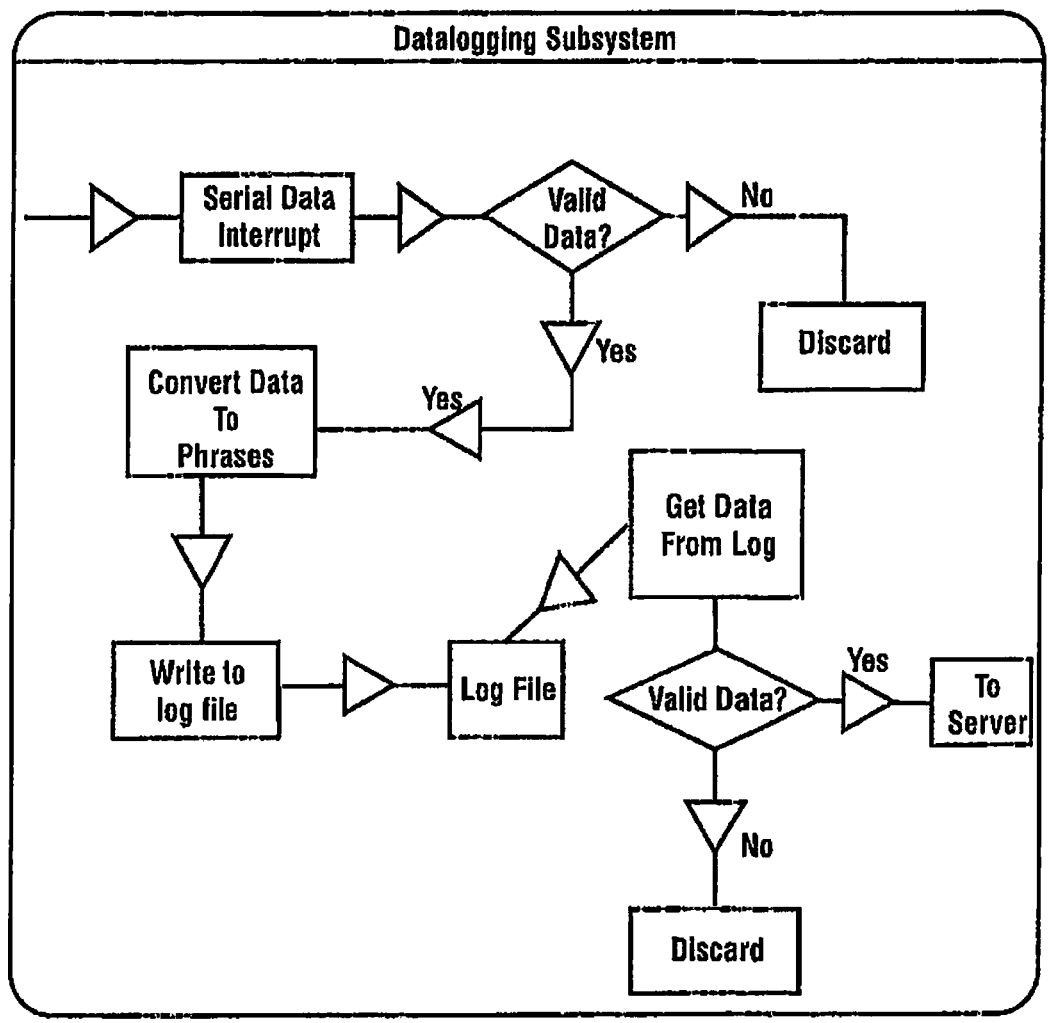
FIG. 31 shows an example of diagram for the gathering, sending, and storing of device/event data in an example service system.

FIG. 31 shows a component-level architecture diagram for an example example of a system process for the gathering and sending of sensed device/event data to a server. As can be seen, data can be checked to determine that it is valid transaction data for storing. Data can also be modified or reformatted prior to forwarding the data to the server. For example, data may be converted to phrases, including converting audio data to text.

Figure 32:
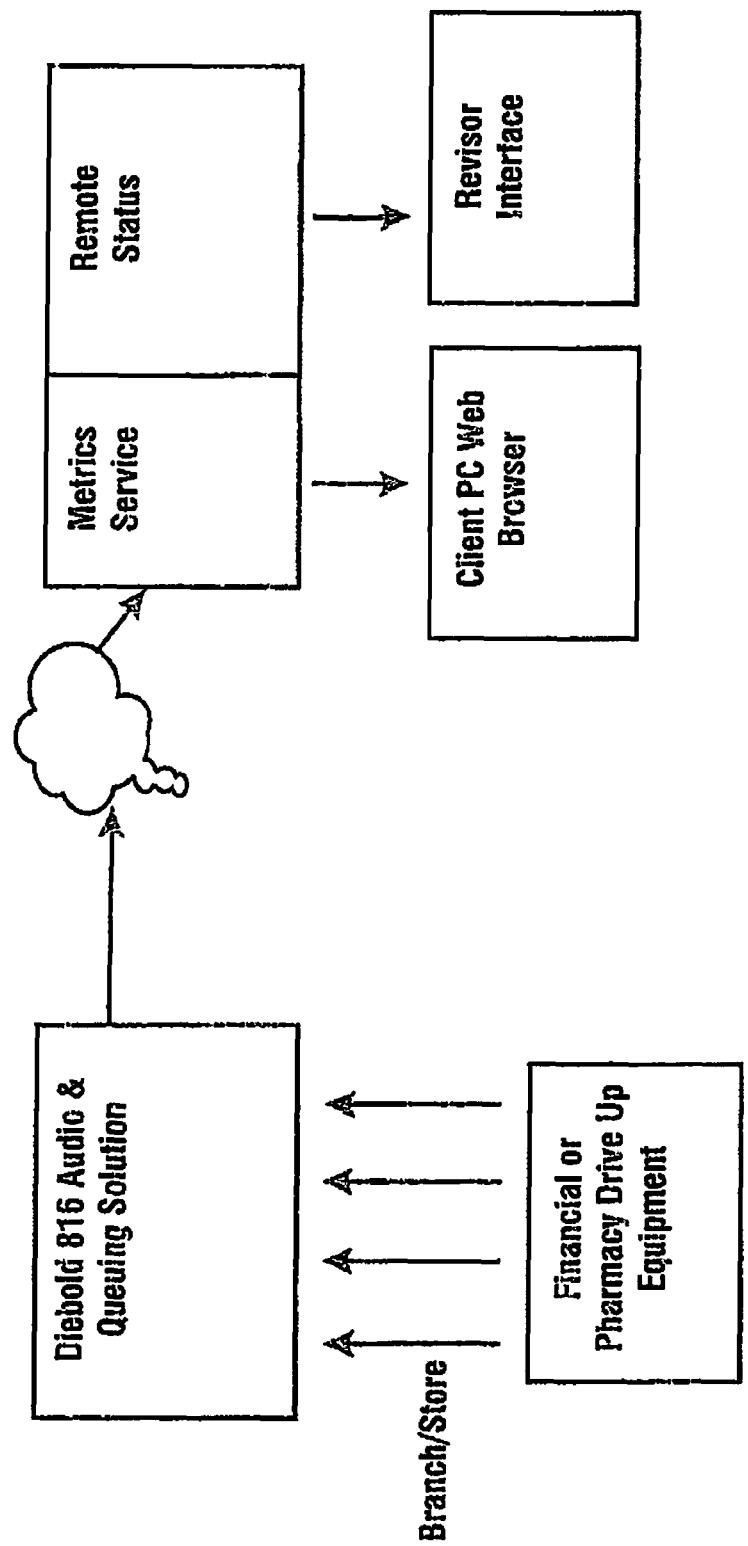
FIG. 32 shows an example of system flow for assisted transaction metrics.

FIG. 32 shows an example embodiment for assisted transaction metrics and remote status. A branch/store facility obtains data (e.g., signal data) and passes this data onto a queuing platform such as a system computer. The computer may act on (e.g., modify, reformat, etc.) the data before passing it on (such as via the Internet) to a metrics (statistics) service. The metrics service may be associated with another service that provides remote monitoring of facility devices, including the monitoring of current device status. A client of the metrics service can access and review the data collected on their behalf. For example, the client (e.g., a facility manager) may access a system server to retrieve the data they desire to review. Revisions as to what type of data and how the data is collected by the system for a particular client, can also be carried out. The system allows for a vast array of different clients to use the metrics service. The system can provide benefits for any facility that employs service providers for manually performing a large number of financial transactions.

The system can collect data associated with drive-through lane transactions. Drive-through lane data can be captured on a variety of devices and events. For example, one or more drive-through lane sensors sense when a vehicle (e.g., a car) is present in proximity to the sensor, such as when the vehicle enters the lane and when the vehicle leaves the lane (or leaves sensor proximity). Data corresponding to the number (queue) of vehicles in each individual lane, the waiting time for each vehicle before they are assisted by a person teller, and the total time a person is being assisted can also be determined and stored by the system.

Movement and use of a (pneumatically transported) item carrier (e.g., a VAT carrier) can also be tracked. Sensors can be located throughout the system (or connected to the system) to sense each of when (e.g., the time/date) the carrier is taken from its support by a customer, the time the customer sends the carrier to the service provider (e.g., teller, customer assistant, etc.), the time the carrier arrives at the teller, the carrier's travel time (e.g., wear time), the time the carrier remains with the teller, the time the teller sends the carrier to the customer, the time the carrier arrives at the customer, the carrier's return trip travel time, the total time the carrier was used for a transaction, and carrier identification and location. In addition, the item carrier data can be associated with other transaction data, such as teller identification, customer account number, transaction type, transaction amount, etc.

The tracking of item carrier usage can similarly be applied to other transport devices used for item exchange during a transaction, such as a deal drawer. That is, similar device data can be tracked. For example, deal drawer data can similarly include when (e.g., time/date) the deal drawer is activated to move outward toward a customer, when it is activated to return inward toward the teller, and the number of times the deal drawer was used per day, etc.

The use of other transaction devices can also be tracked. For example, undercounter units like interior drawers and storage components may be used by a teller during a transaction. A vault or other secure area may also need to be accessed by the teller, such as to obtain additional amounts of cash (e.g., currency notes). Sensors, switches, and/or detectors can likewise be associated with these interior units. For example, usage data on an undercounter unit can include information on when (e.g., time/date) the unit was unlocked, when it was opened, when it was closed, when it was are locked again, and the length of time the unit was unlocked and/or opened.

Still other sensing devices can be use to collect data on a door opening/closing, the times/dates a camera is tripped on/off, teller caused cash dispenser start/stop times, teller caused cash recycler start/stop times, coin dispenser start/stop times, and machine device (e.g., a check imager, a printer) start/stop times.

The use of communication devices can also be tracked. For example, an audio control module sensor can sense when an audio module is being used to communicate speech from the teller to a customer, and vice versa from the customer to the teller. Data can be analyzed to review the length of transaction communications associated with a particular teller, such as the average communication time per transaction. The data can include audio data of the actual conversations. Similarly, a camera, a digital video recorder (DVR), or another recording device can be used to provide transaction related video/audio data to a processor for metrics storage.

A drive-through lane can have one or more sensors/detectors associated with an after-hour depository. Thus, data can be collected on when (e.g., time/date) someone opens the depository, when the depository received an item, whether the deposited item has an RFID tag, length of the deposit transaction, and total time a depository door was kept open. Sensors can also trigger the recording of video/audio data. These triggering sensors can include a proximity sensor, a depository key sensor, and/or a depository door sensor. It should be understood that the scope of the example embodiments is not limited to the few examples provided above, but the gathering of statistical/metrics data on many additional transaction devices and transaction events is also included.

It should also be understood that the statistical data collection can also include the transaction data associated with devices and events that are located away from a drive-through lane. For example, the transaction may occur inside of a transaction facility, such as at a walk-up teller station inside a bank building. Thus, transaction data can be collected on devices and events whether the customer being assisted is located outside or inside of a building.

It should further be understood that transaction data can also be collected on devices and events associated with a non-assisted customer (or with a facility employee). For example, a customer may desire to solely access a safety deposit box located in a vault. Sensors can be used to provide data associated with the time the customer goes in/out of a day gate, when an electronic safety deposit box system is operated, and length of customer time in the vault. Likewise, vault data can be tracked for other purposes, such as when the vault was unlocked, when the vault door was opened, how many people entered the vault, identification of each person (e.g., a customer or a facility employee), how long each person was inside the vault, when the vault door was closed, and when the vault was locked. The data can be statistically analyzed to determine most efficient use of the vault in conjunction with maintaining vault security.

As previously discussed, status data/information regarding each particular device can be initially reported to one or more processors, which may be onsite of the transaction facility. These processors can then parse, modify, and/or reformat the received data so that it can be properly communicated in one or more messages to a remote central server. In an example embodiment the system provides for synchronization from the server to the various clocks running in the different processors (which initially receive the data). That is, the time/date provided to the processors can be set by the (host) server. This allows all of the processors to have the same correct clock time. For example, the clock synchronization allows processor clocks to be automatically corrected for changes in Standard Time and Daylight Savings Time. Similarly, clock adjustments can be provided for leap seconds and leap years. The system ensures that time clocks in processors are in sync with the server dock. Thus, the system arrangement allows for the generation of accurate data records.

Also, the time an event happened (for recordation purposes) does not have to be determined based on a clock running on a particular processor (or on a particular device), it could be determined based on the central clock running on the remote host server. For example, a processor could obtain a time stamp from the server, and then attach the time stamp to the particular event. Alternative, upon receiving data concerning a particular event from a processor, the server could act to attach its own time stamp to the particular event.

As can be seen, the example arrangement allows for accurate tracking of every event that occurs at a transaction facility, including data on the particular devices and people involved in the event. For example, device and device event data collected with regard to a cash withdrawal at an automated banking machine (e.g., an ATM) may include what device was used (a cash dispenser serial number), where the device was located (bank branch #16), what the event was (a cash dispense), time of event (date/time of device operation), transaction start/end times (1:12:10-1:15:14), and what the device did (successfully dispensed ten US twenty-dollar bills).

Additionally, transaction event data can also be collected and correlated with the device and device event data. That is, the message data, which is sent to the remote server, can include or be linked to the transaction data. The linking or correlating may be performed locally or by the remote (host) server. Examples of transaction data (with regard to the cash withdrawal at an automated banking machine) can include a transaction identifier, customer account number, value associated with the transaction ($200), bank branch/machine identifier, etc.

In another example, device/event data can be collected with regard to a pneumatic tube carrier used in a check cashing transaction assisted by a drive-through lane teller. The data may include a carrier identifier (serial number), where the carrier was located (bank branch #27), drive-through lane number associated with the carrier base (lane #3), event code (check cashing), event date/time (of carrier activations), time when the carrier was sent by customer to teller, time when the carrier was sent by teller to the customer, wear time correlated to carrier life, value to be associated with carrier operation ($120), what the carrier did (transported one check and six currency notes), a transaction identifier, a customer identifier, a teller identifier, etc.

It should be understood that this same check cashing transaction may involve use of several different devices, such as vehicle sensor devices, an audio device, a video device (e.g., a camera, DVR), etc. Device data can be obtained for each of these other devices. This data enables the check cashing transaction (which is correlated with a transaction identifier) to be later reviewed at the individual device level. For example, the vehicle sensor data can be analyzed to obtain the time the vehicle entered a drive-through lane, the time the vehicle reached the position adjacent to the carrier, the wait time of the customer before teller assistance was received, the time the vehicle exited the drive-through lane, the total time the vehicle was in the drive-through lane, the total transaction time, etc.

In an example embodiment, the system includes computer programming that allows particular bank facilities to be graphically represented through display devices. Thus, computer analysis of stored transaction device/event data for a particular transaction allows that particular transaction to be reproduced (replicated) and shown through a display screen. The reproduced transaction can also be played out to match the same length of time as the actual transaction.

The central server can be accessed to retrieve all of the stored device data and event data over a geographically large region. For example, a manager at a bank headquarters can select a particular bank branch to review. The manager can use a user interface (computer) having programming (software) that enables the manager to view an electronic map that includes different regions of the United States. Each displayed regional map can show one or more map push pins/indicators at certain geographic areas on the map. These pins indicate that at least one branch is at that pin location (which may be a city location). These individual pins can then be selected via a mouse or a touchscreen. Pin selection causes the region map to be zoomed into the next level, such as a state or city level. This next level (state/city) map displays more pins. The maps can be continually zoomed in until a pin associated with a desired single branch is selectable. Upon selection of the desired single branch, the display then provides a menu of the features (devices and events data) for which statistics are kept for that particular facility (bank branch). Some branches may have more transaction devices than other branches.

Figure 33:
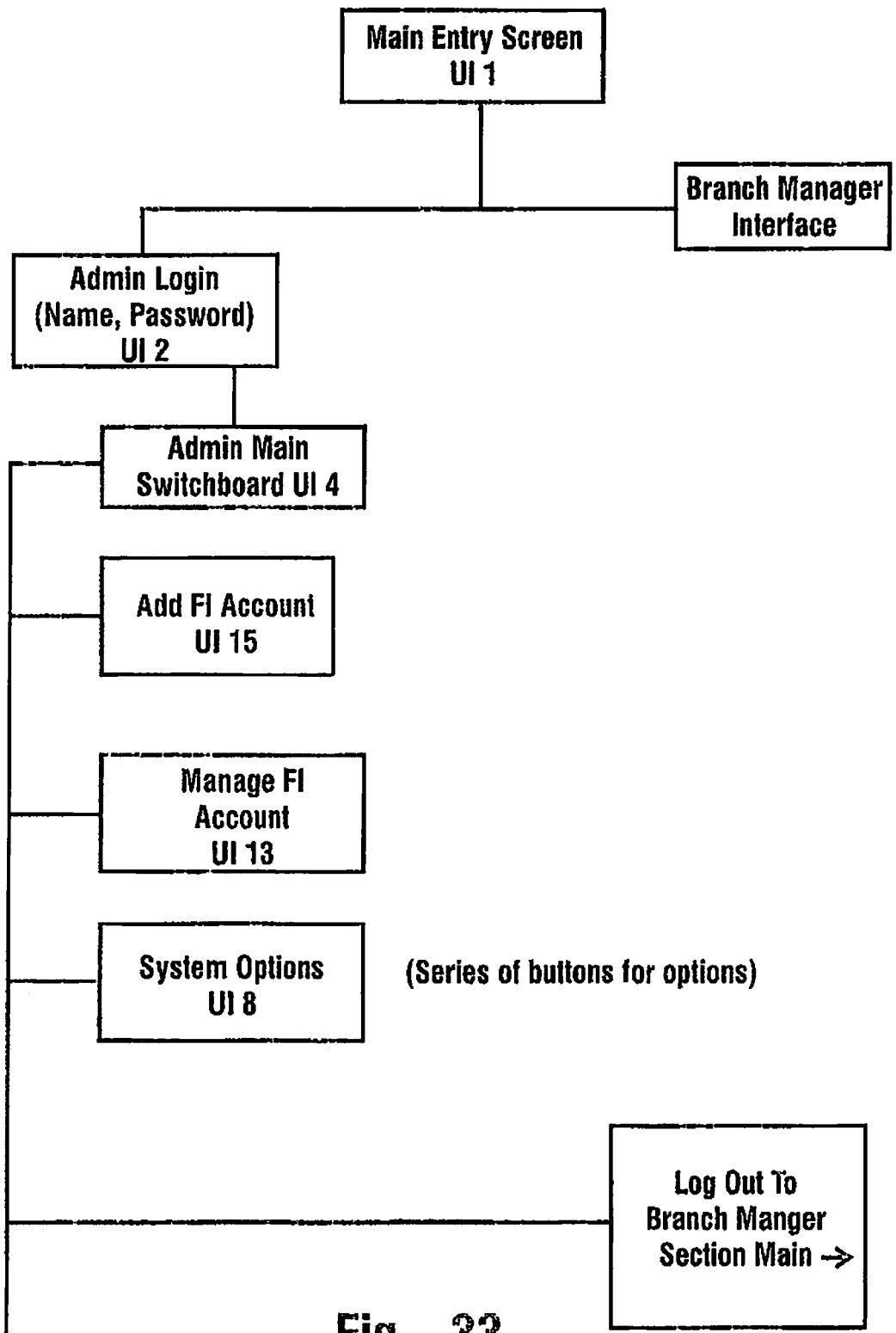
FIG. 33 shows an example of an interface flow diagram for a user of the system.
Figure 34:
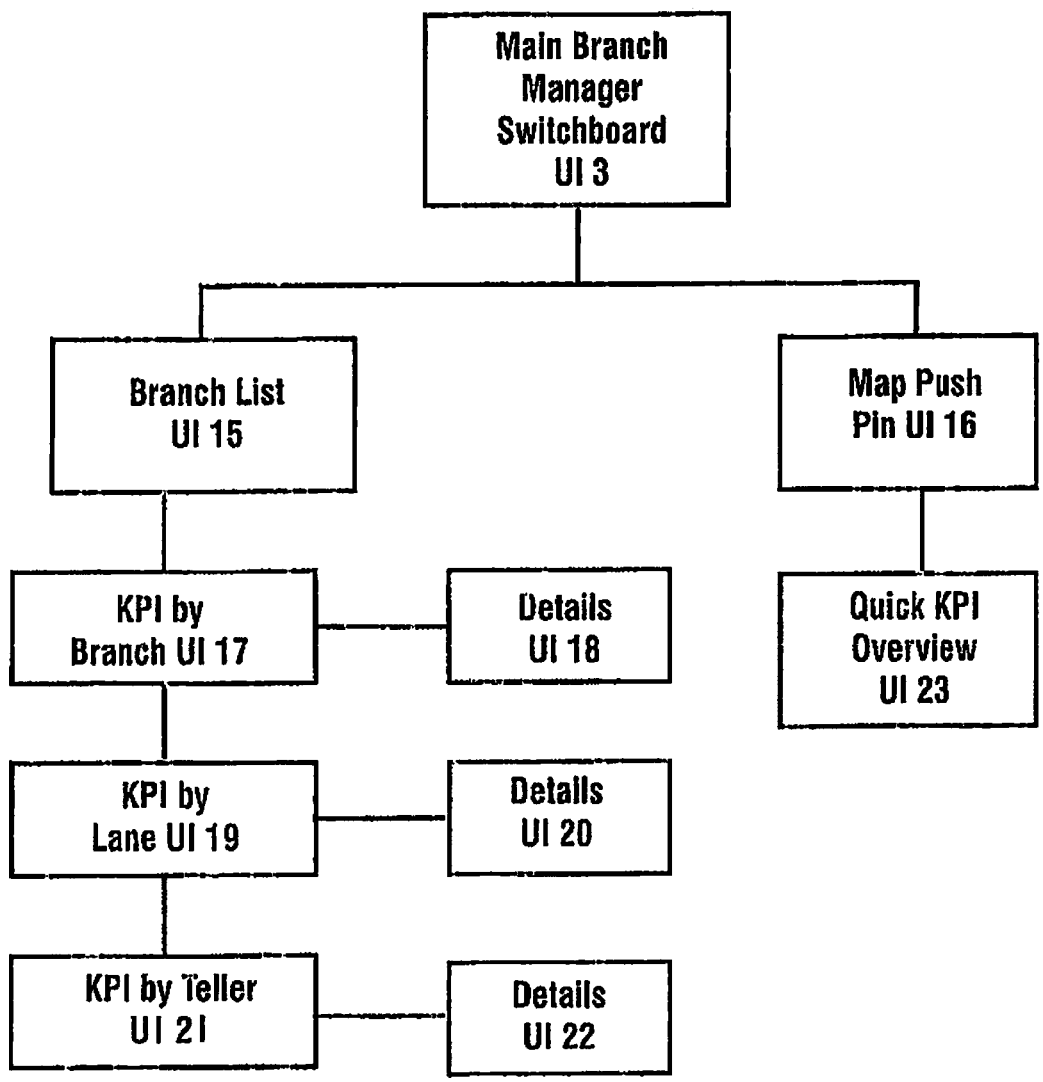
FIG. 34 shows another example of a user interface flow diagram.

FIG. 33 provides an example of a user interface design showing a user interface flow diagram. The user can be an administrator such as a manager. FIG. 34 shows another example of a user interface flow diagram. As can be seen in the Figures, the interface flows present a person with various flow options which lets the person access different device/event details at different remote facilities. For example, key performance indicators (KPI) can be displayed for branch unit identifier #17 (UI17), lane UI19, and teller UI21.

Figure 35:
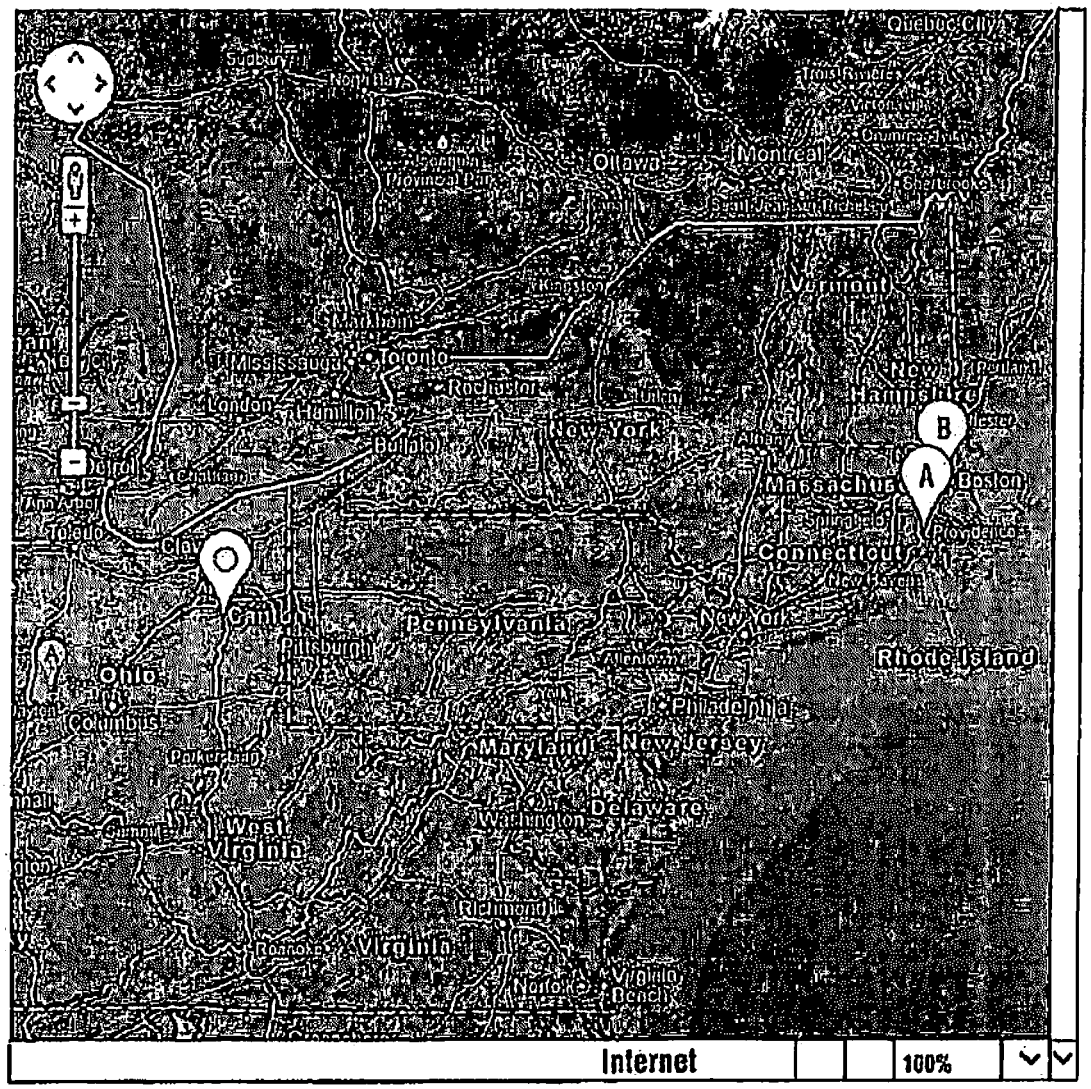
FIG. 35 shows a displayed geography map that indicates facility locations.

FIG. 35 shows an electronic display at a regional zoom level. The display provides a textual view and map view of bank branch locations within a particular manager's authorization. In the display example, there are two selectable map push pins situated in Massachusetts and one map push pin situated in Ohio.

The system allows a user to select branch criteria. Thus, in the example shown in FIG. 35, all three electronic push pins can represent geographic locations which contain at least one branch that meets the inputted criteria. The ability of a user to select particular criteria allows for data comparisons between similarly equipped branches (or between similar hardware devices).

The map shown in FIG. 35 includes a zoom in/out level bar. The map can also be reoriented up/down and left/right to recenter the map. Such map reorienting can conventionally be carried out by using a computer mouse to click and drag a map location. Other keyboard and touch screen functions can also be used.

Figure 36:
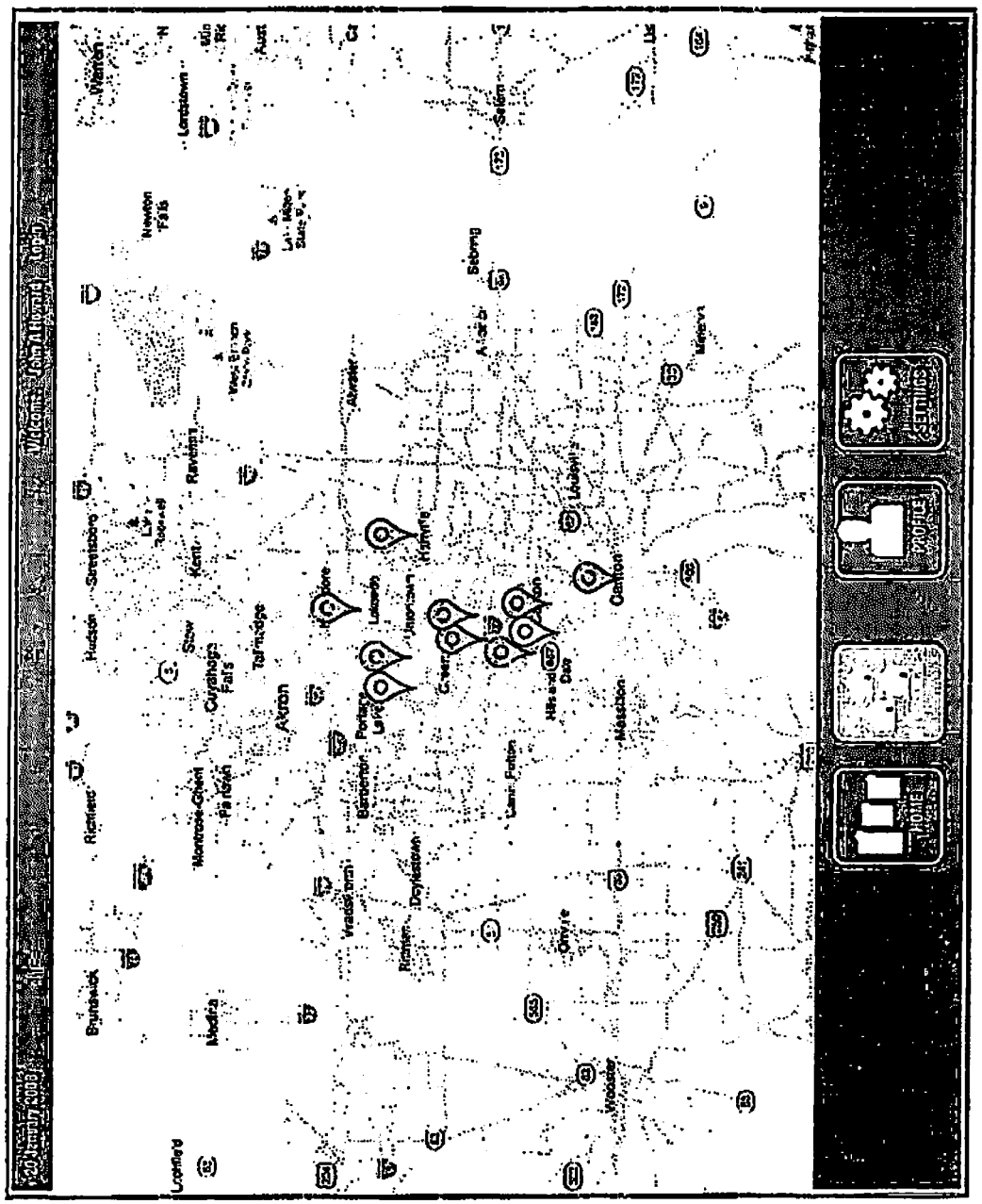
FIG. 36 shows another electronic map that visually signifies facility locations.

FIG. 36 shows a portion of FIG. 35 zoomed in at a higher level. The zoom-in feature can be accomplished through use of the zoom bar in FIG. 35. Alternatively, the zoom-in feature can be accomplished by selecting (e.g., clicking on) one of the displayed push pins in FIG. 35. That is user selection of the one map push pin situated in Ohio (in FIG. 35) can cause display of the map in FIG. 36. Other keyboard and touch screen functions can also be used to zoom in/out of maps.

The electronic map version in FIG. 36 is at a state region zoom level. This map also shows selectable (state level) push pins corresponding to approximate geographic locations of bank branches.

Figure 37:
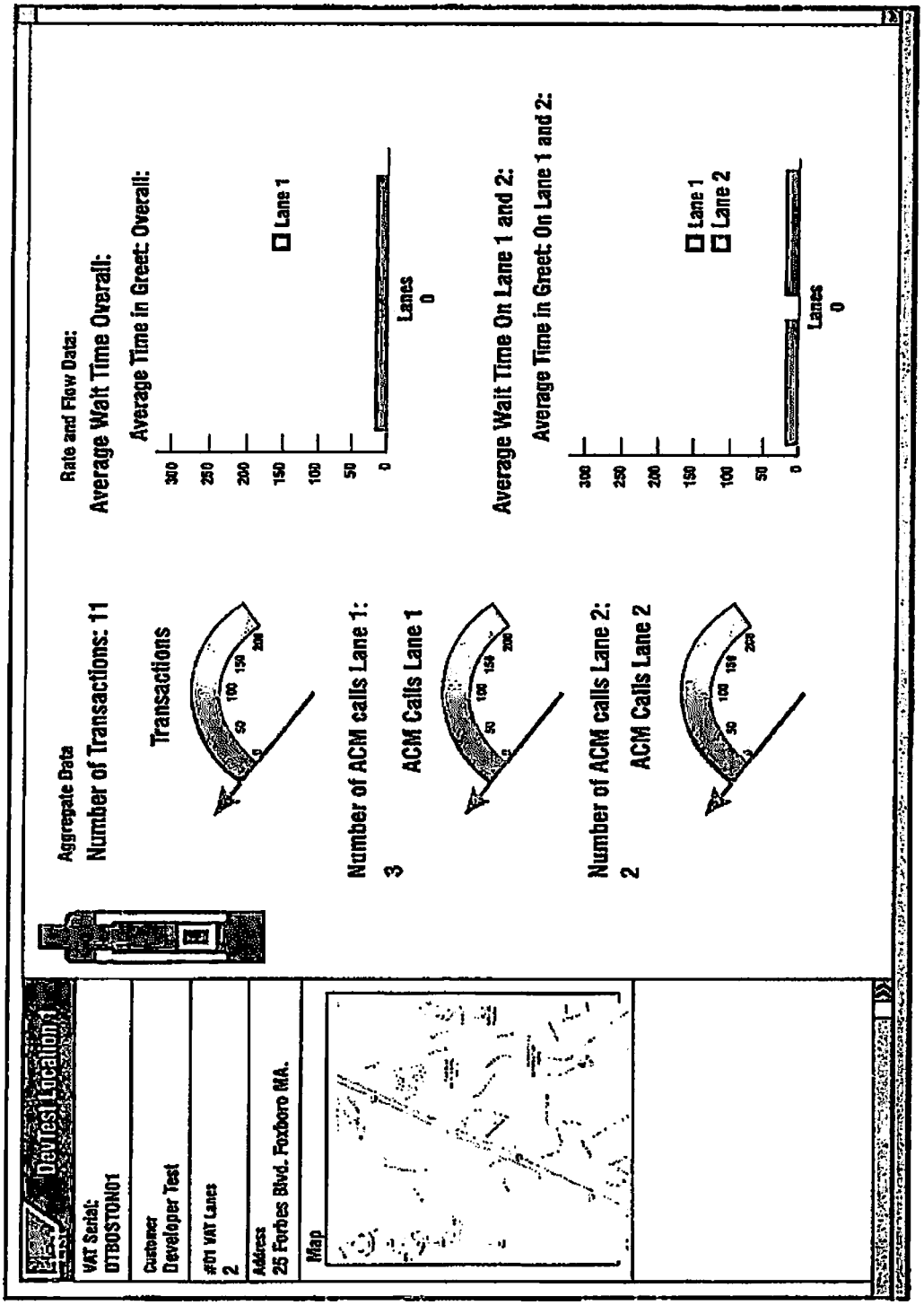
FIG. 37 shows location data and metrics transaction data for a specific facility.

FIG. 37 shows display screen providing both address and map data on the left side, and metrics data on the right side. The map data corresponds to a local bank branch located at 25 Forbes Blvd, Foxboro, Mass. The data includes a displayed electronic map zoomed in at street level. The shown push pin indicates the branch's street location in the city of Foxboro. The display is able to be reached following prior selections of displayed push pins, including selection of a push pin situated in Massachusetts in FIG. 35. The system allows the branch to be accessed by various user-input routes, including only using map push pins, or providing the branch identifier (e.g., branch number), or entering the branch address, etc. As discussed in more detail later, a user can select to have the map displayed (on the same screen) along with branch data associated with transaction devices/events that occurred at the branch.

The metrics data shown in FIG. 37 includes a dashboard meter, which indicates aggregate data for the Foxboro bank branch. As discussed in more detail later, a dashboard display can provide output relative to analog meters (like a speedometer, a tachometer, etc.). One meter shows an image representation of a curved analog meter. The meter's pointer indicates the total number of transactions. A text label (or heading) also indicates that the meter shows the number of transactions. The other meters (and their text headings) indicate the number of customers assisted in lanes #1 and #2. Rate and flow data are additionally provided in the display screen for the Foxboro bank branch. As can be seen, average wait time overall can be represented in the form of a chart (or graph) having a y-axis based on average time to greet and an x-axis based on number of lanes. In a similar manner, the average wait time on both lanes #1 and #2 can each (in an x-axis) be charted in a coordinate graph to average time to greet (in a y-axis). Thus, greet times for lane #1 and lane #2 can be compared to each other and also to the overall average greet times. As discussed in further detail later, the system provides for the display and review of many other metrics (statistics) for a particular branch selected by a user of the system.

Figure 38:
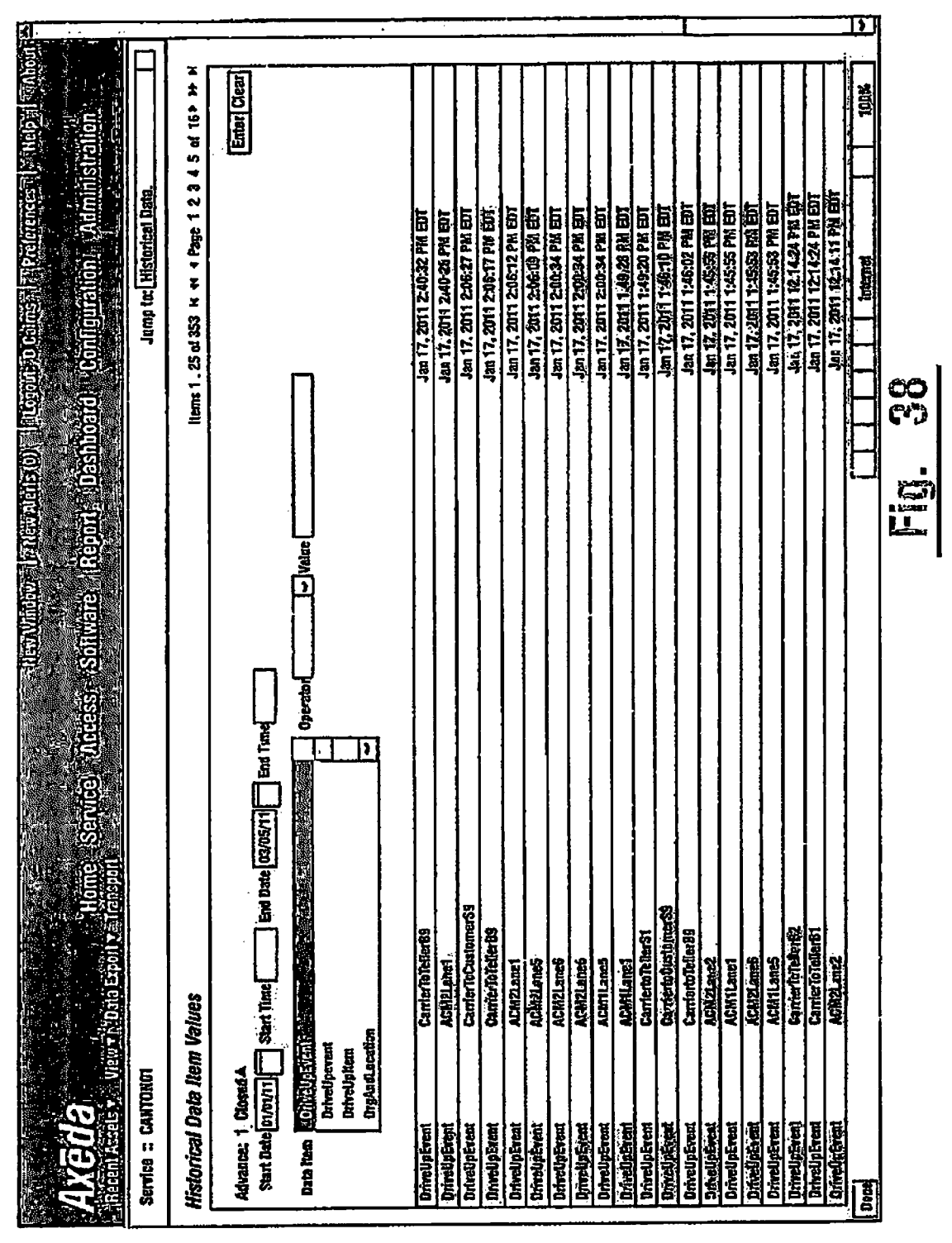

FIG. 38 shows an example of a drive-up event data collected by a queuing system at a bank branch. The system allows a user to input a start date, a start time, an end date, and an end time. Thus, a user can more precisely review data over a selected date/time range. The stored data is retrievably through a server. As shown, some of the collected data can follow event data models corresponding to ACM#/lane#, carrier# to teller#, and carrier# to customer#.

In an example embodiment, ACM can represent an Audio Control Module. For example, a vehicle detection sensor may send a signal indicative of a vehicle in a drive-up lane. For example, the signal provided by a vehicle detection sensor can be sent through a telephone interface to a system computer. The signal can start a clock that determines how long it takes the service provider (e.g., a bank teller) to audibly greet the customer via the facility's audio/speaker (communication) system. The signal can also initiate collection of other data, including total customer wait time, total time in a drive-through lane, predicted wait time, etc. In other embodiments the greeting may not be audible, but by a different mode such as displayed text. For statistical purposes the signal sent by the sensor can constitute the start of an ACM call. Data regarding ACM calls can be collected and tracked.

The signal can also result in a service provider being notified of the vehicle's presence in various modes, including an audio mode (e.g., a beeping sound), a visual mode (e.g., a flashing/blinking light on a display screen), and/or a graphical mode providing a representation (with an assigned ID) of a vehicle in a lane (e.g., similar to an air traffic control center display).

In another embodiment, the start of an ACM call can be initiated by the customer. For example, a drive-up lane can be associated with a call box having a call button. When a customer manually pushes the call button, then the call box sends a signal which causes the ACM call to be initiated. As previously discussed, the signal can also be used to notify the service provider of the presence of the waiting customer.

Figure 39:
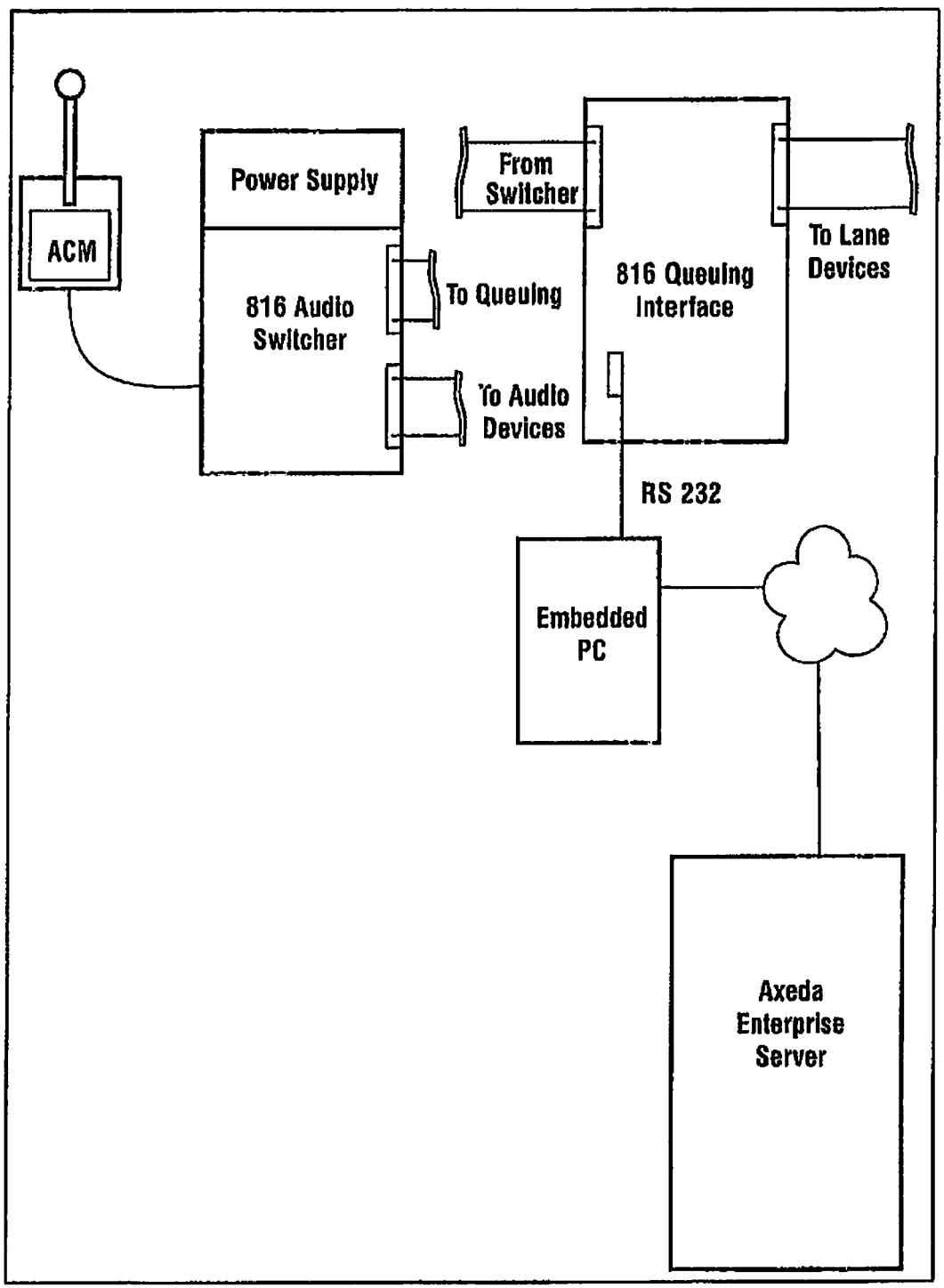
FIG. 39 shows an example of the system's hardware for collecting metrics data.

FIG. 39 shows an example of hardware associated with a system for collecting transaction device/event data involving a customer in a drive-through lane. The hardware arrangement allows a vehicle detection ACM signal to be sent to an audio switcher, then placed in a queue, then provided to a computer, and then sent (such as via the Internet) to a remote server for storage. As previously discussed, the signal can be converted into collectible data before it is sent to the server.

Figure 40:
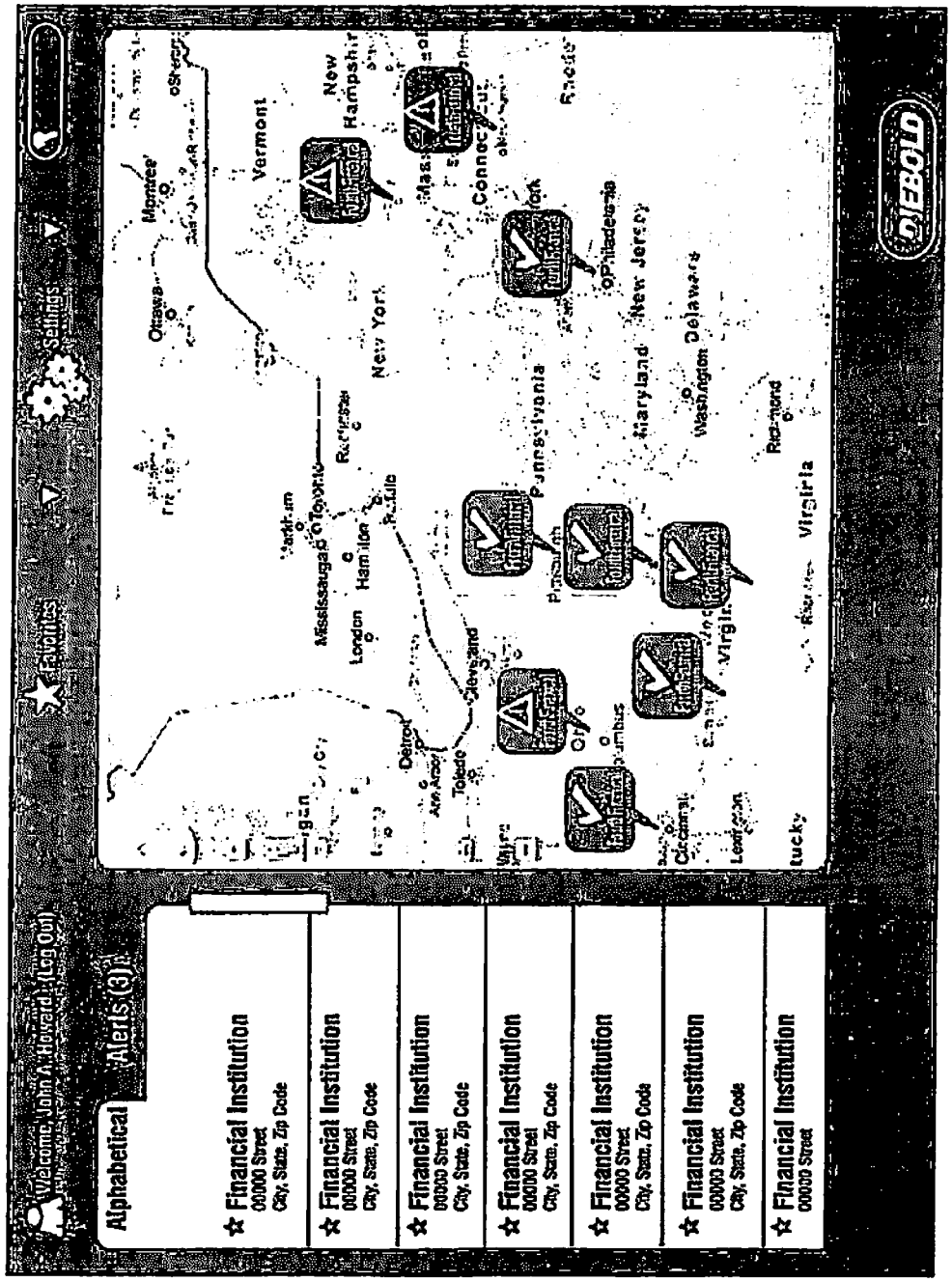
FIG. 40 shows another example of system user ability to access and view data collected on facilities.

As previously discussed, stored transaction device/event data can be analyzed and reviewed by authorized personnel. FIG. 40 is another example of an electronic map that can be produced by the system. As can be seen, the map shows alert indicators associated with three financial institutions that are currently under some type of alert. The system allows a user to view different priority levels of alerts. Further, the user can select criteria which define the different alert levels. For example, a priority one class of alert can be reflective of an alarm being tripped at a branch. A class three alert may relate to the system determining that a low cash-supply exists at a particular branch. Other alert classes can relate to employee under staffing, a non functional mechanical device, a managerial decision being requested, etc. As can be seen, a user can select to have financial institutions indicated in different information formats, including listings arranged by alphabet and by alerts. FIG. 40 shows a display screen providing an alphabetically arranged list of financial institutions next to a map that indicates the geographic locations of the financial institutions.

Figure 41:
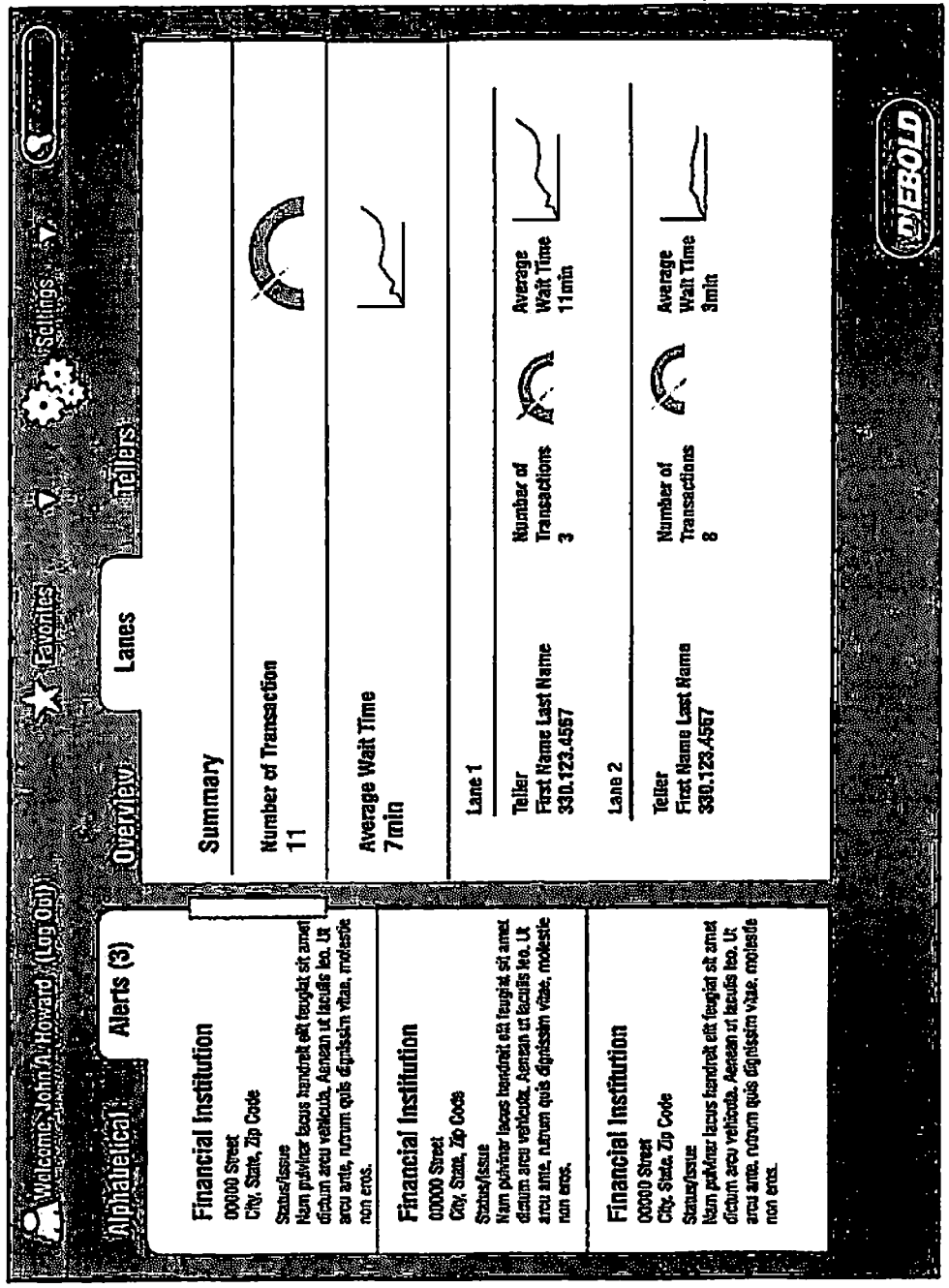
FIG. 41 shows transaction information for a financial institution under an alert.

FIG. 41 shows a display screen that provides information relating to each of the three financial institutions currently under an alert. The respective information provided corresponds to the reason for the facility's alert. The alert-related information can also include suggestions provided by the system computers to alleviate or remove the alert status. The system also allows the user to select from a plurality of languages in which the information/data is to be presented.

Another part of the screen shown in FIG. 41 includes selected transaction data that was collected from the first listed institution having an alert status. This data indicates the number of transactions and the average wait time per transaction for particular drive-up lanes. The display visually points out a problem involving lane #1 taking much longer to complete a transaction than lane #2. As can be seen, other selectable options enable a reviewer to see an overview of facility data. Likewise, data related to each of a facility's tellers can also be examined.

Figure 42:
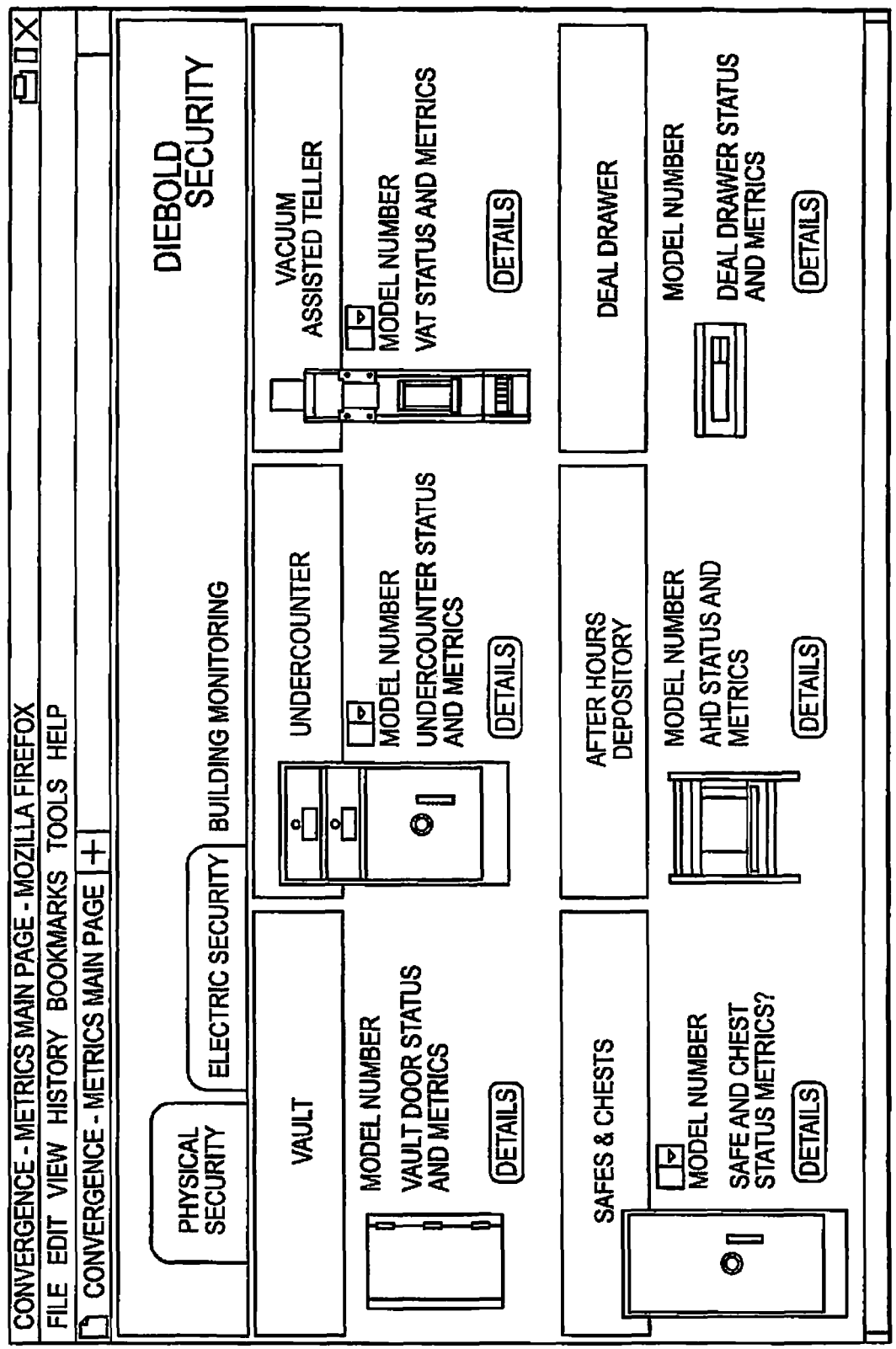
FIG. 42 shows a representative display of physical security units on which metrics data is collected at a facility.

FIG. 42 shows a display screen providing a holistic offering for managers (e.g., of a financial facility, pharmacy, etc.) to view the status and metrics of their entire facility operation. From the display screen the manager can access the current operational status of several devices. The manager can also access the stored metrics (statistics) information for each of a plurality of facility devices. As shown, information can be provided on devices (units) such as a vault, an undercounter, a vacuum assisted teller (VAT) carrier arrangement, safes and chests, after-hours depository, and a deal drawer. In an example embodiment a displayed check box indicates what particular devices or items are provided at the particular facility. A transaction device without a check mark indicates that the facility lacks the device. The devices may be represented as icons on the display screen.

As can be seen in FIG. 42, the display also provides a selectable button (or link) labeled "details". Details and data regarding a particular device can be furnished by the system in response to the system user (e.g., a manager) selecting a details button, such as via a mouse click.

Figure 43:
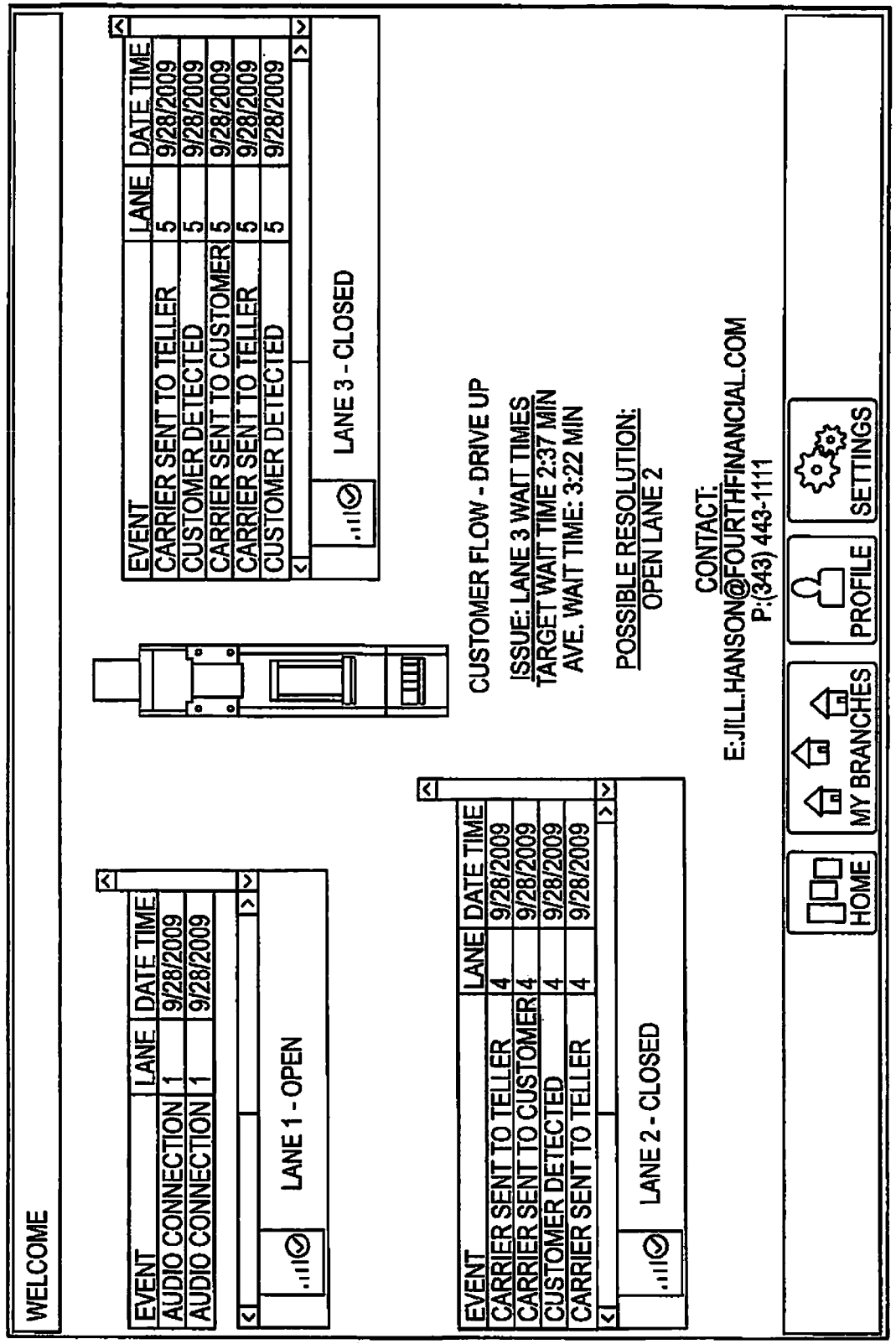
FIG. 43 shows a display of metrics data related to drive-up lane events.

FIG. 43 shows a display screen that provides real time facility information with regard to drive-up customer flow. The display provides information on the number of open lanes, and recent transaction events associated with those lanes. As shown, at least lanes #1 and #3 are currently open, whereas lane #2 is dosed. The average wait time for lane #3 is currently exceeding the target wait time. The system additionally recognizes the wait time problem and provides a resolution for the manager's consideration, i.e., open lane #2. Employee contact information associated with the suggested resolution is also provided. In an example embodiment, the display shown in FIG. 43 can be accessed following user input that corresponds to the details button for the VAT carrier shown in FIG. 42.

The programming also allows metric data for a particular facility to be reviewed in different formats. One available display format is in the form of a dashboard. Again, a dashboard display can provide output relative to analog meters (like a speedometer, a tachometer, etc.). A dashboard display format can be selected to show a facility's statistical data for particular dates, including real time data for the current date. For example, a manager may select (via a PC) an option to review current day transaction data in a dashboard display format. The interface then outputs a dashboard that shows real time transaction data.

Figure 44:
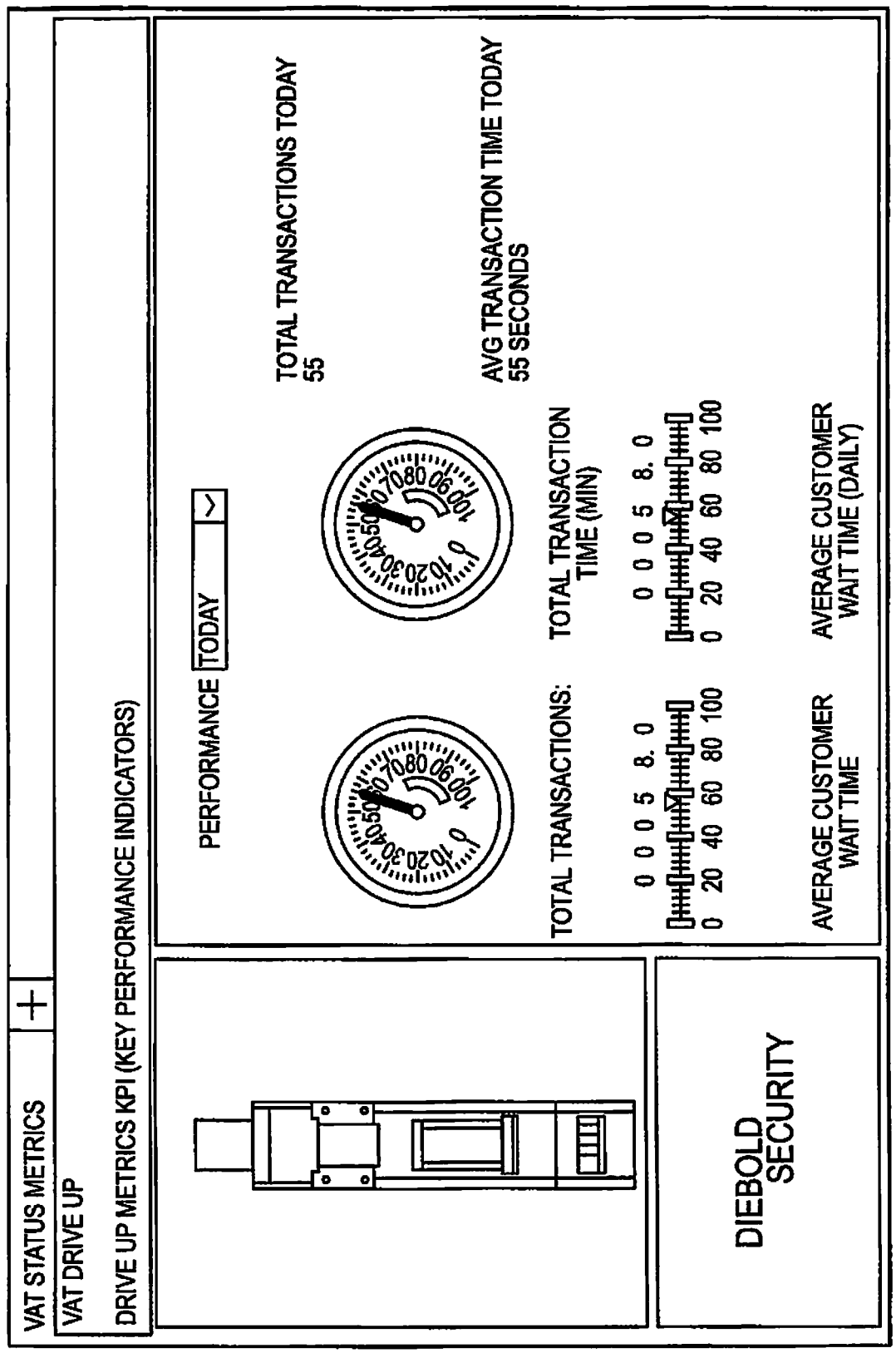
FIG. 44 shows a system user display that provides transaction time data and wait time data.

FIG. 44 shows an image of a selected device (i.e., a VAT carrier) and data associated with that device. The device image quickly allows the user to know what device data is being presented. Data can be presented in the form of a dashboard. The displayed data includes the current total number of transactions completed for the day (on a first meter), the average time per transaction for the day (on a second meter), the average customer wait time (on a third meter), and the daily average customer wait time (on a fourth meter). The second, third, and fourth meters can be expressed in seconds.

Thus, drive-up metrics KPI (key performance indicators) can be displayed with regard to VAT drive-up. It follows that KPIs for a particular facility site can be aggregated by day, week, month, and year. Of course, as previously discussed, KPIs can also be presented in shorter time frames, including real time.

As shown in FIG. 44, the first and second meters have a radial or circular configuration, whereas the third and fourth meters have a horizontally linear configuration. However, it should be understood that other meters can have other shapes and sizes. For example, a meter may have a vertically linear configuration, like a vertically arranged thermometer.

Different dashboard display formats can be selected to allow further detailed analysis when comparing data. For example, a first meter may show the average customer wait time for the current day, while a second meter shows the average customer wait time over a range of days (e.g., the prior three days). Thus, week days can be compared to other week days, and weekends can be compared to other weekends.

Another dashboard display can be used to breakdown all of the transaction event data to only show statistics related to a particular type of transaction over a chosen date/time period. For example, a dashboard may be used to show so far for the current day, both the number of check cashing transactions (on one meter) and the number of twenty dollar bills given to customers (on a different meter).

As can be seen, the use of dashboard displays allows a manager to make real time decisions regarding many factors or issues, including those related to employee staffing and bank resources (e.g., current supply level of currency notes).

Again, facility data can be reviewed for particular facility devices for which statistics are kept. The system interface programming allows a person (e.g., a bank employee) to review statistic data for a particular device. For example, data on a particular carrier can be analyzed to resolve a transaction dispute. The carrier identity data is linked in storage to the particular transaction's identifier and/or the customer's account. The carrier data can provide evidence on whether or not the carrier (or any carrier) was ever involved in the disputed transaction.

Furthermore, service personnel can use carrier data to review service data related to carrier wear and pneumatic tube wear. For example, a comparison of carrier data may show that carrier travel time is slowing down. Such information can be useful in determining whether a carrier or a pneumatic tube should be repaired or replaced. Statistical data regarding other facility devices (e.g., a microphone, an exterior speaker, a deal drawer, etc.) can similarly be reviewed and/or compared.

As can be seen, the statistical data collected can be used for many purposes, including both remote review usage and local review usage. The data collection allows for cloud based accessible metrics and remote status (business analytics) to measurably improve both operational and service performance of assisted drive-up transactions. Individual facilities (branches) can review their own statistics for a given time period (year, month, day, hour, etc.). Different branches can be compared to each other. Efficient patterns can be recognized and allocated to other facilities. The type of equipment which produces the best results can be determined. Information resolved from data analysis allows changes to be made to improve customer service. Peak staffing days/hours can be analytically determined. Staffing adjustments can be made in response to real time data. The obtained statistics can further be used in the training of new staff. New equipment can be tested for analytical review.

As previously discussed, the system allows for collection of many different types of device and event data, including audio and video (DVR, PVR) digital data. The vast array of collected data also enables a facility supervisor to visually review every event. For example, a supervisor can review who came inside a particular bank branch, who they talked to, what they did, how long it took, etc. The system also allows for the video data to be linked to one or more facial recognition systems. Thus, a supervisor can operate the system to cause it to automatically search for particular individuals, such as VIPs, suspect people, etc. The system can also alert a facility employee in real time that a VIP has just entered their facility. This heads-up notice gives the employee ample time to quickly greet and assist the VIP.

As previously discussed, the system can reproduce or recreate an entire transaction using computer-generated images representative of the drive-up lane, the vehicle, sensors, transaction devices, the carrier, the teller, etc. The recreated transaction can also be configured to accurately match the same length of time as the actual transaction.

The system can also reproduce or recreate different parts or functions of a facility. For example, the actions of a particular teller can be reviewed over a particular time period (e.g., ten minutes) to determine what caused the teller to make a mistake in a transaction. The computer generated recreation can again include images representative of the drive-up lane, the vehicle, sensors, transaction devices, the carrier, the teller, etc. The recreation allows the supervisor to view the situation from the teller's point of view. The supervisor may find that the teller was handling too many transactions at the same time. The findings may lead to changes that result in additional staffing and thus better customer service.

The example data collecting system can also implement a variety of different ways to identify a drive-through lane customer and/or their account. The ability to keep track of particular transaction activity performed by a particular individual allows for activity data to be accurately captured, stored, and then later retrieved and reviewed by a user of the system.

Figure 45:
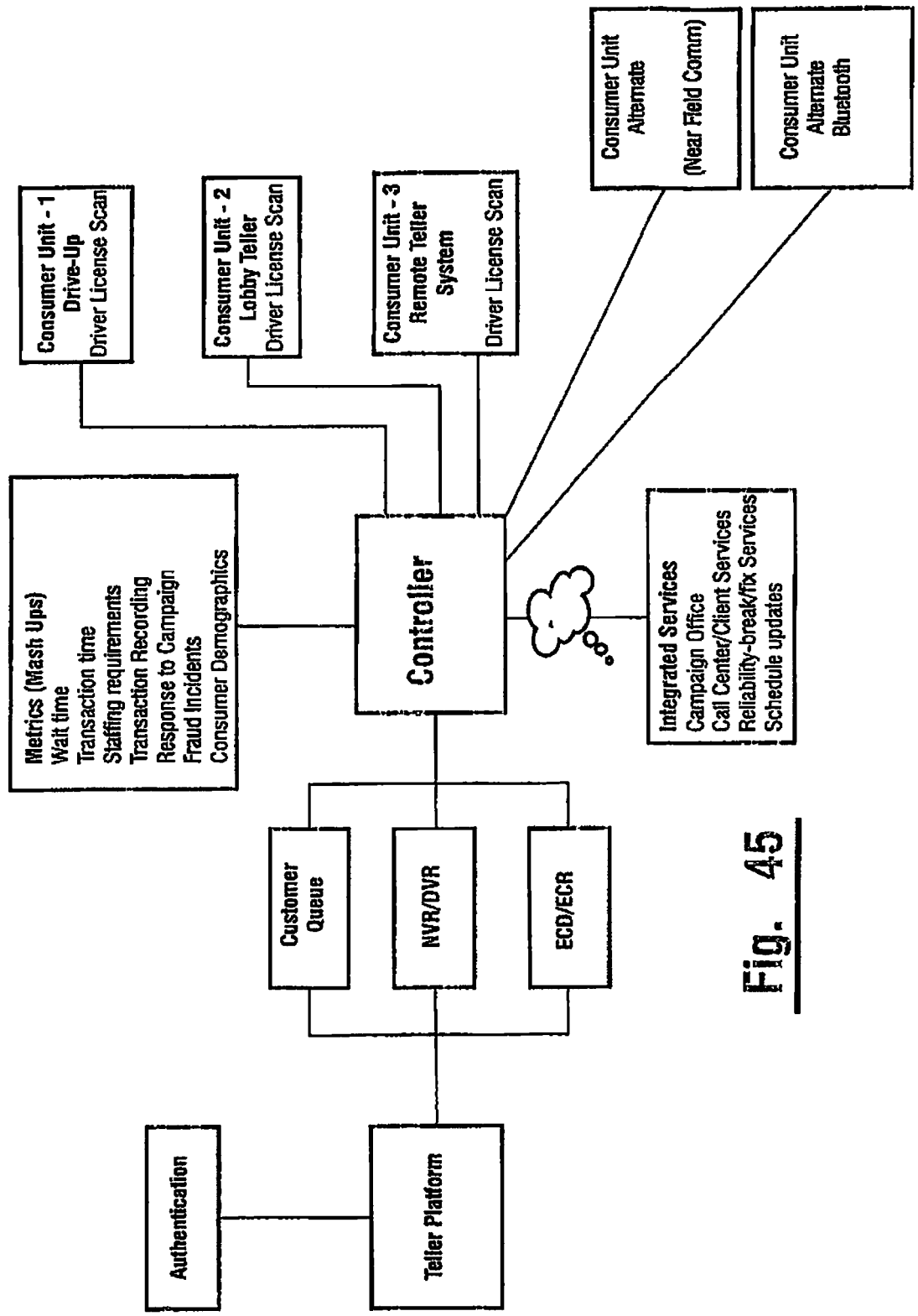
FIG. 45 shows the system's ability to provide integrated services to a transaction facility.

FIG. 45 shows an example of a diagram corresponding to a transaction identification (ID) management process. A controller (one or more computers) is associated with metrics data as previously discussed. Again, metrics (mash ups) data can relate to wait times, transaction times, staffing requirements, transaction recordings, responses to campaigns (e.g., advertising or promotion campaigns), fraud incidents, consumer demographics, etc. The controller can also be associated with other services integrated with the metrics service. These other integrated services may include campaign office services, call center/client services, reliability break/fix services, fraudulent device detection services, scheduled (software) update services, etc. The controller is also shown associated with customer queues, DVRs, reader devices, teller platforms, and (ID) authentication.

FIG. 45 additionally shows the controller associated with receiving customer identifying data through use of differently located driver license scanners, a near-field communication (NFC) device, and a Bluetooth communication device. FIGS. 46-48 respectively show examples of an NFC reader, a driver license scanner, and a Bluetooth reader. Other identifying data readers may also be used, including point of sale (POS) devices and biometric reading devices.

In an example embodiment, the system can identify a drive-through lane customer by their driver's license (or other government issued identification item). The system can use identifying data from the license to retrieve customer account data from a database. The drive-through lane is associated (equipped) with a driver's license reader/scanner.

A state driver's license has user identifying data. Such license data can be presented by a magnetic stripe, a bar code, written text information, and/or a photograph. Each of the magnetic stripe, bar code, and written text can include data corresponding to a person's name, a physical description, age, address, a license number, issue date, expiration date, etc. A magnetic stripe reader, a bar code reader, and a written text reader can be used to read the appropriate data format. For example, a written text reader can comprise a scanner that uses character recognition software to read written text information. Other formats can also be used to read stored data on a license, which data may involve memory chips, RFID tags, holograms, electronic ink, encryption, other security features, etc.

An example driver license scanner can have specifications with regard to several features, including size (117 w mm.times.168 d mm.times.68 h mm), weight (640 g), power (12 v/1 A external supply), MTBF (3 years), Host CPU (>1.5 Ghz), RAM (>1 GB), hard disk (>10 GB), interface (USB 2.0), OS (Windows 2000 or XP), document (card) size (55 mm.times.85 mm), light source (visible, near-infrared), imager with CIS (contact image sensor) scan heads, resolution (600 dpi), color (24-bit RGB), scan speed (41 mm/s), filed formats (BMP, TIFF, JPEG, PNG) card feed (motor driven), surface scan method (card front in visible and near-infrared light, card back in visible light), operating environment (10-40.degree.C., 80% RH, non-condensing), storage (−20-70.degree.C., 5-95% RH, non-condensing), Languages (internationalization supported), text extraction (OCR or standard font), bar code reader (1D, 2D, and 3D bar codes are parsed and presented), magnetic stripe reader (stripe data is parsed and presented), software environment (.NET native, .NET, and COM SDKs), and authorization speed (3-5 seconds after card is scanned). It should be understood that the above specifications are for an example driver license scanner, but that other driver license scanners with other specifications may also be used.

The example driver license scanner also includes programming (software, firmware, etc.) that can return (read) data from several different data fields. These fields can include data related to address, birth date, birth place, document (license) number, document class code, document class name, expiration date, eye color, full name, given name, hair color, height, issue date, issuing authority, issuing state code, issuing state name (text), license class, license endorsements, license restrictions, MRZ, nationality code, nationality name, personal number, photo (image), sex, signature, surname, weight, etc. Read driver license data can also be stored in correlation with other transaction metrics data, such as scanner ID, scanner firmware version, lane ID, date/time, etc.

The example driver license scanner programming can also provide validation of data fields. For example, a scan may result in recognition/verification (or the presence) of an ultraviolet response corresponding to a photo, a valid birth date, a valid issue date, a valid expiration date, an expired document, an ultraviolet response corresponding to material, a composite check digit, a document number check digit, a personal number check digit, a birth date check digit, a document security level, a visible pattern, an ultraviolet pattern, a near-infrared pattern, a near-infrared microline, etc.

In the example embodiment, system computers have access to a database (which can comprise one or more data stores) including driver's license data for a plurality of persons. Because a driver's license is issued by a government agency, the database can be treated by the system as containing accurate and reliable data. Data obtained by the license scan can be compared to data in the database. The data field comparisons assist the system in determining whether the license as a whole should be treated as valid. However, not all of the license data that is present may be read due to license card wear, marks, etc. It follows that some comparisons of data will not result in a match. Thus, the system is adjustable to deem a license as valid if a predetermined percentage (e.g., 90%, 95%, etc.) of data field comparisons match.

Figure 49:
FIG. 49 shows some system results from driver's license scan.

FIG. 49 shows a captured image of the front side of a driver's license. Also shown are some results applied by the system in determining whether the scanned driver license is valid. As can be seen, data fields corresponding to document (license) class, issue date, unexpired, and magstripe presence were determined to be valid.

Error icons are provided at the teller interface (display) to alert the teller if there is an issue (e.g., ID invalid driver license) with an ID in a specific lane. For example, an issue may involve the ID type (e.g., college ID card) used by the customer not being supported by the scanner. Another issue may involve a scanned ID (e.g., a driver license) being indicated as invalid. An error icon (or symbol) can be part of each customer field that is displayed in the teller's drive-up queue for a particular lane. The error icon associated with a customer can be on (lit and/or be a specific color) to indicate an error status. Likewise, the error icon being off (or be a different color) can indicate to the teller that there is no issue with the scanned ID. At the customer end, the scanner can have an LED array that will change colors to indicate an issue has occurred.

Figure 50:
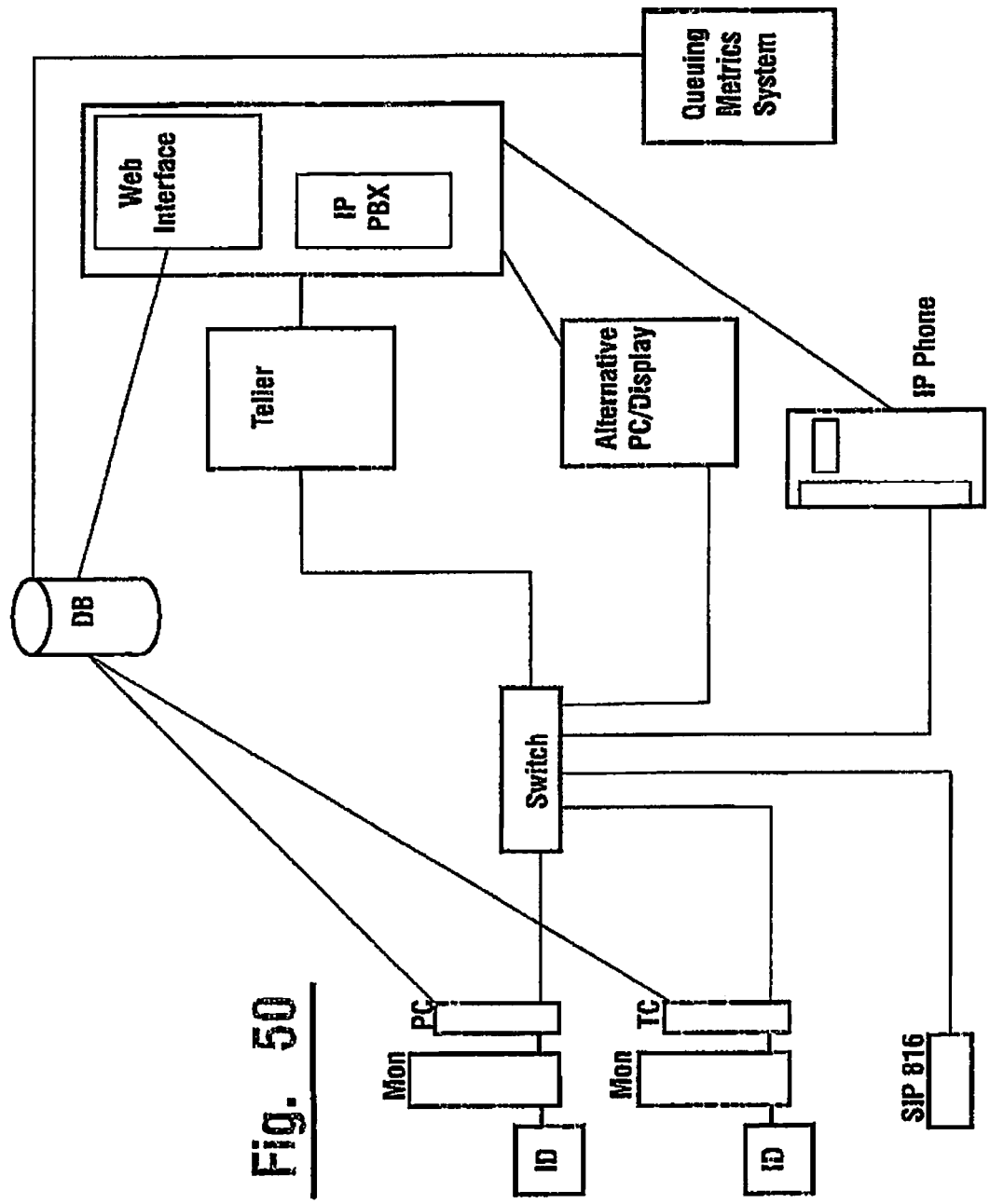
FIG. 50 shows an example overview of the system's ability to provide drive-up ID management services.

FIG. 50 shows a network overview diagram. As can be seen, a local computer (e.g., a PC) can cause scanned ID data to be compared with data in a database (DB) in determining whether the ID is valid. Results from the verification process are transmitted to the teller. In an example embodiment, a local computer sends ID data to a server that is in operative connection with the database. The communication of data can be through either a local network or the Internet (web interface). As previously discussed, ID data captured by the scanner can also be furnished to the metrics system, which can correlate the ID data with other transaction data.

The database (e.g., a plurality of data stores) can also include non-license information about a person, such as financial account information, captured event information, transaction information, captured photos, etc. All of this data can be used by the system in verifying the identification of a person. For example, the system can compare database data to a photo read from a license. Such a process can involve comparing the read photo to a picture (photo, image) captured in a previous (latest) transaction with the person. The system includes facial recognition software which can compare images.

Additionally, the system allows for a photo that was read from a license to be compared to a facial image of the person currently in the particular drive-through lane. The facial image of the current drive-through lane user can be captured by an image capturing device (e.g., a camera) associated with the particular drive-through lane. The system also allows for license text data read by a reader adjacent the drive-through lane, to be compared to data in the database. The read text data can also be compared to data presented in other formats on the license, such as data in a magnetic stripe or a bar code.

As can be seen, license data read from a first data format can be compared to license data read from a second data format and/or compared to user data located in a remote database. Thus, one or more pieces of verification data from a license can be used by the system to establish that the license/user is genuine.

The example system includes additional processes to identify a user, including use of biometric data. System embodiments include use facial recognition software to compare a current user's face captured by a camera to data stored in a database. In another embodiment the system can identify a person as an authorized user by their voice. In an example embodiment, a driver license data scan can be the primary type of identification/verification method used, followed (if necessary) by a secondary type of identification/verification method (e.g., use of biometric data). Other verification methods can have other verification priorities.

As previously discussed, the system includes components associated with the drive-through lanes. A customer and teller can communicate through two-way video and audio. A color video output screen can be a part of or adjacent to a lane's user interface (at which a pneumatic carrier may be located). A camera adjacent to the video screen can capture images of the user for view by the teller. The lane's user interface can include a card reader for financial debit and credit cards. The interface can have a PIN pad for PIN inputs when debit cards are used.

The drive-through lane is also associated with a wireless type reader that obtains user data that can identify a person and/or their account. The wireless type reader can involve wireless communication of identifying data, including use with wireless type cards. Wireless cards can use RFID type chips or other types of wireless chips, including near-field communication (NFC) type chips. Wireless communication of data in the system can also involve other (non card) devices. For example, user data can be wirelessly communicated from a user cell phone to the system. The wireless data communication can involve data transfer formats such as Bluetooth and near-field communication (with bumping initiated).

In other embodiments the system allows for a customer waiting in line in a drive-through lane to be contacted by phone by a service provider (e.g., a live teller or an automated teller). The example system can automatically obtain a customer's phone number from a database that includes phone numbers correlated with other customer data. This other customer data can include a vehicle license plate number, a vehicle VIN number, facial image identification data, voice identification data, etc. The vehicle data and facial image data can be captured (read) by one or more system cameras (or other data capturing devices) located adjacent the drive-through lane. Directional microphones can be used to capture audio data from a customer. Sound analysis (e.g., submarine detection technology) can also be used to correlate the unique sound caused by a particular vehicle to a particular customer. Thus, the arrangement enables the system to automatically obtain customer data from a customer in a drive-through lane, then retrieve the customer's (mobile) phone number from a database by using the obtained customer data, and then place a phone call to the customer's phone.

A service provider can communicate with the customer by phone to verify that the customer is waiting to do a transaction and/or to find out what type of transaction they wish to conduct. The communication can be audio or text based. The example arrangement enables the two-way communication to occur before the customer has reached the position of the drive-through lane's user/teller interface station, at which position physical items can be passed between the customer and the teller. The database which includes the customer phone numbers can likewise be used to provide the teller with customer identity information. Thus, a calling teller is able to greet a called customer by their name.

The service provider can be a live teller, including the teller assigned to the drive-through lane in which the customer resides. The service provider can also be a computer with a program that can automatically communicate with a waiting customer. The computer can provide synthetic speech prompts to the customer. The computer can also recognize voice inputs (including transaction selection voice input) from the customer. The computer can cause the obtained customer data to be output through a display at the (live) teller station. This customer data can include transaction data which indicates the type of transaction desired, an amount associated with the transaction, an account number, etc. The system can cause the teller display to output other customer identity data, such as customer name, customer image, and timely information such as customer's birthday, etc.

The system can further use the voice data provided through the customer's phone to additionally identify/verify the customer as an authorized user of the facility. Other information that allows the teller to make a decision regarding an authorized user can also be output on the teller display.

As can be seen, pre-transaction automated communication with a customer enables the system to obtain pertinent transaction information before the teller communicates with the customer to carry out a transaction. This pre-transaction information can be automatically obtained while the teller is still assisting the current customer. As a result, the system can know in advance (and provide through the teller's display) several aspects of the transaction desired by the customer. The information provided by the customer allows the transaction to advance before the teller has to act. Thus, the example arrangement can assist in speeding up drive-through transactions and reducing the size of vehicle queues. It should be understood that facility personnel other than the teller (or other than an automated computer) can act as an intermediate to assist a teller in obtaining the pre-transaction data.

The ability to pre-analyze awaiting transactions in a particular drive-through lane also allows the system to predict the expected wait time for a particular customer based on their lane position. That is, the system can calculate predicted waiting times for particular lanes.

In another example embodiment a vehicle enters a pre-lane area before entering of any of the drive-through lanes. Customer data (e.g., vehicle license plate number) can be read while the vehicle is situated in the pre-lane. As previously discussed, from the obtained customer data the customer's phone number can be obtained. The initial phone communication from the service provider (e.g., a teller) to the customer can be used to direct the customer to the shortest lane, based on the current expected wait time of each lane.

Furthermore, certain facilities may want a secret pre-lane location in order to reserve the ability to quickly provide service to VIP customers. For example, the status of a particular one of the drive-through lanes may be intentionally visually indicated (marked) to be "closed". Thus, the particular (reserved) lane will be kept free of vehicles. Upon detection of an object associated with a VIP, the visual indicator for the particular lane is automatically switched to the "open" status. The detection can occur at a distance from the drive-through lanes in order to give the VIP ample time to see that an empty lane is "open". As previously discussed, a wireless type device (e.g., involving RF, RFID, NFC, etc.) can be used in detecting the presence of the VIP. For example, an RFID tag or an NFC chip can be associated with the vehicle, such as being attached to the vehicle's license plate, window, or mirror, etc.

In other embodiments, switching the reserved lane to the "open" status may not occur until the VIP'S vehicle (or the VIP) is detected as being physically located in the "closed" lane. The VIP can have pre-knowledge to drive directly into the "closed" reserved lane to receive priority service. Once the VIP is detected, then the lane is automatically opened.

In still other embodiments, the visual indicator for the reserved lane may not be switched to the "open" status upon VIP detection. That is, the reserved lane may (permanently) remain in a "closed" state to ensure that the lane is kept available (clear of vehicles) for other VIPs.

Also, other visual indicators may be used in addition to the "closed" and "open" status indicators. Certain visual indicators may be specifically used (as inside information) to inform only VIPs. For example, a specific visual indicator can be used to signal that a lane is actually closed for repair. The VIPs can be pre-informed as to the meanings of all of the visual indicators.

In additional embodiments, the arrangement allows a VIP to provide early notice (e.g., via a wireless communication) to a bank of their desire to use a specific drive-through facility within a specific range of time. The facility can then purposely cause one of the lanes to have the "closed" (reserved) status during the specified time range. The lane is then closed to regular customers but is open to the VIP. The VIP can simply drive into the lane and be attended by a service provider as if the lane were actually open. Detecting of the VIP'S vehicle and/or switching of the visual indicator may additionally be used, as in manners previously discussed.

In other example arrangements, a user display is provided to output information that indicates which drive-through lane has the shortest wait time. The user display is located so that it is visible to a customer located in the pre-lane. The output displayed can be automatically (and accurately) controlled by a computer that analyzes the pre-transaction data and calculates the lane wait times in real time.

In other embodiments the system can request/instruct a customer to provide phone inputs corresponding to the desired financial transaction. For example, the instructions can cause the customer to follow a predetermined outlined menu of customer-selectable options associated with different types of transactions. Once the particular type of transaction (e.g., cash a check, deposit a check) is selected by customer input, the menu's sequential branching will then present the next selectable options available under that particular type of transaction. Some initial instructions can request certain customer input before the vehicle reaches the user interface station. Other instructions can inform the customer what to do when they reach the user interface station, such as swipe their card (e.g., driver's license card, debit card), input a PIN number, provide user/account identification, send papers in a carrier, etc. Again, the system's ability to receive transaction information from a customer before the customer vehicle reaches the user interface in the drive-through lane, can result in faster transaction times (and thus shorter wait times for customers). Requesting pre-transaction data can also cause customers to feel as though they have been waited on sooner.

The total data provided through a customer's cell phone (or other mobile communication device) can be compiled and organized by the system's computers. Again, the customer-provided pre-transaction data can include the individual's name, the type of transaction they wish to conduct, the account number, etc. The system computers can combine the customer-provided data with other stored data, and then present the total compiled data in a reviewable format at a teller's display device. For example, system computers can use the inputted account number to access the account balance, prior types of transactions the customer has conducted, and other information regarding the account. The system computers can also retrieve other information (e.g., third party data) needed to fulfill the desired transaction.

As previously discussed, all data regarding a particular transaction can be stored in one or more databases where it can be maintained and statistically analyzed with regard to a plurality of transactions. Thus, information about a single transaction is stored in correlated relation with the device metrics data.

Figure 51:
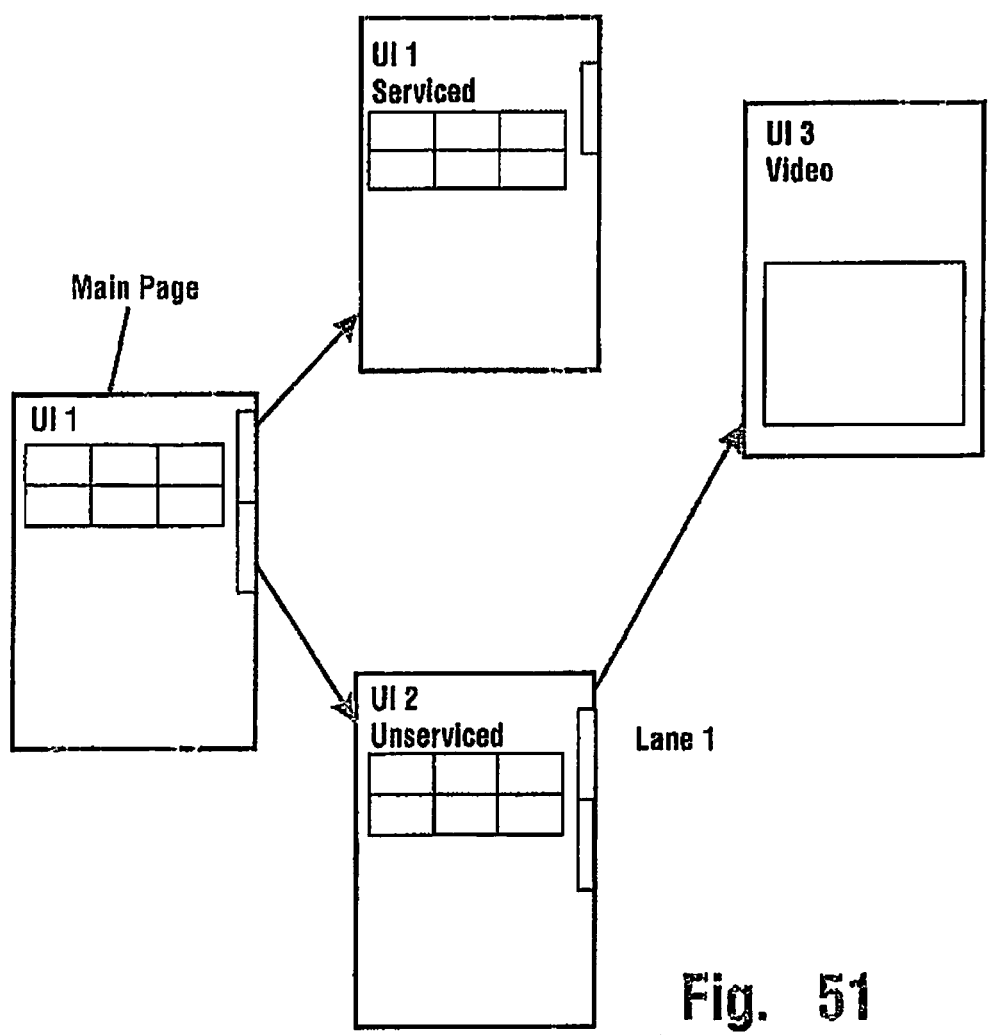
FIG. 51 shows an example of service provider platform display with respect to drive-up lane information.

FIG. 51 shows a teller display screen for lane #1.The display provides a broad outline of a lane queue for a teller. The display shows that a first customer still in the lane has already been serviced, but that second and third customers have not yet been serviced. The third customer is shown as being linked (in the unserviced queue) after the second customer. Text data is provided on the second customer, whereas video data is currently being provided on the third customer.

Each of the displayed customer representations (e.g., customer data boxes) can be selected (e.g., via a mouse click on the box) to produce a separate display screen devoted to the selected customer. In one display setting a devoted display screen shows additional information regarding the selected customer and/or their desired transactions. In another display setting the devoted display screen merely increases the size of the prior displayed customer data box, which enhances teller reading of (the larger) customer/transaction data.

In FIG. 51 the main teller page for lane #1 includes a visual queue indicator (graph, bar, panel, meter, etc.). As can be seen, an upper portion of the indicator is a first color (e.g., white or green), whereas a lower portion of the indicator is a second color (e.g., black or red). Some service provider arrangements may locate a teller in a safe and secure room inside of a building. That is, some tellers may not have direct face to face manual contact with a customer but rather pass items only through use of transport devices, such as pneumatic tube carriers. Thus, the queue indicator is another notification feature (along with vehicle sensors, camera data, etc.) for allowing a secured teller to visually know whether an unserviced customer is in lane #1.

As shown, the displayed customer data box for the second customer also has a queue indicator. The indicator provides data through the output of dual colors. The indicator's data (which includes the upper portion having the first color) can quickly inform the teller that there is another lane #1 customer after the second customer. Such information is further useful when the teller increases the size of the second customer data box to a full screen.

Figure 52:
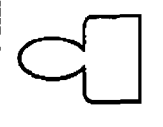
FIG. 52 shows a service provider's displayed queue of customer and transaction information.

FIG. 52 shows a detailed consumer queue for a teller. The teller display provides a list of upcoming transactions for customers waiting in at least one drive-through lane. An example teller display output provides customer data on the customer's name (e.g., John Connor), at least one account number, the type of transaction (e.g., transfer funds from savings to checking), a savings account balance, and a checking account balance. The teller display also shows that the next customer (e.g., Miles Dyson) is requesting $500 in cash. The teller display can also show completed transactions, such that a customer (e.g., Robert Wilhelm) deposited one check having an amount of $850.45.

In an example embodiment, the teller has access to other display formats that are available through the teller display(s). For example, a teller who is assigned to several drive-through lanes is able to simultaneously view pre-transaction information on waiting customers in those several lanes.

The system also informs the tellers of the wait times per customer. Thus, if two tellers share an additional (overlapping) lane, then the next customer waited on by a teller may actually be (based on individual customer wait times) from the same lane as that teller's prior customer. Thus, the system allows for fairness by assisting customers based on how long they have been waiting, instead of on luck of entering the fastest lane. That is, in embodiments which include teller sharing of drive-through lanes, the system allows for all customers to be treated equally with regard to lane wait time, regardless of how many vehicles may be in one lane relative to an adjacent lane.

As previously discussed, the example system is applicable to a plurality of different types of drive-through transaction environments involving facilities that provide services and/or goods. For example, a bank facility may have drive-through lanes to provide a financial transaction service. A fast-food restaurant may have a drive-through lane to serve food. In an example embodiment, a store facility has a drive-through lane to provide goods. For example, a store can comprise any of a drug store (pharmacy), grocery store, convenience store, etc.

A store's drive-through lane can have a plurality of different stations at which a customer stops during the transaction. For example, a store lane may sequentially have an order station, a pay station, and a goods delivery station. Another drive-through lane may have a single station (kiosk) where the customer both orders and pays for goods. The feature of a store drive-through lane allows a customer to complete their transaction without leaving their vehicle. Thus, the system provides convenience for a shopper who may be in possession of several small children, or have a physical disability, or may not want to incur inclement weather.

In an example embodiment the store drive-through lane is associated with one or more user display screens (or panels). The overall display shows a relatively small list of common items (e.g., 10-20 items) that most people normally purchase at that store. The list can include the items that most customers purchase when they need to make a special (quick) trip to the store. For example, the items can include (but are not limited to) bread, milk, tissue paper, beer, cigarettes, lottery tickets, pop, candy, diapers, and ammunition. A customer is able to view the displayed list of items while their vehicle is located in the drive-through lane.

Figure 53:
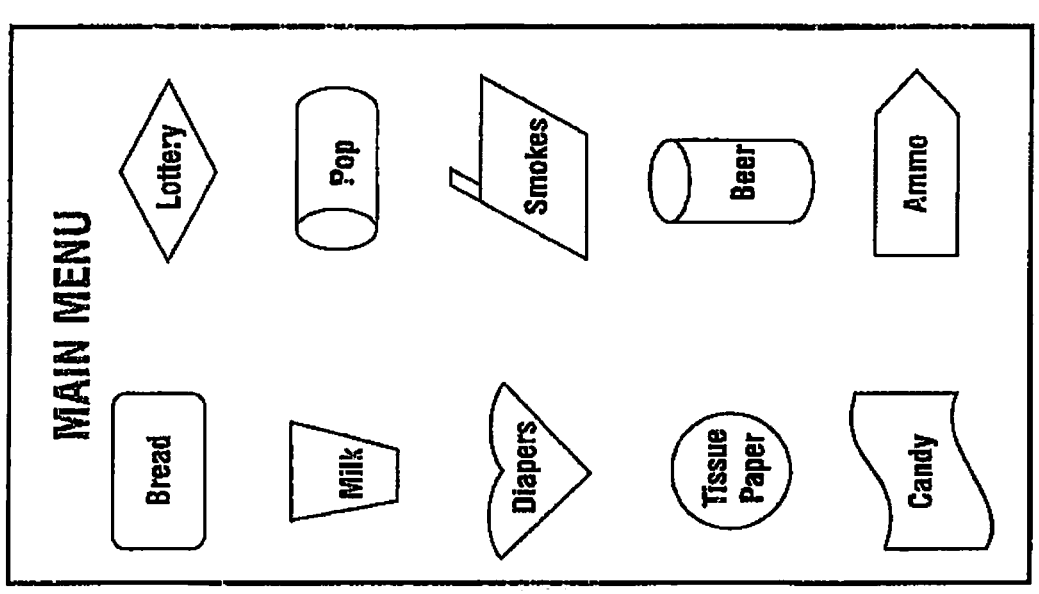
FIG. 53 shows a facility's item board which displays information on certain goods that are available to be purchased in a drive-up lane.

FIG. 53 shows a customer display that lists items (goods) that are available for purchase at a drive-through lane. In an example embodiment the display initially presents a main menu to the drive-thru customer. In the display screen example shown, the goods are represented by both icons and text. The display screen can be a touch screen which the customer (driver) is able to access while remaining located in a vehicle in the drive-through lane.

Figure 54:
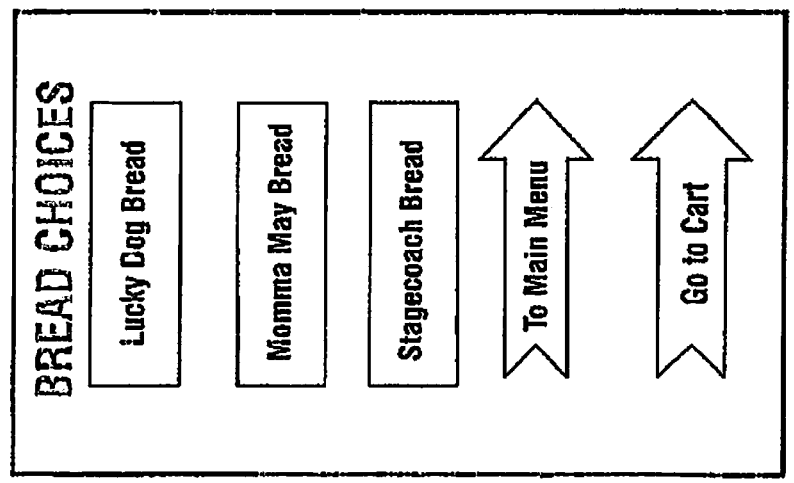
FIG. 54 shows a display of different brands of bread that can be purchased in the facility's drive-up lane.

Touch selection of the bread icon (in FIG. 53) results in the display screen shown in FIG. 54. In the example shown there are three brands of bread from which the customer can choose. Selection of one of the bread brand icons results in a next (sequential) display screen which shows the available bread sizes and prices associated with the selected brand. Of course other generically listed items (like the broad category of candy) on the main menu can likewise be narrowed down by further customer selections until the specifically desired item (specific type, brand, and size of candy) is chosen for purchase.

Also presented in FIG. 54 are icons that allow the customer to return to the main menu or go to their shopping (grocery) cart. A return to the main menu of FIG. 53 enables the customer to add other available items to their shopping cart. The display screen for the shopping cart allows the customer to review their selection list and the prices associated therewith. The display device may be associated with a card reader or other type of reader that enables the customer to pay for the goods.

As discussed, a drive-through customer can select items from a displayed list that they want to purchase. However, different embodiments provide for additional different modes available to a customer for use in making a selection of an item. For example, a customer can notify the service provider (cashier) of selections by verbal communication, such as by directly speaking (face to face) to the service provider through a window. Another manner of notification may be through a microphone/speaker. In other arrangements some goods selection may be input by the customer through a touch screen, and the remaining goods verbally provided. That is, some transactions may include both verbal and manual inputs (selections) by a customer. Further arrangements can have a key pad to receive customer input of numbers (e.g., 0-9) which correspond to (ten) numerically identified items (goods) on a display list. For example, bread may be assigned the number one on a displayed main menu. Customer input of the number one to the key pad indicates selection of bread from the menu.

Customer payment for selected goods can also be provided in different manners. A customer may provide (or identify) an account number to the service provider (or system). For example, the customer's credit card (e.g., VISA card, loyalty card, etc.) may be handed to the service provider. In other arrangements the customer can swipe their card at a prepay station. Some arrangements allow a customer to use their mobile phone (e.g., smart phone) in providing payment, including use of wireless communication such as RFID or NFC. Still other arrangements allow a customer to have a running credit with the store, where payment is through periodic automatic deduction from the customer's checking account.

At the delivery station the customer receives their selected items. For example, the customer may be handed a bag containing the items. Alternatively, for security reasons the items may be provided through a drawer, such as a secure deal drawer. The drawer may be of sufficient size to allow one or more bags to pass therethrough. Another drawer may have a small configuration that only allows individual items to pass. Pneumatic tubes allow for providing small items.

In another example embodiment, identification of a particular customer (or vehicle) is correlated in a data store with the particular list of items to be displayed to that customer. Thus, in the example embodiment the customer is first identified before their particularly assigned list of items is displayed.

A customer can be identified in several different manners. For example, customer identification can be linked to stored data associated with vehicle identification. The data can be read from the vehicle as it enters the drive-through lane. As previously discussed, such data can include a vehicle license plate number, a vehicle VIN number, etc. Alternatively, a customer can be identified by use of facial recognition software, voice identification data, etc. Furthermore, identification data may be combined with payment data, enabling dual use of a credit card, debit card, loyalty card, a phone number, etc.

The system enables customers to be classified together in respective selection categories. That is, several customers may be grouped together in the same display category. As a result, all of the customers in the same category are presented the same list of items. This enables all customers in the same category to use the same PIN (or code) to cause display of their goods list. Statistical metrics, such as past purchases over a predetermined time period, can be used to associate a particular customer with a particular goods list category, and the code assigned to display that particular goods list. Once the customer (or goods list category) is identified, then the display outputs a list of items which that particular customer most commonly purchases at the store. Thus the system allows for display lists based on several factors, including most common purchases nationally/regionally by customers, most common purchases by all customers of the store based on time of day, most common purchases at the store by an individual customer, etc.

The displayed goods list may also be based on the store's loyalty program. Thus, the display can also show the particular customer's program points, available discounts, and rebates/bonuses associated with the loyalty program. That is, alternative or additional selection options can be displayed to a loyal customer. The customer can then select items from the augmented display list.

An example store facility also has a web interface and/or a wireless interface which allows a customer to pre-order items (e.g., groceries) using a home PC, land line phone, and/or a mobile computing device (e.g., web-accessible smart phone). The example store facility also allows a customer to place a pre-order through an automated computer system associated with the store (or store chain). An estimated pickup time can also be provided by the customer.

For goods pickup, the customer will identify themselves to the store, such as by portable phone upon entering (or in the vicinity of) the drive-through lane. The customer then pays for their items, if not already paid for during the pre-order. The customer then receives the items and leaves the drive-through lane.

In an example embodiment, prior to receiving the pre-ordered items, the customer's total order is first presented for review on the drive-through station display screen. The customer may be asked if there is anything else they wish to purchase. The computer system associated with the store can offer suggestions of items that the user may desire. The computer system, by being in operative connection with one or more databases, can indicate an item most commonly purchased with another. For example, the computer system can determine when a person has ordered hot dogs but no hot dog buns. As a result, the customer is asked if they need to purchase hot dog buns. In one arrangement, the computer can ask the customer through the display. In another arrangement, the computer can notify the human service provider (store clerk) of questions to ask the customer.

The computer system also has access to a person's loyalty data in the store's loyalty program database, which includes data on the items most commonly purchased by the particular customer. As a result, a customer may also be asked if they want to additionally buy one of their most commonly purchased items. A last minute purchase can be added to the total bill for the pre-order of goods. It should be understood that the previously discussed drive-through metrics (e.g., device and event data) associated with environments such as banking can similarly be applied to drive-through environments for the purchasing of goods.

As previously discussed, an example embodiment includes a system that is operable to obtain transaction data, store the transaction data, and provide user access to the stored transaction data. The system includes at least one computer and at least one data store. The system can simultaneously collect on behalf of a system client, data related to devices and events that are associated with plural transactions. The system can automatically provide real time statistical analysis to captured transaction data. The transaction data can be presented (displayed) to a system user in a manner that allows the user to see the results in an informative format (charts, graphs, diagrams, models, alerts, etc.). Thus, the system allows a client thereof to provide more efficiently operations.

As previously discussed, the system can be used with drive-through lane data. That is, drive-through lane data can be captured and tracked with regard to a variety of devices and transaction events. Similarly, prior discussion has been made above with regard to statistical data being collected and analyzed with regard to events in individual financial facilities (e.g., bank branches). However, it should also be understood that operational data and statistical analysis can also be provided by the system on each particular automated banking machine in a network of such machines. That is, the previously discussed tracking of metrics and statistics can also be applied to data obtained at (or from) machines. Machine operation and event tracking can also be carried out in real time, allowing comparison of one machine's operational data to the average operational data for a group of machines.

Machine statistical data that can be tracked include the relationships involving a machine's identification, location, type, operational status, etc. For example, machine location data can indicate an address of an automated banking machine, whether the machine is located inside or outside a bank branch building, population density of the area where the machine is located, population demographics of the area, per capita income of the area, etc. Machine type data can indicate a lobby unit, a drive-up unit, a walk-up only unit, a through-the-wall unit, a machine model number, a machine version, etc.

Machine operational data can indicate whether or not the machine is currently operational to carry out transactions for machine users. If not operable, then collected data can indicate the reason or problem for the machine being unavailable, and the status of the particular service call involving the machine. Information related to providing status of automated banking machine hardware can be found in U.S. Pat. No. 7,641,107, which is herein incorporated by reference in its entirety. Machine operational data allows a person (manager) to view display output that shows the current available or unavailable status of each machine in the network of machines. Also, shown would be locations where machines were operating and were not operating, the machine's type, etc. A regional map that simultaneously shows the location and operational status of each machine in the network can be displayed. The map can also show which automated banking machines are currently being used.

FIGS. 35, 36, and 40 provide examples of the types of display maps that can be used to visually indicate locations of automated banking machines. A system user can use the map to select, access, and view data collected on a specific machine or a combination of machines.

Machine transaction data can also be collected for analysis. Statistical data (for a particular transaction at a particular automated banking machine) can be collected and tracked with regard to the transaction type, time of transaction, transaction length, monetary amount involved in the transaction, amount of cash dispensed, etc. Machine transaction type data can indicate any of a cash dispense, an envelope deposit, a check deposit, a cash deposit, a balance inquiry, a combination thereof, etc. Cash dispense data can indicate the number of cash withdrawal transactions at a given machine, the amount of cash dispensed in each transaction, the total amount of cash dispensed in the transactions, the average amount of cash dispensed per transaction, etc. The amount of cash remaining in each machine can be tracked in real time.

The system can determine the amount of currency in each currency cassette in each machine in a network that includes a plurality of machines. Each machine can determine the amount of currency in its currency cassettes. Further discussion regarding the ability of an automated banking machine to determine the amount of currency in a currency cassette can be found in U.S. Pat. No. 7,000,832, which is herein incorporated by reference in its entirety. The example system can track the amount and flow of cash for each automated banking machine in a network of machines. The machines may share a common transaction host computer. Again, the obtained information can be provided to a system user in real time.

Envelope deposit data can indicate the number of envelope deposits, the user-indicated amount in each envelope deposit, the item in the envelope (e.g., cash and/or financial check), etc. Statistical data can be similarly collected on the number of (non-envelope) check deposits, the number of (non-envelope) cash deposits, and the number of balance inquiries. Machine transaction data can also indicate if the transaction was for a machine user not affiliated with the automated banking machine network (home bank). The system can use the machine transaction data to determine (and compare) machine statistics, such as the transaction cost per machine.

The statistical data collected also allows for the tracking of machine transaction usage time, machine idle time, and the time a machine was idle between different users. The tracking can be part of a program that can provide a notification or alert message if a machine's idle time is too short. A machine with an average short idle time can be an indication of a need to install an additional machine nearby. A machine with an average long idle time can be an indication that the machine is not needed at that location.

Other data related to the automated banking machines can be garnered with regard to tracking cash replenishment activities. This allows for the current status of a machine replenishment to be known by a manager. For example, the data collected can include the time/date a machine issues an open request for a cash handler to load the machine, the identifier/address of the machine, type of the machine, the time the reload request was received by a cash handler, the identifier of the cash handler, the time the machine is expected to be replenished with cash, the time the machine was replenished, etc. Again, a displayed map can show the current (real time) status of all machines that are undergoing cash reloading activity. The statistical data also allows for the display of charts and graphs which show the historical reloading (or service) activity for all machines in the network. The collected data can provide useful information, such as average time to reload a machine, average reload time for all machines, number of reloads per machine per week or month, average time from machine request to machine replenishment, average time a reload request was received by a cash handler to when the machine was replenished, average time at a machine per cash handler, etc. The statistical data allows for recognition of patterns that would otherwise be unrecognizable.

Data related to the automated banking machines can also be gathered with regard to other manual activity at the machine, such as tracking envelope removal activities. For example, the envelope data collected can include the length of time since envelope deposits (e.g., a check deposit) were last removed from the machine. This allows a manager to determine whether checks (in envelopes) are being promptly retrieved and processed. The tracking system can compare time of envelope collections to the time envelope deposits were scheduled for collection.

The tracking system includes at least one computer. Sensors (at the machine) are operable to detect entry to the machine area that is used to store received check deposit envelopes. The sensors can provide data to a local processor that is located at the machine. The processor can be in operative connection with other sensors that operate to obtain other types of data at the machine. That is, the local processor (which is operatibe connection with a data store) can be data collecting processor. The local processor can cause collected data to be (wirelessly) sent to a computer (e.g., a remote server) of the tracking system.

Whether checks are being collected from machines on time can be automatically determined (and reported) by the system. Thus, the system can provide a bank manager with evidence that the bank is providing credit for deposited checks within a predetermined time period.

In an example embodiment the local processor (at or adjacent the machine) and the machine sensors are a part of the tracking system. That is, the system can include all components and communications from the level of data analysis results down to the sensor level. As a result, the computers of the system are in operative connection with the machine sensors. In a further embodiment the automated banking machine(s) is also a part of the tracking system.

The components of the tracking system that are at the machine level may be operated independently of the machine. That is, the components may be installed on the machine but not be controlled by the machine. In another arrangement, the components may integral with the machine and (at least partly) controlled by the machine (or a machine-controlling computer).

Alternatively, the tracking system can terminate at different levels (e.g., the machine level). For example, an example system does not include the local processor or the sensors. Rather, the machine is configured (e.g., with programming, agent software, etc.) to collect the data and then cause the collected data to be (wirelessly) sent from the machine to a remote (server) computer of the tracking system. In a different embodiment, the tracking system includes the local processor but not the sensors.

The tracking arrangements allow for various data-sending operations. For example, a data-sending operation may be used where the collecting and the sending of data occurs in real time. In another data-sending operation, collected data is sent based on a predetermined data-sending schedule (e.g., every 30 minutes). In a further data-sending method, collected data is not sent until its total amount has reached a specific data level (e.g., 4 check images).

Furthermore, the tracking system can employ different data collecting arrangements for different machines in a machine network. For example, a first machine may be configured to collect and send data to the tracking system (e.g., a server thereof), whereas a second machine may not be programmed to communicate with the tracking system. Rather, all collection and communication of data (at the second machine) is performed by the tracking system, which comprises system sensors and a system processor located on-site at the second machine.

Other check data can be collected and statistically analyzed by the system in real time. For example, collected machine data can be analyzed to indicate when (date and time) paper checks (or envelopes containing a paper check) were removed, and the person (servicer) who performed the removal. An authorized machine servicer can input their ID into the machine before performing (removal) service on the machine. Thus, the ID of a particular servicer can be linked by the tracking system to a particular check removal operation.

The system can also operate to determine (in real time) the number of paper checks that are currently stored in each respective machine. As previously discussed, an example machine includes a check acceptor that can accept checks sans an envelope. These paper checks can be imaged by a check imager in the machine, and then the check images can be sent to a remote computer for check processing. Only a predetermined quantity of paper checks can be stored in the machine. Thus, information regarding how many paper checks have been imaged can be used by the system to ensure that the maximum storage capacity of the machine is not exceeded.

Likewise, the system can provide (in real time) tracked information which shows when paper checks were last removed from a particular machine. This information is useful to a manager trying to quickly locate a particular paper check which needs immediate attention. The system can provide the manager with ample information regarding the particular check, such as whether the check is currently stored at the machine, whether the check is currently stored at a specific remote location, who removed the check from the machine, and the date/time of the check removal. The system can also identify each check received by, stored in, and/or removed from a particular machine. Thus, the system can provide evidence on whether a specifically identified check was ever received by a particular machine (or by the network of machines).

Again, resulting information related to data collected on check handling can be displayed in real time through one or more displays. The check handling information concerning one (networked) machine can be visually compared (on a display) to similar check handling information concerning the other (networked) machines. The system can also calculate both network averages and individual machine averages concerning such check handling information. These averages can also be visually output (and compared) through the displays in real time.

The tracking system can archive (in at least one data store, database, etc.) all collected data, all analyses performed, all statistical information, and all results. The system can also receive transaction data (e.g., data about completed transactions) from machines and/or a transaction host. The system can archive all transactions that were carried out during the lifetime of a machine network. Such transaction data can be statistically analyzed for current and subsequent usage. For example, the data can be used to identify potential VIPs.

The system allows for years of stored information to be accessed and used. For example, current (performance) data on a particular machine may be statistically compared to similar stored (performance) data that was collected earlier in the life of the same machine. The comparison can be used to determine if the machine (or a component thereof) needs to be replaced. Likewise, stored prior yearly data regarding a particular machine can be compared to current year data for that machine. Similarly, stored prior year-end data regarding a particular network of machines can be compared to current year-end data for that same network.

The system can additionally track automated banking machine data related to checks that were not received in an envelope. The machine can make one or more images of such received checks. These (electronic) check images can be periodically sent (e.g., once or twice a day) from the machine to a remote server for check processing. For example, the machine can periodically electronically send (based on a predetermined time period) a group of plural check images as a batch to the server. The batch may be communicated in one or more messages to the server. The batch can include generated (or captured) check images from different checking transactions that involved different machine users.

The check data collected can include the total number of check images that were stored at the machine at the time the batch of images was sent to the server. The system can collect data on the length of time since a particular machine sent checks electronically for processing. For example, batch of checks can include images of checks that were received by a machine in different transactions. One of the images in the current batch is an image of the first (oldest) check received by the machine (for the current batch). The system can track the length of time that this first (oldest) check was held at the machine. That is, the length of time a batch was held by a machine can be determined by the oldest check in each batch.

The collected data allows an example system to determine based on the time length the oldest check (whose image is in the batch) was in possession of the machine, whether check images are being held too long at the machine before they are sent (in a batch) to be processed. For example, the system is operable detect a heavy influx of checks being deposited within a certain time period during a day (or a month), with minor check activity for the remainder of that day. That is, the system may determine that the time period between 4:30-5:30 p.m. on a Friday is the busiest period for check deposits at a particular machine. The system is further operable to determine and recommend that the particular machine should be reconfigured to send its check images for processing soon after 5:30 p.m. on each Friday, instead of waiting for the normal weekday predetermined time period (e.g., midnight) to elapse before sending the checks.

As noted above, the artificial intelligence built into the system can recommend that check images be sent by particular machines at optimum times during particular days to enhance the efficiency of check processing for an entire network of automated banking machines. As can be appreciated, the artificial intelligence can also find machine user (and/or machine) patterns, make predictions regarding machine usage (and/or machine operation) with regard to amounts and times, provide recommendations for individual machines, and provide suggestions to improve the machine network as a whole.

Again, in an example embodiment the data collection system is operable to receive information (data) which indicates that a particular automated banking machine received a financial check comprising check data. Based on this information, the system can then begin tracking a length of time (e.g., a time period) that the machine is in sole possession of the check data. The machine can image the check and then store both the check and the check image in the machine. The (time period) tracking can continue until the system receives new information (data) which indicates that the machine is no longer in sole possession of the check data. For example, an image of the check was sent to a remote computer for check processing. The system can determine, based on the differences between the time the machine received the check and the time the machine sent the check image, a total length of time (e.g., the time period) that the machine was in sole possession of the check data.

During the time period, the check and any generated images of the check are kept in the machine. The check image(s) includes the check data. Thus, the machine maintains sole possession of the check data (and other check data) during the time period. In some embodiments the machine keeps (archives) a copy of the check image (or keeps the original image). That is, an equivalent check image (whether the original image or a copy) gets sent (communicated, uploaded, unloaded) to the remote computer for check processing. As a result of unloading (sending) the check image, the machine is no longer in sole possession of the check data, even though the machine may still be in possession of the check data.

Again, the check image can be sent to the remote computer (server) with many other check images in a batch (grouping or collection) of images. Alternatively, a sole check image can be sent individually to the server, including in real time. Sensing devices can detect (or receive information about) when the machine sends check image data to the server. This batch sent data can be uploaded from the machine directly to the system, or from the machine to an intermediate data collection processor that is associated with both the machine and the system.

In an example embodiment the machine is associated with a predetermined schedule of times at which check data is to be unloaded from the machine. For example, the machine can be configured to automatically unload (electronically send) generated check images to a remote computer for check processing, based on following the unloading schedule. The unloading schedule can also include the times at which a person is to manually unload checks from the machine. The system has access to each machine's unloading schedule, which can be stored in at least one data store. Thus, the system can be used to determine (by a computer or by a person), based on data collected on the machine, whether an (electronic or manual) unloading should be moved up to an earlier time.

For example, the system can be operated (either by a computer program or by user input) to cause the machine to unload its check images (which have not yet been unloaded) to the remote computer earlier than the next scheduled unloading time. The system can also be operated to cause the machine to perform an immediate unloading of check images, which may be an additional (non-scheduled extra) unloading. For example, the system can be operated to send a message to the machine which instructs the machine to perform the additional unloading operation. Alternatively, the system can also be operated to change (move up) the next scheduled unloading time for check images.

Similarly, the system can be operated to cause paper checks held in a particular machine to be manually unloaded earlier than the next scheduled unloading time for such service operation. The system can be operated to cause an immediate unloading of checks. For example, the system can be operated to notify the nearest service person that a check unloading operation is needed (or recommended) Alternatively, the system can also be operated to change (move up) the next scheduled time for unloading paper checks.

In an example embodiment the system is part of a banking network monitoring center. In an example of adjusting an unloading time, the system uses artificial intelligence to detect potential problems in the network of automated banking machines. The system allows a person at the center to visually see (via displayed graphs, charts, etc.) that a particular machine has received an unnormal large amount (fifty) of checks since it last unloaded check images. The system produces visual output showing that the currently oldest check image belongs to a check that was deposited into the machine three hours earlier. The system can automatically check the unloading schedule for the particular machine. That is, the system can determine that the particular machine is scheduled to unload check images every eight hours. Based on the data analyzed, the system can then produce visual output which indicates to the person at the center that there is a potential problem associated with the machine, because the machine is not scheduled to unload its next batch of images for another five hours. That is, because of the high volume of checks already received at the machine and the time still available for the machine to receive many more checks, there is a potential problem that all of the checks will not be able to be properly processed in a timely manner. The system can automatically notify personnel of potential problems via visual and audio alarms, etc. The system can also provide recommendations to alleviate potential problems. The system also includes processors that are programmed (e.g., situational applications) to carry out a remedy (e.g., instruct the machine to perform an unloading of check images) for detected problems if no human action is taken (received by the system) within a predetermined time period.

In a similar manner, the monitoring system can also operate to detect potential problems involving checks that are received in envelopes. For example, the system can determine how long the currently oldest envelope has been stored in a particular machine since the last unloading of envelopes occurred at that machine. For example, the system has access to data which indicates the last time envelopes were unloaded from that particular machine. As previously discussed, the system can determine from data sensed at the machine whether a scheduled unloading of envelopes was actually carried out. The system can also check the next scheduled unloading of envelopes for that particular machine. From the gathered information the system can determine whether the currently oldest envelope can remain in the machine until the next scheduled unloading, without causing a problem in timing processing of the check(s) in the oldest envelope. If the monitoring system determines that the oldest envelope will be held too long in the machine, then it can cause (or recommend) a courier to be sent to the machine to pick up (unload) the deposit envelopes before a specified time. Alternatively, the system can send to someone in the bank branch which is nearest to the automated banking machine, a message which indicates that the machine is in need of having its deposit envelopes unloaded and the checks therein imaged by the bank.

Figure 55:
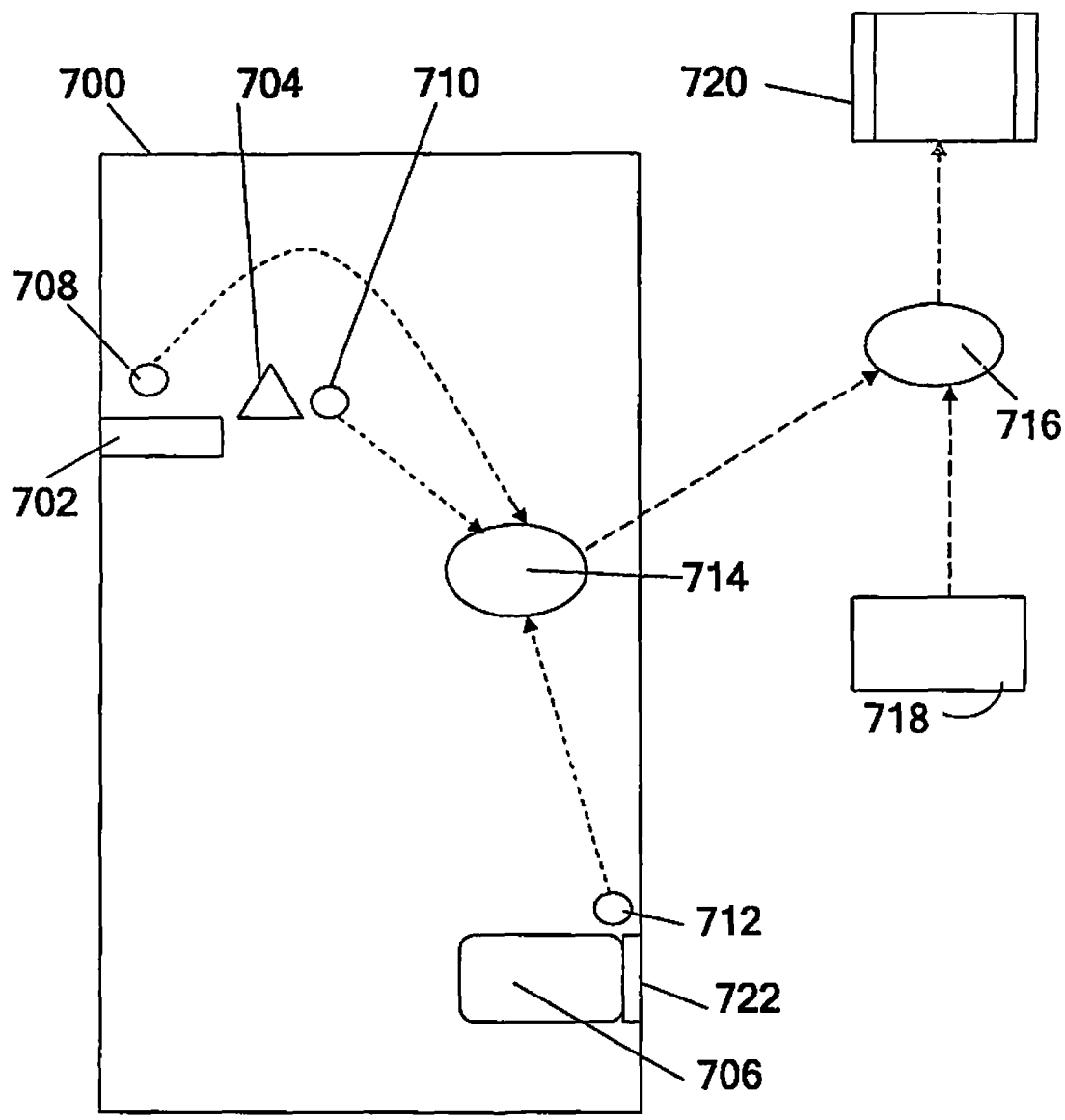
FIG. 55 shows an example embodiment of a system that can provide real time monitoring of unprocessed check data that is currently stored at an automated banking machine.

FIG. 55 shows an automated banking machine 700 that includes a check acceptor 702 (or envelope acceptor), a check imager 704, and a check (or envelope) storage area 706. There is an access door 722 to the storage area 706. Respective sensors 708, 710, 712 are able to detect each of when a check is accepted, imaged, and stored. The sensors provide data to data collection processor 714, which may be in the machine. The data collection processor 714 sends collected data to a central computer 716 of a monitoring system, which may be located at a central monitoring center. The central computer 716 can receive information from data stores 718, such as information concerning the schedule for the machine 700 to unload unprocessed check data. A person (client) using the system can view pertinent information through a (computer) display 720. The display 720 may be at the central monitoring center or remotely located from the center.

Figure 56:
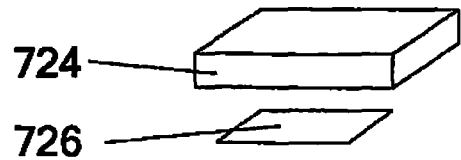
FIG. 56 shows an example of a check imager.

FIG. 56 shows a check imager 724 and a check 726.

Figure 57:
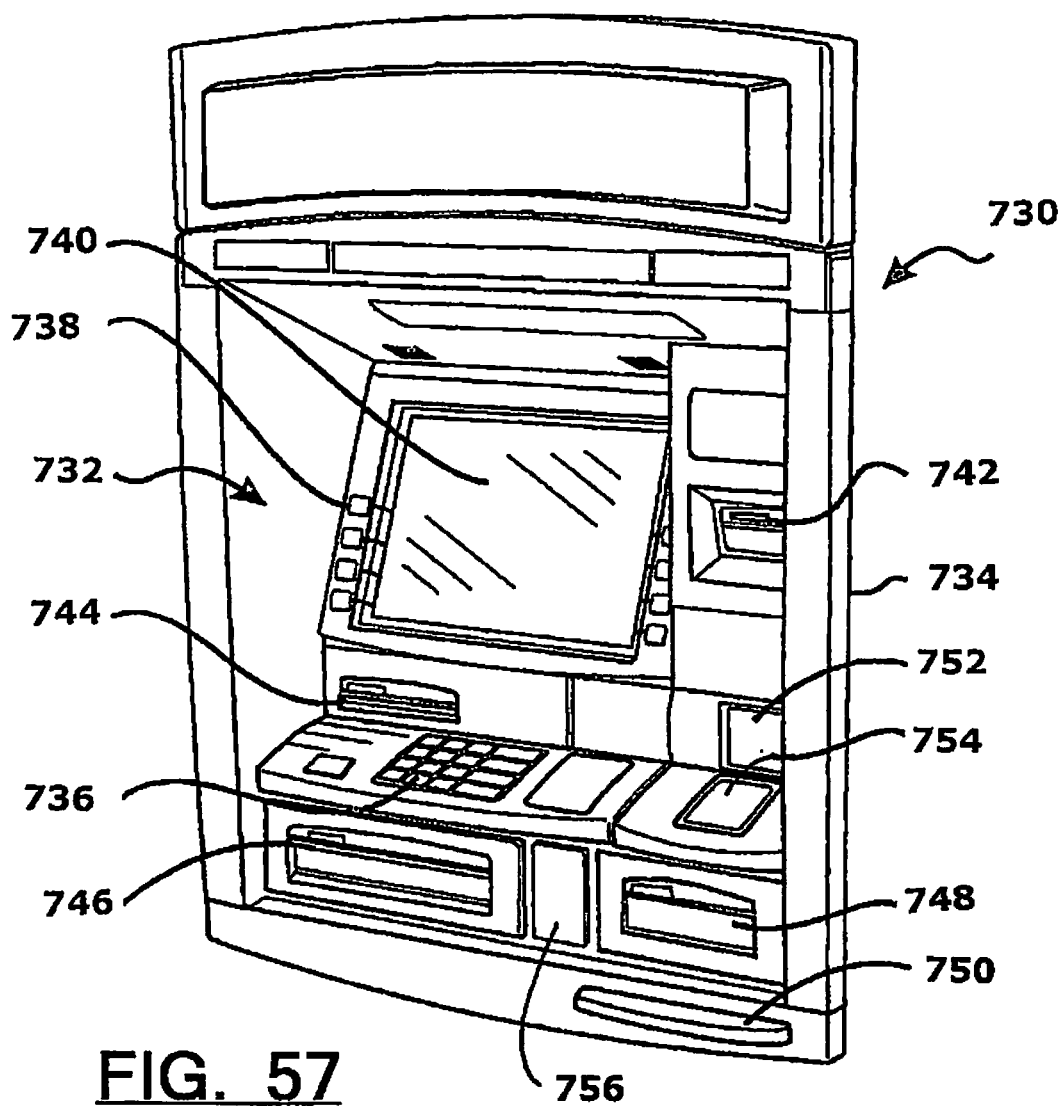
FIG. 57 shows an example automated banking machine which includes different types of data readers, such as a card reader, a biometric reader, an RFID reader, and/or an NFC reader

FIG. 57 shows a front view of an example of a self-service automated banking machine 730. The machine includes a fascia 732, a housing 734, a keypad 736, function keys 738, a (touch screen) display 740, a paper check (and currency note) acceptor 742, account statement outlet 744, cash withdrawal outlet 746, deposit acceptor 748 for envelopes and for bulk deposits (e.g., a stack containing currency notes and/or checks), and a writing shelf 750. The machine also includes at least one user data reader, which can include different types of readers. For example, a first type of reader can be a card reader 752, a second type of reader can be a biometric reader 754, and a third type of reader can be an RFID or NFC (card) reader 756.

In another example embodiment, the system can track (for each respective machine) the quantity of check images which were in each respective batch that was sent for processing. The system can also keep a (real time) running tally on the number of check images currently held by each respective machine. If a visual display regarding network status data indicates that a particular machine is currently not storing any check images, then the viewing manager may take additional action (e.g., employ other system statistics or analytics) to determine whether the machine is malfunctioning.

Again, the system can collect (archive) machine transaction data. Such transaction data can include time/date of a transaction, type of transaction, and accounts involved in the transaction. For example, a check deposit transaction can result in data being collected on an account read from a check (e.g., account number in micr line data), an amount of the check (e.g., courtesy amount data), an account to which the check was deposited (e.g., read card account data), images of the check, and a transaction number (which links a particular machine to the check transaction). All data collected by the system can be stored in an encrypted format.

The system can also keep track of the archived data which is stored on a respective machine. For example, the system can provide statistical information on how far back in time check images and transaction data have been stored on a particular machine. Such information can be useful in determining whether the particular machine can be used to recover lost data (e.g., a check image). For example, bank records may be absent a check image because of a computer failure. Such information can also be useful in determining whether to delete old data that currently stored on a hard drive of a machine.

Metric statistics can also be collected on recycling activities. An automated banking machine recycler can both receive cash and then dispense the received cash. The cash may be received during a cash deposit, such as by a merchant or a customer. The machine can then dispense this deposited cash during a cash dispense transaction. Hence the machine recycles cash. The system can track if a recycler machine is receiving large amounts of cash deposits. The system can automatically compare the amounts received to the amount of cash the machine is capable of holding. Thus, the system can determine whether to send out a cash collection person to remove excess cash from the machine. The artificial intelligence also allows the system to predict whether a machine that has excess cash is expected (e.g., based on time of day) to soon conduct several cash withdrawal transactions. If such cash withdrawals are expected, then the system may delay or postpone committing a cash collection person to the machine until further information if collected.

Again, the system allows the statistics data to be viewed at the local (bank branch) level through the entire network level (region/state/country manager). Access to certain data may be linked to the hierarchy level of the manager. For example, a bank branch manager may only be able to access automated banking machine data that is limited to that bank branch's machines. In contrast, a country manager that is in charge of overseeing a bank's machine operation in a country may be able to access all data for all of that bank's machines in that country. The system permits statistical data to be viewed (via a display device) for each machine, for machines associated with a particular facility, for machines associated with a combination of facilities, for a bank's entire machine network, etc.

The system can additionally track automated banking machine data related to promotional messages (e.g., advertisements, offers) made to machine users. The presentation data that is collected can indicate the type of promotional message, indicate the number of times the promotional message was presented, indicate the rate of acceptance (success rate) of the promotional offer, etc. The system can automatically calculate the success rate per machine, success rate per branch, success rate per particular area, average success rate for machines, etc. Further discussion regarding automated banking machines outputting presentations that are intended to interest customers can be found in U.S. Pat. No. 7,516,087 and U.S. application Ser. No. 12/844,377 filed Jul. 27, 2010, which are herein incorporated by reference in their entirety.

FIG. 44 shows an example of the type of system display that may be used to view automated banking machine transaction data for a particular machine, including the current (in real time) total transactions for the present day and the average time per transaction for the present day. It should be understood that other types of display formats can be used to show machine transaction data. For example, as previously discussed, a user is able to select from among various formats for data display, including charts, graphs, tables, maps, outlines, diagrams, etc. Various colors may also be displayed to indicate various events. For example, a visual alert may be presented in different flashing colors to indicate that a measured characteristic of a machine component (e.g., a check imager, cash dispenser, cash acceptor, envelope acceptor, etc.) exceeded a predefined threshold.

Again, data related to transactions and/or transaction function devices can be obtained (collected) and then analyzed. As previously discussed, transaction devices and operations can include a plurality of different devices, including both some devices located inside a building and other devices located outside. For example, a transaction device for a banking operation can comprise an entire self-service automated banking machine or a particular component of the machine. A device of a transaction facility (e.g., a bank, a pharmacy, a merchant store, etc.) can comprise a card reader, a deal drawer, an item carrier that is movable in a pneumatic tube, etc.

In an example embodiment, the particular device/component is associated with (designated or assigned to) at least one processor that has programming code (software). For example, the device may include the processor. The software of a device's processor is able to obtain data that is relevant to actions, operations, movements, statuses, and conditions of that given device. For example, the software may be written to report every action performed by the device or only certain (a limited amount of particular) actions conducted by the device. The data that is obtained (collected) by the processor may be raw data.

For a device action(s) that is to be reported, the device's processor can send the obtained (raw) data pertaining to that action to at least one remote processor, such as a data-collecting processor. The remote processor has software that can analyze the received (raw) data to figure out the device action(s) which corresponding thereto.

For example, a check reader device can have reader software that obtains data on the check reader. The obtained (raw) data may indicate (to the remote processor) that certain check reader actions have occurred, e.g., certain components of the check reader were operated. A check reader processor (which may be dedicated to obtaining data on the check reader's actions) can cause the obtained data to be sent (reported) to the remotely located processor which is assigned to the check reader. Software of the remote processor can determine the specific check reader actions that correspond to the (raw) data reported by the check reader processor. For example, the remote processor may determine from the data received (from the check reader) that the check reader was operated to read both a micr line and a courtesy amount from a check. This check reader action information (determined by the remote processor) can then be collected (stored) for further analysis, review, statistics, research, etc.

The remote processor may be an intermediate processor that is dedicated to only receive data from a sole device, then operate to convert the data into further information that is usable by a central processor, and then send the information to the central processor.

Alternatively, the remote processor may be a central processor. That is, the remote processor may be (or act as) a central data-collecting computer (or host) that is associated with many different and distinct devices. The central processor can receive data that was obtained by a plurality of devices and components. Thus, as can be appreciated, the system includes computer programming that is appropriately configured to enable device data to be obtained locally at the device level and then moved (e.g., such as reformatted data) along a data transfer (communication) path via one of more remote processors to a central level for data analysis. In some embodiments wireless communication may be used to transfer the device data. The wireless communication may involve any of a private communications network, a local network, a cellular network or link, the Internet, a satellite, etc.

The central processor's software allows it to decipher the many different types of received data into pertinent information that is useful for analysis, statistics, etc. In order to produce this information, the central processor software may manipulate or modify data that is received from the individual devices. For example, received device data may be converted (or reformatted) into different data formats, types, defined structures, sizes, arrangements, etc. The manipulation or modification of the device data may be for purposes of analyzing, storing (medium type), displaying, etc.

A remote processor cannot only operate to determine (resolve) what device/component actions or events the various reports (comprising obtained data) correspond to, but it can also operate to form (generate) its own reports from this resolved information. For example, a report generated by the remote processor may involve a single (individual) device, such as a check reader. A report generated by a remote processor acting as a central processor may involve a plurality of similar devices, such as all check readers used in a network of automated banking machines. A further report generated by the central processor may involve all components of all automated banking machines in a financial network.

Figure 58:
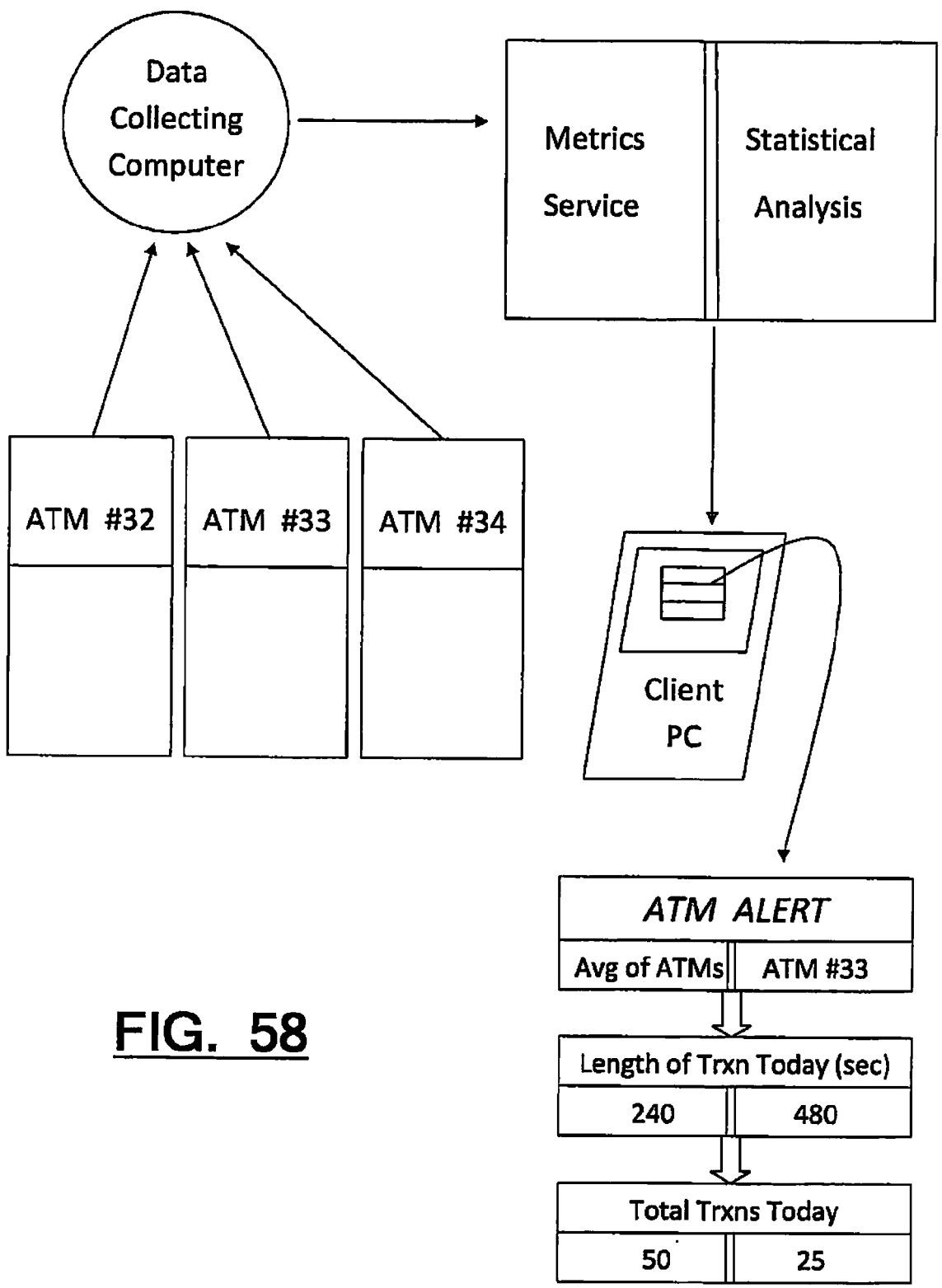
FIG. 58 shows an example embodiment of a system that is operable to collect and analyze automated banking machine data, including transaction data, component data, service data, and status data.

FIG. 58 shows an example arrangement for collection and usage of automated banking machine transaction data. The machines on the network obtain data (e.g., transaction data) and then pass this data onto a remote (system) computer (e.g., a data collecting computer). For clarity, only the network machines indicated #32, #33, and #34 are shown in FIG. 58. The data collecting computer may act on (e.g., modify, reformat, etc.) the received data before passing it on (such as via the Internet) to a metrics service computer for usage (e.g., statistical analysis). The system may be associated with other separate services, including a data collecting service, a metrics service, and a machine monitoring service. The monitoring service may be able to remotely monitor the machines, including the current status of machines and their components. FIG. 58 also shows that an alert message was sent to a client PC (e.g., phone, tablet, etc.). The alert provides real time statistical information that a problem may exist with automated banking machine #33. The client able to retrieve other data from the system related to the potential problem. The data may indicate that machine #33 needs service.

A client of the system can access and review the collected data and/or the analyzed data for any of the automated banking machines monitored by the system. For example, the client (e.g., a banking manager) may access specific information about a specific machine transaction they desire to review. Alternatively, the client may view real time data concerning the average number of transactions for all machines in the network for the present day. The data can indicate which machines are currently being used above average and which machines are currently being used below average. A particular below average machine (e.g., machine #33) can be selected by the user to further review how that machine's current average usage compares to other averages, such as that machine's prior average usage for the same week day (e.g., Friday). Other collected data can also be reviewed to help ascertain why the particular machine is registering below average.

It should be understood that the previously discussed use of programming and processors (e.g., a device processor, a remote processor, and/or a central processor) to obtain, transfer, modify, store, and analyze data also applies to the example arrangement shown in FIG. 58.

Again, statistical data can be collected and analyzed with regard to events carried out with regard to financial transactions, including events in individual financial facilities (e.g., bank branches). For example, data can be retrieved with regard to each individual service provider (SP) station, including whether the station is an inside walkup (lobby) station, or is for servicing drive-through lanes, or both, or is a remote teller station (as shown in FIG. 45). Other branch data can be collected on whether a SP station is/out of service, whether an in service (operating) station is currently manned or not manned, whether a customer is currently being served at the operating station, etc. SP station data can also be obtained on each station to track the types of transactions performed, track time of each transaction, track amount involved in each transaction, track usage of station equipment, etc. For example, for a SP station having a teller cash dispenser the system can track the amount of cash remaining therein, the number of uses of the dispenser (operation cycles), date/time of dispenser usage, which teller used the dispenser, dispenser ID and location, dispenser service records, etc. Similar data can be collected on a teller cash recycler at a SP station.

Other SP station data can be collected on other SP station equipment, such as audio/video components, check imaging equipment, etc. For example, data on a check scanner can be obtained to track the number of checks it scanned, the value of the scanned checks, the number of scanned checks that were drawn on the home bank versus other banks, etc. The system can receive check data that was captured by the check imaging equipment. The system can then analyze the received check data to output statistics concerning the equipment and/or SP station. Likewise, the system can receive check data that was captured by an automated banking machine's check imager.

As previously discussed, the system enables tracking and statistical data to be presented to a system user in real time. Thus, the system allows a person (manager) to know (visually access) in real time what (events, status, etc.) is currently (instantly) occurring at an automated banking machine, at a given facility (branch), in a given region, and/or across an entire banking network. For example, data (e.g., device data, event data, transaction data, service data, etc.) can be obtained from each machine in a network of plural automated banking machines. At least one system processor can analyze this data to generate statistical data in real time. This real time statistical data can be based at least in part on an average of at least one measurable feature (e.g., total number of transactions per day, average transaction time for the current day, number of times a card reader was operated during a predetermined period, amount of cash currently available for dispensing, etc.) that is common to (shared by) all of the machines. The processor can also cause the statistical data to be presented in real time through at least one display (screen) device to a system client. The system processor can also cause a real time alert to be sent to a system client about a statistical anomaly regarding a particular machine.

It should be understood that the devices and systems shown and the methods of operation described are merely examples. Embodiments may include other types of apparatus and methods.

Example embodiments of the devices and systems described herein have been described with reference to particular software components and features. Other embodiments may include other or different software components which provide similar functionality.

Thus, the features and characteristics of the example embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries and principles of the invention, the manner in which it is constructed and operated, and the advantages and useful results attained; the new and useful structures, devices, elements, arrangements, parts, combinations, systems, equipment, operations, methods, processes, and relationships are set forth in the appended claims.

What is claimed is:

1. Apparatus comprising:
 a data collection system that comprises a processor and a data store;
 wherein the system is operable to receive data that indicates a financial check which comprises check data, was received by an automated banking machine;
 wherein the system is located remotely from the machine;
 wherein the system is operable to receive check images from the machine based at least in part on a predetermined schedule of unloading times;
 wherein the schedule includes a next scheduled unloading time; and wherein the system is operable to:
(i) begin tracking, based at least in part on the data received which indicates that the financial check was received by the machine, a length of time that the machine is in sole possession of the check data,
(ii) determine, based at least in part on the data received which indicates that the financial check was received by the machine, a quantity of check images at the machine which have not yet been unloaded to the data collection system,
(iii) determine the next scheduled unloading time, and
(iv) cause the machine to unload the quantity of check images determined in (ii) to the data collection system earlier than the next scheduled unloading time, based at least in part on: the length of time in (i), the quantity of check images determined in (ii), and the next scheduled unloading time determined in (iii).

2. The apparatus set forth in claim 1, wherein the machine includes at least one user data reader, wherein the at least one user data reader is operable to read user data usable to identify a financial account with which the machine is operable, responsive at least in part to computer-determined association between the user data and the financial account, to carry out a financial transaction.

3. The apparatus set forth in claim 1, wherein the machine includes a check acceptor, wherein the check acceptor is operable to receive financial checks from authorized users of the machine.

4. The apparatus set forth in claim 3, the machine includes a check imager,
wherein check imager is operable to generate an image of a paper check received by the check acceptor, amd
wherein the check image includes the check data.

5. A non-transitory, tangible computer readable medium of instructions having instructions encoded thereon for execution by a processor and when executed operable to:
receive data which indicates that an automated banking machine received a financial check, wherein the financial check includes check data,
wherein the machine is associated with a predetermined schedule of times at which check data is to be unloaded from the machine,
wherein the schedule includes a next scheduled check data unloading time,
wherein the processor is located remotely from the machine,
track a length of time that the machine is in sole possession of the financial check data determine the next scheduled check data unloading time;
determine, based at least in part on the length of time that the machine is in sole possession of the financial check data and the next scheduled check data unloading time, whether to unload the check data from the machine earlier than the next scheduled check data unloading time.

6. The computer readable medium according to claim 5 the instructions are further operable to:
determine a current number of checks stored at the machine whose check data has not yet been unloaded from the machine;
wherein in determining whether to unload check data before the next scheduled unloading time is based at least in part on the length of time that the machine is in sole possession of the financial check data, the next scheduled check data unloading time, and the current number of checks.

7. The computer readable medium according to claim 5, wherein the check acceptor includes a paper check acceptor that is operable to receive paper checks in sans an envelope,
wherein the check is a paper check received by the paper check acceptor;
wherein the machine includes a check imager;
wherein the check imager is operable to generate check image of the paper check received by the check acceptor;
wherein the check imager is operable to generate a check image of the paper check,
wherein the check image includes the check data;
wherein the machine is operable to store check images at the machine.

8. The computer readable medium according to claim 7, the instructions are further operable to to determine a current number of check images stored at the machine whose check data has not yet been unloaded to the remote computer
wherein in determining whether to unload check data before the next scheduled unloading time is based at least in part on the length of time that the machine is in sole possession of the financial check data, the next scheduled check data unloading time, and the current number of checks.

9. The computer readable medium according to claim 7, the instructions are further operable to cause the machine to unload the check image.

10. The computer readable medium according to claim 9, the instructions are further operable to cause a message to be sent to the machine, wherein the message instructs the machine to immediately send the first check image to the remote computer.

11. The computer readable medium according to claim 9, the instructions are further operable to cause modification of the schedule, wherein the modification causes the machine to send the check image to the remote computer earlier than the next scheduled unloading time.

12. The computer readable medium according to claim 7, the instructions are further operable to determine that the machine is no longer in sole possession of the check data.

13. The computer readable medium according to claim 7 wherein the check acceptor includes an envelope acceptor that is operable to receive paper checks in envelopes, wherein the check is a paper check received in an envelope by the envelope acceptor, the instructions are further operable to determine the next scheduled envelope unloading time based at least in part on whether the first envelope should be unloaded from the machine earlier than the next scheduled envelope unloading time.

14. The computer readable medium according to claim 5, the instructions are further operable to determine a current number of envelopes stored at the machine; and
wherein determining whether to unload the check data from the machine earlier than the next scheduled check data unloading time is based in part on the current number of envelopes.

15. The computer readable medium according to claim 14, the instructions are further operable to cause the envelope to be unloaded from the machine earlier than the next scheduled envelope unloading time, based at least in part on determining whether to unload the check data from the machine earlier than the next scheduled check data unloading time.

16. The computer readable medium according to claim 14, the instructions are further operable to cause message to be sent to a person authorized to remove envelopes from the machine, wherein the message includes a notification to remove envelopes from the machine.

17. The computer readable medium according to claim 14 the instructions are further operable to determine that the machine is no longer in sole possession of the check data.

18. The computer readable medium according to claim 14 wherein the machine includes an envelope storage area, wherein the machine is operable to store envelopes in the envelope storage area, wherein the machine includes an access door to the envelope storage area, wherein the machine includes sensor that is operable to sense movement of the access door, the instructions are further operable to:
   receive sensor data which indicates that the envelope storage area was manually accessed responsive at least in part to sensed movement of the access door; and
   determine that the envelope was removed from the envelope storage area, based at least in part on the sensor data.

19. The computer readable medium according to claim 18 the instructions are further operable to:
   receive identifying data which identifies an authorized machine servicer; and
   store data which links the identifying data with removal of the first envelope from the envelope storage area.

20. A non-transitory, tangible computer readable medium of instructions having instructions encoded thereon for execution by a processor and when executed operable to:
   receive data that indicates a financial check which comprises check data, was received by an automated banking machine, wherein the processor is associated with a data collection system is located remotely from the machine;
   receive check images from the machine based at least in part on a predetermined schedule of unloading times, wherein the schedule includes a next scheduled unloading time;
   track, based at least in part on the data received which indicates that the financial check was received by the machine, a length of time that the machine is in sole possession of the check data,
   determine, based at least in part on the data received which indicates that the financial check was received by the machine, a quantity of check images at the machine which have not yet been unloaded to the data collection system,
   determine the next scheduled unloading time, and
   cause the machine to unload the check images to the data collection system earlier than the next scheduled unloading time, based at least in part on: the length of time, the quantity of check images determined, and the next scheduled unloading time determined.

* * * * *